(12) United States Patent
Kondow

(10) Patent No.: US 9,392,277 B2
(45) Date of Patent: Jul. 12, 2016

(54) IMAGE PROCESSING DEVICE AND METHOD

(75) Inventor: Kenji Kondow, Tokyo (JP)

(73) Assignee: Sony Corporation, Tokyo (JP)

(*) Notice: Subject to any disclaimer, the term of this patent is extended or adjusted under 35 U.S.C. 154(b) by 370 days.

(21) Appl. No.: 13/981,017

(22) PCT Filed: Jan. 26, 2012

(86) PCT No.: PCT/JP2012/051658
§ 371 (c)(1),
(2), (4) Date: Jul. 22, 2013

(87) PCT Pub. No.: WO2012/108271
PCT Pub. Date: Aug. 16, 2012

(65) Prior Publication Data
US 2013/0301737 A1 Nov. 14, 2013

(30) Foreign Application Priority Data
Feb. 7, 2011 (JP) .................. 2011-023870

(51) Int. Cl.
*H04N 7/12* (2006.01)
*H04N 19/51* (2014.01)
(Continued)

(52) U.S. Cl.
CPC ......... *H04N 19/00587* (2013.01); *H04N 19/13* (2014.11); *H04N 19/463* (2014.11); *H04N 19/52* (2014.11); *H04N 19/139* (2014.11)

(58) Field of Classification Search
CPC ............ H04N 19/00587; H04N 19/52; H04N 19/463; H04N 19/13; H04N 19/139
USPC .................................. 375/240.16
See application file for complete search history.

(56) References Cited

U.S. PATENT DOCUMENTS

| 2009/0225862 A1* | 9/2009 | Sato ............ H04N 19/176 375/240.16 |
| 2009/0232218 A1* | 9/2009 | Nakagawa ....... H04N 19/00587 375/240.16 |
| 2012/0082228 A1* | 4/2012 | Su .............. H03M 7/4031 375/240.16 |

FOREIGN PATENT DOCUMENTS

| JP | 10-051792 | 2/1998 |
| JP | 2008-283490 | 11/2008 |
| WO | WO2011/146451 A1 | 5/2011 |

OTHER PUBLICATIONS

Nov. 25, 2014, Japanese Office Action for related JP application No. 2011-023870.

(Continued)

*Primary Examiner* — Allen Wong
(74) *Attorney, Agent, or Firm* — Paratus Law Group, PLLC

(57) ABSTRACT

The present technique relates to an image processing device and method that can increase encoding efficiency. A table selection unit (343) compares the difference (distance) dPOC calculated by a distance calculation unit (342) with a distance threshold dPOC_th supplied from a distance threshold acquirement unit (341), and, in accordance with the comparison result, selects a table (a bit sequence assignment pattern) Sn. A binarization unit (335) refers to the table information about the assignment pattern (Sn) that is stored in a table storage unit (334) and is selected by a table selection unit (343), and, in accordance with the assignment pattern, binarizes the predicted motion vector select information (pmv_index) supplied from a predicted motion vector selection unit (332). The present invention can be applied to image processing devices, for example.

16 Claims, 38 Drawing Sheets

(51) Int. Cl.
   H04N 19/13    (2014.01)
   H04N 19/52    (2014.01)
   H04N 19/463   (2014.01)
   H04N 19/139   (2014.01)

(56) References Cited

OTHER PUBLICATIONS

J. Jung, et al., "TE11: Report on experiment 3.3.b: 'temporally oriented' set of predictors for MV-Competition", pp. 1-4, Oct. 7-15, 2010, Joint Collaborative Team on Video Coding (JCT-VC) of ITU-T SG16 WP3 and ISO/IEC JTC1/SC29/WG11, $3^{rd}$ Meeting: Guangzhou, CN.

Jun. 17, 2015, EP communication issued for related EP application No. 12744571.6.

Kazushi Sato, On Motion Vector Coding, Joint Collaborative Team on Video Coding (JCT-VC) of ITU-T SG16 WP3 and ISO/IEC JTC1/SC29/WG11, Jul. 21-28, 2010, pp. 1-9, $2^{nd}$ Meeting: Geneva, CH.

Juan Liu, Adaptive Motion Vector Prediction Based on Spatiotemporal Correlation, Department of Electronics and Information Engineering, Huazhong University of Science and Technology (HUST), 2006, pp. 1-4.

Feb. 17, 2015, EP communication issued for related EP application No. 12744571.6.

Ken Mcann, et al., Samsung's Response to the Call for Proposals on Video Compression Technology, Joint Collaborative Team on Video Coding (JCT-VC) of ITU-T SG16 WP3 and ISO/IEC JTC1/SC29/WG11, Jan. 20-28, 2011, pp. 1-42, $1^{st}$ Meeting: Dresden, DE.

Guillaume Laroche, et al., RD Optimized Coding for Motion Vector Predictor Selection, IEEE Transactions on Circuits and Systems for Video Technology, vol. 18, No. 9, Sep. 2008, pp. 1-11.

Jian-Liang Lin, et al., Improved Advanced Motion Vector Prediction, Joint Collaborative Team on Video Coding (JCT-VC) of ITU-T SG16 WP3 and ISO/IEC JTC1/SC29/WG11, Jan. 20-28, 2011, pp. 1-8, $4^{th}$ Meeting: Daegu, KR.

Sep. 8, 2015, JP communication issued for related JP application No. 2011-023870.

Feb. 2, 2016, Chinese Office Action for related CN Application No. 201280007255.X.

Apr. 26, 2016, Japanese Office Action for related JP Application No. 2011-023870.

* cited by examiner

FIG. 15

| CODE NUMBER | BIT SEQUENCE | S1 | S2 |
|---|---|---|---|
| 0 | 1 | Median | MV_Tmp |
| 1 | 010 | MV_A | Median |
| 2 | 011 | MV_B | MV_A |
| 3 | 00100 | MV_C | MV_B |
| 4 | 00101 | MV_E | MV_C |
| 5 | 00110 | MV_D | MV_E |
| 6 | 00111 | MV_Tmp | MV_D |

*FIG. 24*

| CODE NUMBER | BIT SEQUENCE | S1 | S3 |
|---|---|---|---|
| 0 | 1 | Median | MV_Tmp |
| 1 | 010 | MV_A | MV_A |
| 2 | 011 | MV_B | MV_B |
| 3 | 00100 | MV_C | MV_C |
| 4 | 00101 | MV_E | MV_E |
| 5 | 00110 | MV_D | MV_D |
| 6 | 00111 | MV_Tmp | Median |

*FIG. 25*

| CODE NUMBER | BIT SEQUENCE | S1 | S2 |
|---|---|---|---|
| 0 | 1 | Median | MV_Tmp |
| 1 | 10 | MV_A | Median |
| 2 | 110 | MV_B | MV_A |
| 3 | 1110 | MV_C | MV_B |
| 4 | 11110 | MV_E | MV_C |
| 5 | 111110 | MV_D | MV_E |
| 6 | 111111 | MV_Tmp | MV_D |

IMAGE PROCESSING DEVICE AND METHOD

CROSS REFERENCE TO PRIOR APPLICATION

This application is a National Stage Patent Application of PCT International Patent Application No. PCT/JP2012/051658 (filed on Jan. 26, 2012) under 35 U.S.C. §371, which claims priority to Japanese Patent Application No. P2011-023870 (filed on Feb. 7, 2011), which are all hereby incorporated by reference in their entirety.

TECHNICAL FIELD

This disclosure relates to image processing devices and methods, and more particularly, to an image processing device and method that can increase encoding efficiency.

BACKGROUND ART

In recent years, to handle image information as digital information and achieve high-efficiency information transmission and accumulation in doing do, apparatuses compliant with a standard, such as MPEG (Moving Picture Experts Group) for compressing image information through orthogonal transforms such as discrete cosine transforms and motion compensation by using redundancy inherent to image information, have been spreading among broadcast stations to distribute information and among general households to receive information.

Particularly, MPEG2 (ISO (International Organization for Standardization)/IEC (International Electrotechnical Commission) 13818-2) is defined as a general-purpose image encoding standard, and is applicable to interlaced images and non-interlaced images, and to standard-resolution images and high-definition images. Currently, MPEG2 is used in a wide range of applications for professionals and general consumers. According to the MPEG2 compression method, a bit rate of 4 to 8 Mbps is assigned to an interlaced image having a standard resolution of 720×480 pixels, and a bit rate of 18 to 22 Mbps is assigned to an interlaced image having a high-resolution of 1,920×1,088 pixels, for example. In this manner, high compression rates and excellent image quality can be realized.

MPEG2 is designed mainly for high-quality image encoding suited for broadcasting, but is not compatible with lower bit rates than MPEG1 or encoding methods involving higher compression rates. As mobile terminals are becoming popular, the demand for such encoding methods is expected to increase in the future, and to meet the demand, the MPEG4 encoding method has been standardized. As for image encoding methods, the ISO/IEC 14496-2 standard was approved as an international standard in December 1998.

Further, a standard called H.26L (ITU-T (International Telecommunication Union Telecommunication Standardization Sector) Q6/16 VCEG (Video Coding Expert Group)), which is originally intended for encoding images for video conferences, is currently being set. Compared with the conventional encoding methods such as MPEG2 and MPEG4, H.26L requires a larger amount of calculation in encoding and decoding, but is known to achieve a higher encoding efficiency. Also, as a part of the MPEG4 activity, "Joint Model of Enhanced-Compression Video Coding" is now being established as a standard for achieving a higher encoding efficiency by incorporating functions unsupported by H.26L into the functions based on H.26L.

On the standardization schedule, the standard was approved as an international standard under the name of H.264 and MPEG-4 Part 10 (Advanced Video Coding, hereinafter referred to as AVC) in March 2003.

Meanwhile, to improve motion vector encoding using median predictions according to AVC, there has been a suggestion to adaptively use "Temporal Predictor" or "Spatio-Temporal Predictor" as predicted motion vector information in addition to "Spatial Predictor", which is defined in AVC and is determined through a median prediction (see Non-Patent Document 1, for example).

In an image information encoding device, cost function values for respective blocks are calculated by using the predicted motion vector information about the respective blocks, and optimum predicted motion vector information is selected. Through the compressed image information, flag information indicating the information as to which predicted motion vector information has been used is transmitted for each block.

Meanwhile, the macroblock size of 16×16 pixels might not be optimal for a large frame such as an UHD (Ultra High Definition: 4000×2000 pixels) frame to be encoded by a next-generation encoding method.

In view of this and for the purpose of achieving an even higher encoding efficiency than that achieved by AVC, an encoding method called HEVC (High Efficiency Video Coding) is now being standardized by JCTVC (Joint Collaboration Team—Video Coding), which is a joint standards organization of ITU-T and ISO/IEC (see Non-Patent Document 2, for example).

According to the HEVC encoding method, coding units (CUs) are defined as processing units like macroblocks of AVC. Unlike the macroblocks of AVC, the CUs are not fixed to the size of 16×16 pixels. The size of the CUs is specified in the compressed image information in each sequence.

The CUs form a hierarchical structure including the largest coding units (LCUs) and the smallest coding units (SCUs). Roughly speaking, the LCUs can be considered equivalent to the macroblocks of AVC, and the CUs on the lower hierarchical levels than the LCUs (CUs smaller than LCUs) can be considered equivalent to the sub macroblocks of AVC.

In motion vector (MV) encoding, MVs are not sent directly to a decoder, but the difference vectors (MVDs) that are the differences from predicted motion vectors (PMVs) are subjected to lossless encoding, and are then sent to the decoder. By a technique called Advanced MV prediction (AMVP) or MV competition, an index (pmv_index) for identifying PMVs is contained in each stream when there are two or more candidate PMVs (see Non-Patent Document 2, for example).

The candidate PMVs may be MVs of blocks close to each other in a frame of the same time (spatial_pmv), or MVs of blocks that differ from the encoded current frame in terms of time (temporal_pmv). Where pmv_index is encoded, the bit rate after the encoding is normally low if the value of pmv_index is small.

Therefore, to achieve a high encoding efficiency, pmv_index having a small value should be assigned to a candidate PMV having a higher designation frequency.

CITATION LIST

Non-Patent Documents

Non-Patent Document 1: Joel Jung, Guillaume Laroche, "Competition-Based Scheme for Motion Vector Selection and Coding", VCEG-AC06, ITU—Telecommunications Standardization SectorSTUDY GROUP 16 Question 6Video Coding Experts Group (VCEG)29th Meeting: Klagenfurt, Austria, 17-18 Jul., 2006

Non-Patent Document 2: "Test Model under Consideration", JCTVC-B205, Joint Collaborative Team on Video Coding (JCT-VC) of ITU-T SG16 WP3 and ISO/IEC JTC1/SC29/WG112nd Meeting: Geneva, CH, 21-28 Jul., 2010

SUMMARY OF THE INVENTION

Problems to be Solved by the Invention

However, the frequency at which a candidate PMV is designated depends on the contents of images. Therefore, even if code numbers are assigned in such a manner as to give priority to temporal_pmv or spatial_pmv (or ifs smaller code number is assigned to temporal_pmv or spatial_pmv), there has been a possibility that the encoding efficiency becomes lower depending on the contents of images, and the lower encoding efficiency leads to a problem.

For example, if s larger code number is assigned to temporal_pmv (while a smaller code number is assigned to spatial_pmv), there is a possibility that the bit rate becomes higher when temporal_pmv is designated as a PMV, due to discontinuity or the like appearing in motion around the current block.

If a larger code number is assigned to spatial_pmv (while a smaller code number is assigned to temporal_pmv), there is a possibility that the bit rate becomes higher when spatial_pmv is designated as a PMV, due to a stop of panning of a camera, for example.

This disclosure has been made in view of the above circumstances, and the object thereof is to prevent reductions in encoding efficiency by assigning a smaller code number to temporal_pmv when the distance between the current picture and the picture containing temporal_pmv is short in terms of displaying order, and assigning a smaller code number to spatial_pmv when the distance between the current picture and the anchor picture is long in terms of displaying order, taking advantage of the fact that frames close to each other in terms of displaying order are highly likely to have similar motions.

Solutions to Problems

One aspect of this disclosure is an image processing device that includes: an assignment control unit that controls assignment of a binary bit sequence to predicted motion vector select information indicating a motion vector selected as a predicted motion vector, to assign a bit sequence having a shorter code length to the select information about a motion vector having a higher designation frequency; and a binarization unit that binarizes the predicted motion vector select information with the bit sequence assigned by the assignment control unit.

The assignment control unit may include a table selection unit that selects a table that designates the bit sequence to be assigned to the predicted motion vector select information in accordance with the type of the motion vector selected as the predicted motion vector, and the binarization unit can binarize the predicted motion vector select information by using the table selected by the table selection unit.

The assignment control unit may further include a distance calculation unit that calculates the distance between the current picture and an anchor picture, and the table selection unit can select the table based on the distance calculated by the distance calculation unit.

The assignment control unit may further include a distance threshold acquirement unit that acquires a distance threshold indicating the threshold of the distance, and the table selection unit can select the table in accordance with the magnitude relationship between the distance calculated by the distance calculation unit and the distance threshold acquired by the distance threshold acquirement unit.

The distance threshold acquired by the distance threshold acquirement unit may be supplied to another device that decodes encoded data of the predicted motion vector select information.

The assignment control unit may further include a similarity calculation unit that calculates the similarity between peripheral predicted motion vectors, and the table selection unit can select the table based on the similarity calculated by the similarity calculation unit.

The assignment control unit may further include a similarity threshold acquirement unit that acquires a similarity threshold indicating the threshold of the similarity, and the table selection unit can select the table in accordance with the magnitude relationship between the similarity calculated by the similarity calculation unit and the similarity threshold acquired by the similarity threshold acquirement unit.

The similarity threshold acquired by the similarity threshold acquirement unit may be supplied to another device that decodes encoded data of the predicted motion vector select information.

The assignment control unit may further include a cost function value calculation unit that calculates a cost function value of the predicted motion vector select information, and the table selection unit can select the table based on the cost function value calculated by the cost function value calculation unit.

Information indicating the result of the table selection performed by the table selection unit may be supplied to another device that decodes encoded data of the predicted motion vector select information.

The image processing device may further include an encoding unit that encodes the binarized data obtained through the binarization performed by the binarization unit.

The one aspect of this disclosure is also an image processing method for an image processing device. The image processing method includes: controlling assignment of a binary bit sequence to predicted motion vector select information indicating a motion vector selected as a predicted motion vector, to assign a bit sequence having a shorter code length to the select information about a motion vector having a higher designation frequency, the controlling being performed by an assignment control unit; and binarizing the predicted motion vector select information with the assigned bit sequence, the binarizing being performed by a binarization unit.

The other aspect of this disclosure is an image processing device that includes: a decoding unit that decodes encoded data of predicted motion vector select information indicating a motion vector selected as a predicted motion vector; and a debinarization unit that debinarizes the binarized data of the predicted motion vector select information obtained through the decoding performed by the decoding unit, with a bit sequence that is assigned in an assigning operation controlled to assign a bit sequence having a shorter code length to the select information about a motion vector having a higher designation frequency.

The image processing device may further including an assignment control unit that controls the bit sequence to be assigned to the predicted motion vector select information based on a parameter supplied from another device that has encoded the predicted motion vector select information. The debinarization unit can debinarize the predicted motion vector select information under the control of the assignment control unit.

The assignment control unit may include a table selection unit that selects a table that designates the bit sequence to be assigned to the predicted motion vector select information in accordance with the type of the motion vector selected as the predicted motion vector.

The assignment control unit may further include a distance calculation unit that calculates the distance between the current picture and an anchor picture, and the table selection unit can select the table in accordance with the magnitude relationship between the distance calculated by the distance calculation unit and a distance threshold supplied from the other device that has encoded the predicted motion vector select information.

The assignment control unit may further include a similarity calculation unit that calculates the similarity between peripheral predicted motion vectors, and the table selection unit can select the table in accordance with the magnitude relationship between the similarity calculated by the similarity calculation unit and a similarity threshold supplied from the other device that has encoded the predicted motion vector select information.

The debinarization unit may debinarize the binarized data of the predicted motion vector select information based on information indicating a table selection result supplied from the other device that has encoded the predicted motion vector select information.

The other aspect of this disclosure is also an image processing method for an image processing device. The image processing method includes: decoding encoded data of predicted motion vector select information indicating a motion vector selected as a predicted motion vector, the decoding being performed by a decoding unit; and debinarizing the binarized data of the predicted motion vector select information obtained through the decoding, with a bit sequence that is assigned in an assigning operation controlled to assign a bit sequence having a shorter code length to the select information about a motion vector having a higher designation frequency, the debinarizing being performed by a debinarization unit.

In the one aspect of this disclosure, assignment of a binary bit sequence to predicted motion vector select information indicating a motion vector selected as a predicted motion vector is controlled so as to assign a bit sequence having a shorter code length to the select information about a motion vector having a higher designation frequency, and the predicted motion vector select information is binarized with the assigned bit sequence.

In the other aspect of this disclosure, encoded data of predicted motion vector select information indicating a motion vector selected as a predicted motion vector is decoded, and the binarized data of the predicted motion vector select information obtained through the decoding is debinarized with a bit sequence that is assigned in an assigning operation controlled so as to assign a bit sequence having a shorter code length to the select information about a motion vector having a higher designation frequency.

Effects of the Invention

According to this disclosure, images can be processed. Particularly, encoding efficiency can be increased.

BRIEF DESCRIPTION OF DRAWINGS

FIG. 15 is a diagram for explaining an example pattern of assignment of code numbers and bit sequences.

FIG. 24 is a diagram for explaining another example pattern of assignment of code numbers and bit sequences.

FIG. 25 is a diagram for explaining yet another example pattern of assignment of code numbers and bit sequences.

MODES FOR CARRYING OUT THE INVENTION

The following is a description of modes for carrying out the present technique (hereinafter referred to as the embodiments). Explanation will be made in the following order.

1. First Embodiment (Image Encoding Device and Image Decoding Device)
2. Second Embodiment (Image Encoding Device and Image Decoding Device)
3. Third Embodiment (Image Encoding Device and Image Decoding Device)
4. Fourth Embodiment (Personal Computer)
5. Fifth Embodiment (Television Receiver)
6. Sixth Embodiment (Portable Telephone Device)
7. Seventh Embodiment (Hard Disk Recorder)
8. Eighth Embodiment (Camera)

<1. First Embodiment>
[Image Encoding Device Compatible with the AVC Encoding Method]

Figure 1:
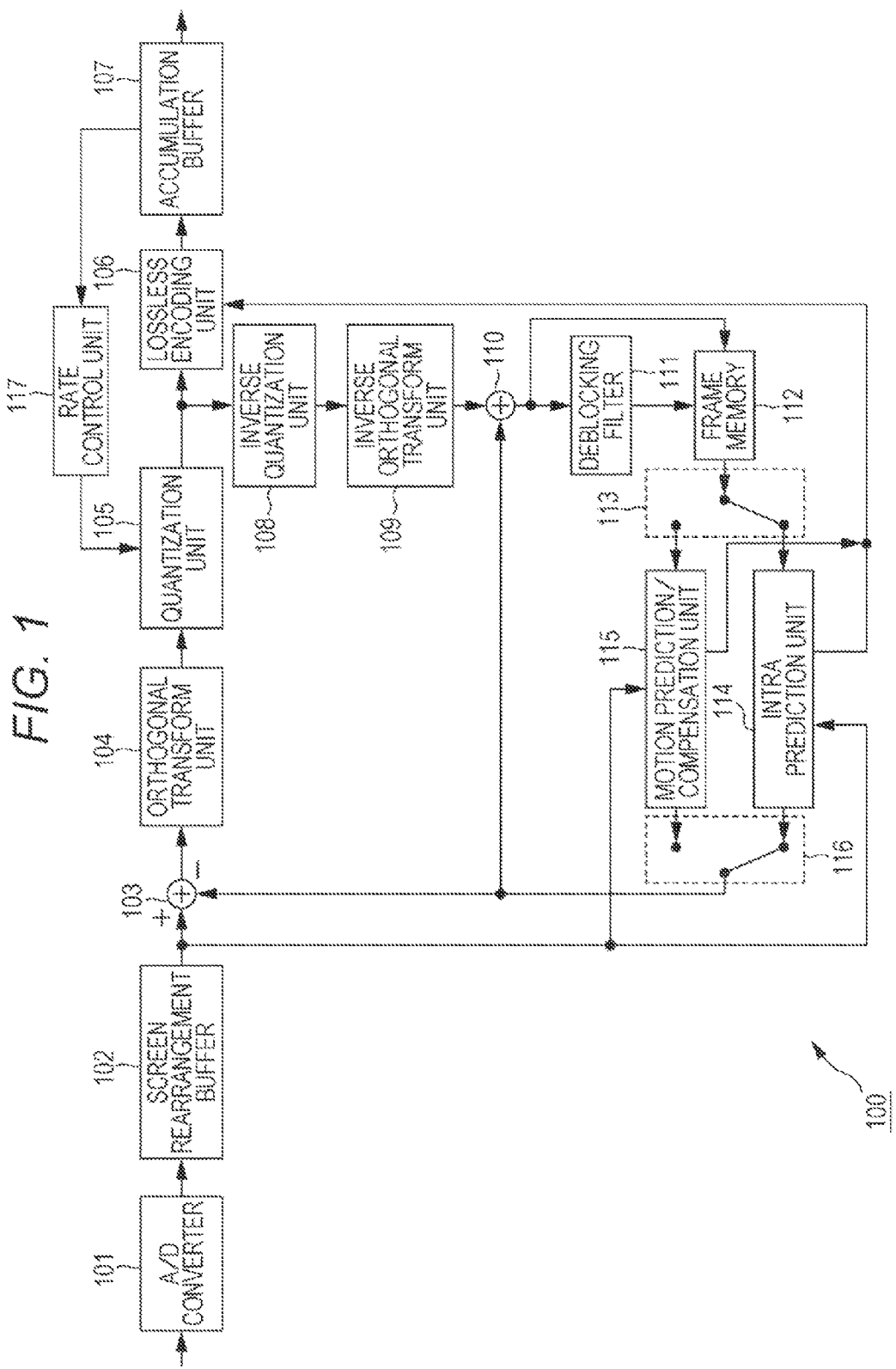
FIG. 1 is a block diagram showing an image encoding device that outputs compressed image information according to the AVC encoding method.

FIG. 1 shows the structure of an embodiment of an image encoding device that encodes images by the H.264 and MPEG (Moving Picture Experts Group) 4 Part 10 (AVC (Advanced Video Coding)) encoding methods.

The image encoding device 100 shown in FIG. 1 is a device that encodes and outputs images by an encoding method compliant with the AVC standard. As shown in FIG. 1, the image encoding device 100 includes an A/D converter 101, a screen rearrangement buffer 102, an arithmetic operation unit 103, an orthogonal transform unit 104, a quantization unit 105, a lossless encoding unit 106, and an accumulation buffer 107. The image encoding device 100 also includes an inverse quantization unit 108, an inverse orthogonal transform unit 109, an arithmetic operation unit 110, a deblocking filter 111, a frame memory 112, a selection unit 113, an intra prediction unit 114, a motion prediction/compensation unit 115, a selection unit 116, and a rate control unit 117.

The A/D converter 101 subjects input image data to an A/D conversion, and outputs and stores the resultant image data into the screen rearrangement buffer 102. The screen rearrangement buffer 102 rearranges the image frames stored in displaying order in accordance with the GOP (Group of Pictures) structure, so that the frames are arranged in encoding order.

The screen rearrangement buffer 102 supplies the image having the rearranged frame order to the arithmetic operation unit 103. The screen rearrangement buffer 102 also supplies the image having the rearranged frame order to the intra prediction unit 114 and the motion prediction/compensation unit 115.

The arithmetic operation unit 103 subtracts a predicted image supplied from the intra prediction unit 114 or the motion prediction/compensation unit 115 via the selection unit 116, from the image read from the screen rearrangement buffer 102, and outputs the difference information to the orthogonal transform unit 104.

When intra encoding is performed on an image, for example, the arithmetic operation unit 103 subtracts a predicted image supplied from the intra prediction unit 114, from the image read from the screen rearrangement buffer 102. When inter encoding is performed on an image, for example, the arithmetic operation unit 103 subtracts a predicted image supplied from the motion prediction/compensation unit 115, from the image read from the screen rearrangement buffer 102.

The orthogonal transform unit 104 performs an orthogonal transform operation, such as a discrete cosine transform or a Karhunen-Loeve transform, on the difference information supplied from the arithmetic operation unit 103, and supplies the transform coefficient to the quantization unit 105.

The quantization unit 105 quantizes the transform coefficient output from the orthogonal transform unit 104. Based on target bit rate value information supplied from the rate control unit 117, the quantization unit 105 sets a quantization parameter, and performs quantization. The quantization unit 105 supplies the quantized transform coefficient to the lossless encoding unit 106.

The lossless encoding unit 106 performs lossless encoding on the quantized transform coefficient through variable-length encoding or arithmetic encoding or the like. Since the coefficient data has already been quantized under the control of the rate control unit 117, the bit rate becomes equal to the target value (or approximates the target value) that is set by the rate control unit 117.

The lossless encoding unit 106 obtains information indicating an intra prediction and the like from the intra prediction unit 114, and obtains information indicating an inter prediction mode, motion vector information, and the like from the motion prediction/compensation unit 115. The information indicating an intra prediction (an intra-screen prediction) will be hereinafter also referred to as intra prediction mode information. The information indicating an inter prediction (an inter-screen prediction) will be hereinafter referred to as inter prediction mode information.

The lossless encoding unit 106 not only encodes the quantized transform coefficient, but also incorporates (multiplexes) various kinds of information such as a filter coefficient, the intra prediction mode information, the inter prediction mode information, and the quantization parameter, into the header information of encoded data. The lossless encoding unit 106 supplies and stores the encoded data obtained through the encoding into the accumulation buffer 107.

For example, in the lossless encoding unit 106, a lossless encoding operation such as variable-length encoding or arithmetic encoding is performed. The variable-length encoding may be CAVLC (Context-Adaptive Variable Length Coding) specified in H.264/AVC, for example. The arithmetic encoding may be CABAC (Context-Adaptive Binary Arithmetic Coding) or the like.

The accumulation buffer 107 temporarily stores the encoded data supplied from the lossless encoding unit 106, and outputs the encoded data as an encoded image encoded by H.264/AVC to a recording device or a transmission path (not shown) in a later stage at a predetermined time, for example.

The transform coefficient quantized at the quantization unit 105 is also supplied to the inverse quantization unit 108. The inverse quantization unit 108 inversely quantizes the quantized transform coefficient by a method compatible with the quantization performed by the quantization unit 105. The inverse quantization unit 108 supplies the obtained transform coefficient to the inverse orthogonal transform unit 109.

The inverse orthogonal transform unit 109 performs an inverse orthogonal transform on the supplied transform coefficient by a method compatible with the orthogonal transform operation performed by the orthogonal transform unit 104. The output subjected to the inverse orthogonal transform (the restored difference information) is supplied to the arithmetic operation unit 110.

The arithmetic operation unit 110 obtains a locally decoded image (a decoded image) by adding the predicted image supplied from the intra prediction unit 114 or the motion prediction/compensation unit 115 via the selection unit 116 to the inverse orthogonal transform result supplied from the inverse orthogonal transform unit 109 or the restored difference information.

For example, when the difference information is compatible with an image to be intra-encoded, the arithmetic operation unit 110 adds the predicted image supplied from the intra prediction unit 114 to the difference information. When the difference information is compatible with an image to be inter-encoded, the arithmetic operation unit 110 adds the predicted image supplied from the motion prediction/compensation unit 115 to the difference information, for example.

The addition result is supplied to the deblocking filter 111 or the frame memory 112.

The deblocking filter 111 removes block distortions from the decoded image by performing a deblocking filtering operation where necessary. The deblocking filter 111 supplies the filtering operation result to the frame memory 112. The decoded image that is output from the arithmetic operation unit 110 can be supplied to the frame memory 112 without passing through the deblocking filter 111. That is, the deblocking filtering operation of the deblocking filter 111 can be skipped.

The frame memory 112 stores the supplied decoded image, and outputs the stored decoded image as a reference image to the intra prediction unit 114 or the motion prediction/compensation unit 115 via the selection unit 113 at a predetermined time.

When intra encoding is performed on an image, for example, the frame memory 112 supplies the reference image to the intra prediction unit 114 via the selection unit 113. When inter encoding is performed on an image, for example, the frame memory 112 supplies the reference image to the motion prediction/compensation unit 115 via the selection unit 113.

When the reference image supplied from the frame memory 112 is an image to be subjected to intra encoding, the selection unit 113 supplies the reference image to the intra prediction unit 114. When the reference image supplied from the frame memory 112 is an image to be subjected to inter encoding, the selection unit 113 supplies the reference image to the motion prediction/compensation unit 115.

The intra prediction unit 114 performs intra predictions (intra-screen predictions) to generate a predicted image by using the pixel values in the current picture supplied from the frame memory 112 via the selection unit 113. The intra prediction unit 114 performs intra predictions in more than one mode (intra prediction modes) that is prepared in advance.

By the H.264 image information encoding method, an intra 4×4 prediction mode, an intra 8×8 prediction mode, and an intra 16×16 prediction mode are defined for luminance signals. As for chrominance signals, prediction modes for respective macroblocks can be defined independently of the luminance signals. In the intra 4×4 prediction mode, one intra prediction mode is defined for each 4×4 luminance block. In the intra 8×8 prediction mode, one intra prediction mode is defined for each 8×8 luminance block. In the intra 16×16 prediction mode and for the chrominance signals, one prediction mode is defined for each macroblock.

The intra prediction unit 114 generates predicted images in all the candidate intra prediction modes, evaluates the cost function values of the respective predicted images by using the input image supplied from the screen rearrangement buffer 102, and selects an optimum mode. After selecting the optimum intra prediction mode, the intra prediction unit 114 supplies the predicted image generated in the optimum intra prediction mode to the arithmetic operation unit 103 and the arithmetic operation unit 110 via the selection unit 116.

As described above, the intra prediction unit 114 also supplies information such as the intra prediction mode information indicating the adopted intra prediction mode to the lossless encoding unit 106 where appropriate.

Using the input image supplied from the screen rearrangement buffer 102, and the reference image supplied from the frame memory 112 via the selection unit 113, the motion prediction/compensation unit 115 performs motion predictions (inter predictions) on an image to be subjected to inter encoding, and performs a motion compensation operation in accordance with the detected motion vectors, to generate a predicted image (inter predicted image information). The motion prediction/compensation unit 115 performs such inter predictions in more than one mode (inter prediction modes) that is prepared in advance.

The motion prediction/compensation unit 115 generates predicted images in all the candidate inter prediction modes, evaluates the cost function values of the respective predicted images, and selects an optimum mode. The motion prediction/compensation unit 115 supplies the generated predicted image to the arithmetic operation unit 103 and the arithmetic operation unit 110 via the selection unit 116.

The motion prediction/compensation unit 115 supplies the inter prediction mode information indicating the adopted inter prediction mode, and motion vector information indicating the calculated motion vectors to the lossless encoding unit 106.

When intra encoding is performed on an image, the selection unit 116 supplies the output of the intra prediction unit 114 to the arithmetic operation unit 103 and the arithmetic operation unit 110. When inter encoding is performed on an image, the selection unit 116 supplies the output of the motion prediction/compensation unit 115 to the arithmetic operation unit 103 and the arithmetic operation unit 110.

Based on the compressed images accumulated in the accumulation buffer 107, the rate control unit 117 controls the quantization operation rate of the quantization unit 105 so as not to cause an overflow or underflow.

[Image Decoding Device Compatible with the AVC Encoding Method]

Figure 2:
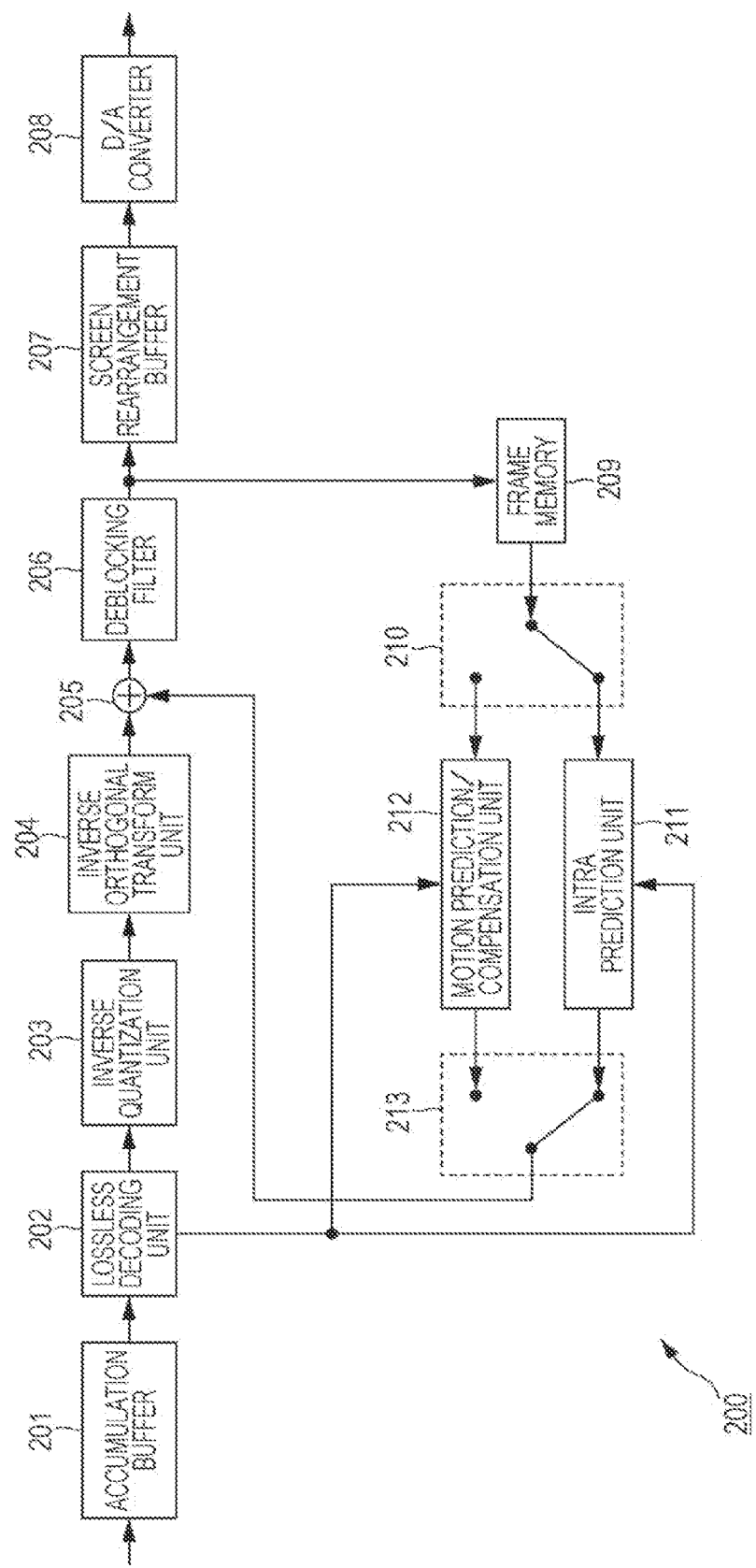
FIG. 2 is a block diagram showing an image decoding device that receives an input of compressed image information according to the AVC encoding method.

FIG. 2 is a block diagram showing a typical example structure of an image decoding device that realizes image compression through orthogonal transforms, such as discrete cosine transforms or Karhunen-Loeve transforms, and motion compensation. The image decoding device 200 shown in FIG. 2 is a decoding device that is compatible with the image encoding device 100 shown in FIG. 1.

Data encoded by the image encoding device 100 is supplied to the image decoding device 200 compatible with the image encoding device 100 via a passage such as a transmission path or a recording medium, and is then decoded.

As shown in FIG. 2, the image decoding device 200 includes an accumulation buffer 201, a lossless decoding unit 202, an inverse quantization unit 203, an inverse orthogonal transform unit 204, an arithmetic operation unit 205, a deblocking filter 206, a screen rearrangement buffer 207, and a D/A converter 208. The image decoding device 200 also includes a frame memory 209, a selection unit 210, an intra prediction unit 211, a motion prediction/compensation unit 212, and a selection unit 213.

The accumulation buffer 201 accumulates transmitted encoded data. The encoded data has been encoded by the image encoding device 100. The lossless decoding unit 202 decodes the encoded data read from the accumulation buffer 201 at a predetermined time, by a method compatible with the encoding method used by the lossless encoding unit 106 shown in FIG. 1.

When the current frame is an intra-encoded frame, the header portion of the encoded data stores intra prediction mode information. The lossless decoding unit 202 also decodes the intra prediction mode information, and supplies the resultant information to the intra prediction unit 211. When the current frame is an inter-encoded frame, on the other hand, the header portion of the encoded data stores motion vector information. The lossless decoding unit 202 also decodes the motion vector information, and supplies the resultant information to the motion prediction/compensation unit 212.

The inverse quantization unit 203 inversely quantizes the coefficient data (the quantized coefficient) decoded by the lossless decoding unit 202, by a method compatible with the quantization method used by the quantization unit 105 shown in FIG. 1. That is, the inverse quantization unit 203 inversely quantizes the quantized coefficient by the same method as the method used by the inverse quantization unit 108 shown in FIG. 1.

The inverse quantization unit 203 supplies the inversely-quantized coefficient data, or the orthogonal transform coefficient, to the inverse orthogonal transform unit 204. The inverse orthogonal transform unit 204 subjects the orthogonal transform coefficient to an inverse orthogonal transform by a method compatible with the orthogonal transform method used by the orthogonal transform unit 104 shown in FIG. 1 (the same method as the method used by the inverse orthogonal transform unit 109 shown in FIG. 1), and obtains decoded residual error data corresponding to the residual error data from the time prior to the orthogonal transform performed by the image encoding device 100. For example, a fourth-order inverse orthogonal transform is performed.

The decoded residual error data obtained through the inverse orthogonal transform is supplied to the arithmetic operation unit 205. A predicted image is also supplied to the arithmetic operation unit 205 from the intra prediction unit 211 or the motion prediction/compensation unit 212 via the selection unit 213.

The arithmetic operation unit 205 adds the decoded residual error data to the predicted image, and obtains decoded image data corresponding to the image data from the time prior to the predicted image subtraction performed by the arithmetic operation unit 103 of the image encoding device 100. The arithmetic operation unit 205 supplies the decoded image data to the deblocking filter 206.

The deblocking filter 206 removes block distortions from the supplied decoded images, and supplies the images to the screen rearrangement buffer 207.

The screen rearrangement buffer 207 performs image rearrangement. Specifically, the frame sequence rearranged in the encoding order by the screen rearrangement buffer 102 shown in FIG. 1 is rearranged in the original displaying order. The D/A converter 208 performs a D/A conversion on the images supplied from the screen rearrangement buffer 207, and outputs the converted images to a display (not shown) to display the images.

The output of the deblocking filter 206 is further supplied to the frame memory 209.

The frame memory 209, the selection unit 210, the intra prediction unit 211, the motion prediction/compensation unit 212, and the selection unit 213 are equivalent to the frame memory 112, the selection unit 113, the intra prediction unit 114, the motion prediction/compensation unit 115, and the selection unit 116 of the image encoding device 100, respectively.

The selection unit 210 reads, from the frame memory 209, an image to be inter-processed and an image to be referred to, and supplies the images to the motion prediction/compensation unit 212. The selection unit 210 also reads an image to be used for intra predictions from the frame memory 209, and supplies the image to the intra prediction unit 211.

Information that has been obtained by decoding the header information and indicates an intra prediction mode or the like is supplied, where appropriate, from the lossless decoding unit 202 to the intra prediction unit 211. Based on the information, the intra prediction unit 211 generates a predicted image from the reference image obtained from the frame memory 209, and supplies the generated predicted image to the selection unit 213.

The motion prediction/compensation unit 212 obtains the information obtained by decoding the header information (prediction mode information, motion vector information, reference frame information, a flag, respective parameters, and the like), from the lossless decoding unit 202.

Based on the information supplied from the lossless decoding unit 202, the motion prediction/compensation unit 212 generates a predicted image from the reference image obtained from the frame memory 209, and supplies the generated predicted image to the selection unit 213.

The selection unit 213 selects a predicted image generated by the motion prediction/compensation unit 212 or the intra prediction unit 211, and supplies the selected predicted image to the arithmetic operation unit 205.

[Motion Prediction/Compensation Operation with Decimal Pixel Precision]

By an encoding method such as MPEG2, motion prediction/compensation operations with ½ pixel precision are performed through linear interpolations. By the AVC encoding method, on the other hand, motion prediction/compensation operations with ¼ pixel precision using a 6-tap FIR filter are performed, and encoding efficiency is increased accordingly.

Figure 3:
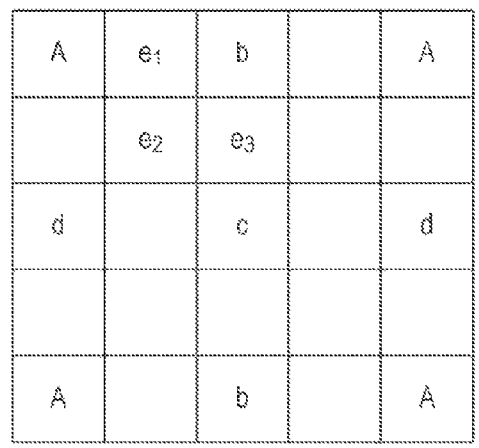
FIG. 3 is a diagram showing an example motion prediction/compensation operation with decimal pixel precision.

FIG. 3 is a diagram for explaining an example motion prediction/compensation operation with ¼ pixel precision specified by the AVC encoding method. In FIG. 3, each square represents a pixel. Among those squares, each A represents the position of an integer precision pixel stored in the frame memory 112, b, c, and d represent the positions of ½ precision pixels, and $e_1$, $e_2$, and $e_3$ represent the positions of ¼ precision pixels.

In the following, the function Clip 1( ) is defined as shown in the following equation (1):

[Mathematical Formula 1]

$$\text{Clip1}(a) = \begin{cases} 0; & \text{if } (a < 0) \\ a; & \text{otherwise} \\ \text{max\_pix}; & \text{if } (a > \text{max\_pix}) \end{cases} \quad (1)$$

When an input image has 8-bit precision, for example, the value of max_pix in the equation (1) is 255.

The pixel values in the positions represented by b and d are generated by using a 6-tap FIR filter, as shown in the following equations (2) and (3):

[Mathematical Formula 2]

$$F = A_{-2} - 5 \cdot A_{-1} + 20 \cdot A_0 + 20 \cdot A_1 - 5 \cdot A_2 + A_3 \quad (2)$$

[Mathematical Formula 3]

$$b, d = \text{Clip 1}((F+16) >> 5) \quad (3)$$

The pixel value in the position represented by c is generated by using a 6-tap FIR filter in the horizontal direction and the vertical direction, as shown in the following equations (4) through (6):

[Mathematical Formula 4]

$$F = b_{-2} - 5 \cdot b_{-1} + 20 \cdot b_0 + 20 \cdot b_1 - 5 \cdot b_2 + b_3 \quad (4)$$

or

[Mathematical Formula 5]

$$F = d_{-2} - 5 \cdot d_{-1} + 20 \cdot d_0 + 20 \cdot d_1 - 5 \cdot d_2 + d_3 \quad (5)$$

[Mathematical Formula 6]

$$c = \text{Clip1}((F+512) >> 10) \quad (6)$$

The Clip operation is only once performed at last, after both the horizontal product-sum operation and the vertical product-sum operation are performed.

Meanwhile, $e_1$ through $e_3$ are generated through linear interpolations, as shown in the following equations (7) through (9):

[Mathematical Formula 7]

$$e_1 = (A+b+1) >> 1 \quad (7)$$

[Mathematical Formula 8]

$$e_2 = (b+d+1) >> 1 \quad (8)$$

[Mathematical Formula 9]

$$e_3 = (b+c+1) >> 1 \quad (9)$$

[Motion Prediction/Compensation Operation]

In MPEG2, each unit in motion prediction/compensation operations is 16×16 pixels in a frame motion compensation mode, and is 16×8 pixels in each of a first field and a second field in a field motion compensation mode. With such units, motion prediction/compensation operations are performed.

Figure 4:
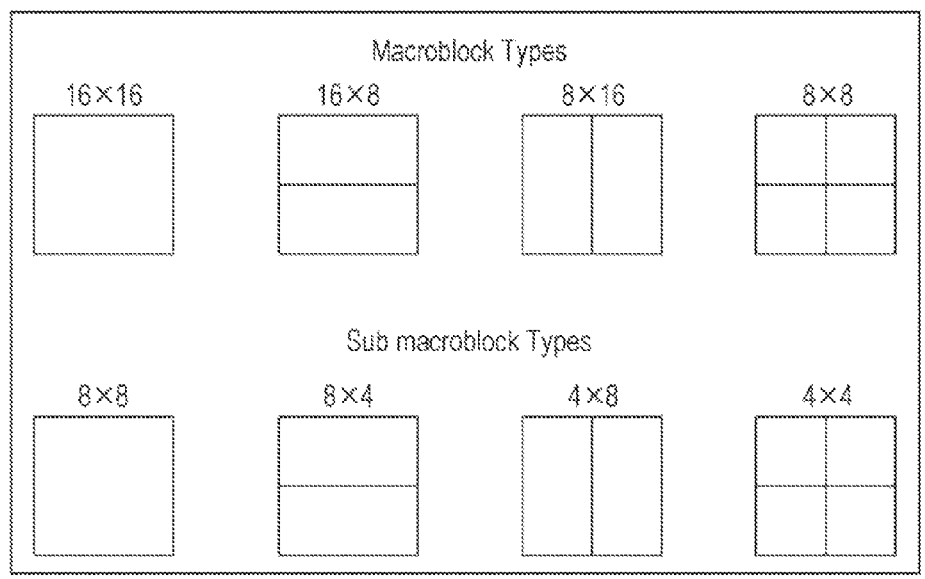
FIG. 4 is a diagram showing example macroblocks.

In AVC, on the other hand, each one macroblock formed with 16×16 pixels is divided into 16×16, 16×8, 8×16, or 8×8 parts, as shown in FIG. 4, and those parts can have motion vector information independently of one another on a sub macroblock basis. Each 8×8 part can be further divided into 8×8, 8×4, 4×8, or 4×4 sub macroblocks that can have motion vector information independently of one another, as shown in FIG. 4.

By the AVC image encoding method, however, there is a possibility that an enormous amount of motion vector information is generated if such motion prediction/compensation operations are performed, as in the case of MPEG2. Encoding the generated motion vector information without any change might lead to a decrease in encoding efficiency.

[Motion Vector Median Prediction]

To solve this problem, the method described below is used in AVC image encoding, and a decrease in the amount of encoded motion vector information is realized.

Figure 5:
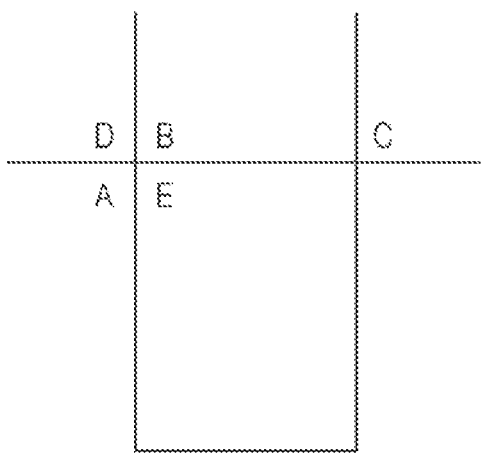
FIG. 5 is a diagram for explaining an example situation of a median operation.

Each straight line shown in FIG. 5 indicates a boundary between motion compensation blocks. In FIG. 5, E represents the current motion compensation block to be encoded, and A through D each represents a motion compensation block that has already been encoded and is adjacent to E.

Where X is A, B, C, D, or E, $mv_x$ represents the motion vector information about a block X.

By using the motion vector information about the motion compensation blocks A, B, and C, predicted motion vector information $pmv_E$ about the motion compensation block E is generated through a median operation as shown in the following equation (10):

[Mathematical Formula 10]

$$pmv_E = \text{med}(mv_A, mv_B, mv_C) \quad (10)$$

If the information about the motion compensation block C is "unavailable" because the block C is located at a corner of the image frame or the like, the information about the motion compensation block D is used instead.

In the compressed image information, the data $mvd_E$ to be encoded as the motion vector information about the motion compensation block E is generated by using $pmv_E$ as shown in the following equation (11).

[Mathematical Formula 11]

$$mvd_E = mv_E - pmv_E \quad (11)$$

In an actual operation, processing is performed on the horizontal component and the vertical component of the motion vector information independently of each other.

[Multi-Reference Frame]

In AVC, Multi-Reference Frame method, which is not specified by conventional image encoding methods such as MPEG2 or H.263, is specified.

Figure 6:
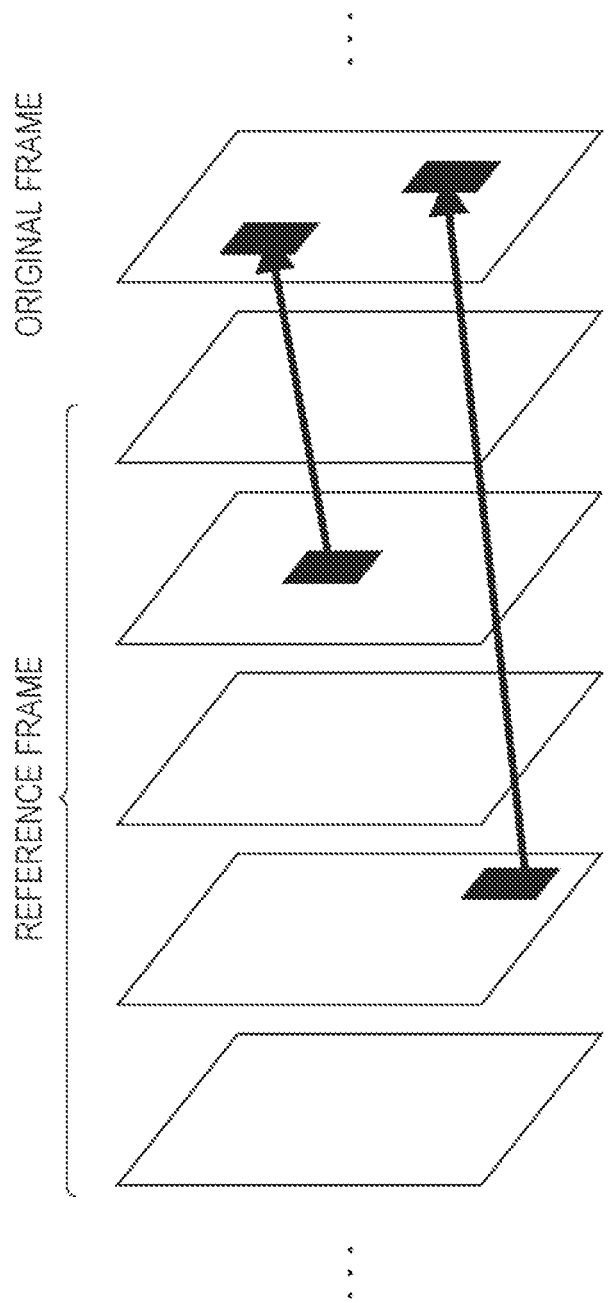
FIG. 6 is a diagram for explaining an example Multi-Reference Frame.

Referring now to FIG. 6, Multi-Reference Frame specified in AVC is described.

In MPEG-2 and H.263, a motion prediction/compensation operation is performed by referring to only one reference frame stored in a frame memory in the case of a P-picture. In AVC, however, more than one reference frame is stored in a memory, and a different memory can be referred to for each macroblock, as shown in FIG. 5.

[Direct Modes]

Although the amount of motion vector information in a B-picture is very large, there are predetermined modes called Direct Modes in AVC.

In Direct Modes, motion vector information is not stored in compressed image information. In an image decoding device, the motion vector information about a current block to be processed is calculated from the motion vector information about a peripheral block or the motion vector information about a co-located block that is a block located in the same position as the current block in a reference frame.

Direct Modes includes the two modes: Spatial Direct Mode and Temporal Direct Mode. One of the two modes can be selected for each slice.

In Spatial Direct Mode, the motion vector information $mv_E$ about the motion compensation block E to be processed is calculated as shown in the following equation (12):

$$mv_E = pmv_E \quad (12)$$

That is, motion vector information that is generated through a median prediction is applied to the current block.

Figure 7:
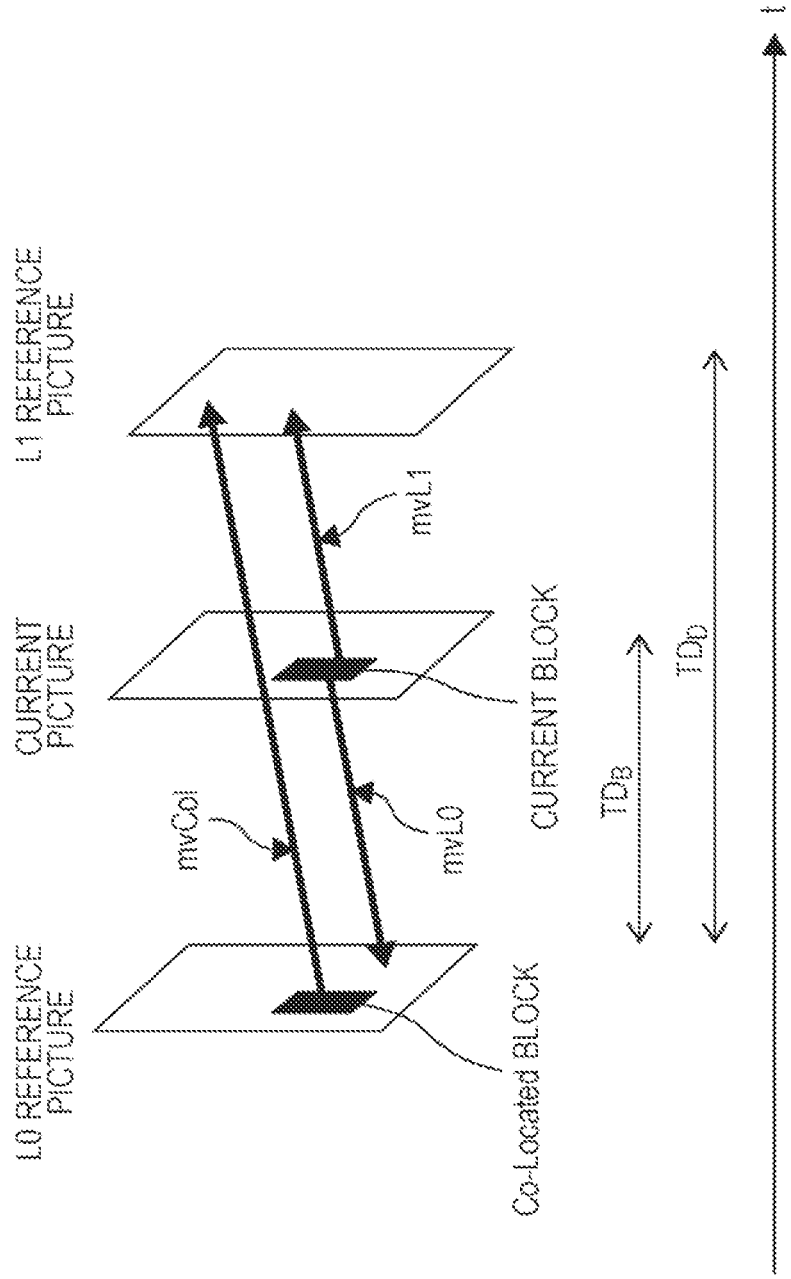
FIG. 7 is a diagram for explaining an example situation in Temporal Direct Mode.

Referring now to FIG. 7, Temporal Direct Mode is described.

In FIG. 7, the block located at the address of the same space as the current block in a L0 reference picture is referred to as a co-located block, and the motion vector information about the co-located block is represented by $mv_{col}$. Also, $TD_E$, represents the distance on the temporal axis between the current picture and the L0 reference picture, and $TD_D$ represents the distance on the temporal axis between the L0 reference picture and an L1 reference picture.

At this point, the motion vector information $mv_{L0}$ about L0 and the motion vector information $mv_{L1}$ about L1 in the current picture are calculated as shown in the following equations (13) and (14):

[Mathematical Formula 12]

$$mv_{L0} = \frac{TD_B}{TD_D} mv_{col} \quad (13)$$

[Mathematical Formula 13]

$$mv_{L1} = \frac{TD_D - TD_B}{TD_D} mv_{col} \quad (14)$$

In AVC compressed image information, information indicating a distance on the temporal axis TD does not exist, and therefore, the calculations according to the above mentioned equations (12) and (13) are performed by using POC (Picture Order Count).

In AVC compressed image information, Direct Modes can be defined on a 16×16 pixel macroblock basis or an 8×8 pixel block basis.

[Prediction Mode Selection]

To achieve higher encoding efficiency, it is critical to select an appropriate prediction mode by the AVC encoding method.

An example of such a selection method is a method stored in the H.264/MPEG-4 AVC reference software, called JM (Joint Model) (available from http://iphome.hhi.de/suehring/tml/index.htm).

In JM, a method of determining a mode between two modes, which are High Complexity Mode and Low Complexity Mode, can be selected as described below. In either of the modes, the cost function value as to each prediction mode is calculated, and the prediction mode that minimizes the cost function value is selected as the optimum mode for the current sub macroblock or the current macroblock.

A cost function in High Complexity Mode can be calculated as shown in the following equation (15):

$$\mathrm{Cost}(\mathrm{Mode} \in \Omega) = D + \lambda * R \quad (15)$$

Here, $\Omega$ represents the universal set of candidate modes for encoding the current block or macroblock, and D represents the difference energy between a decoded image and an input image when encoding is performed in the prediction mode. $\lambda$ represents the Lagrange's undetermined multiplier provided as the quantization parameter function. R represents the total bit rate in a case where encoding is performed in the mode, including the orthogonal transform coefficient.

That is, to perform encoding in High Complexity Mode, a provisional encoding operation needs to be performed in all the candidate modes to calculate the above parameters D and R, and therefore, a larger amount of calculation is required.

A cost function in Low Complexity Mode can be calculated as shown in the following equation (16):

$$\mathrm{Cost}(\mathrm{Mode} \in \Omega) = D + QP2\mathrm{Quant}(QP) * \mathrm{HeaderBit} \quad (16)$$

Here, D differs from that in High Complexity Mode, and represents the difference energy between a predicted image and an input image. QP2Quant(QP) is a function of a quantization parameter QP, and HeaderBit represents the bit rate related to information that excludes the orthogonal transform coefficient and belongs to Header, such as motion vectors and the mode.

That is, in Low Complexity Mode, a predicting operation needs to be performed for each of the candidate modes, but a decoded image is not required. Therefore, there is no need to perform an encoding operation. Accordingly, the calculation amount can be smaller than that in High Complexity Mode.

[Competition Among Motion Vectors]

To improve motion vector encoding using median predictions as described above with reference to FIG. 5, Non-Patent Document 1 suggests the method described below.

That is, in addition to "Spatial Predictor" determined through a median prediction and defined in AVC, one of "Temporal Predictor" and "Spatio-Temporal Predictor" described below can be adaptively used as predicted motion vector information.

Figure 8:
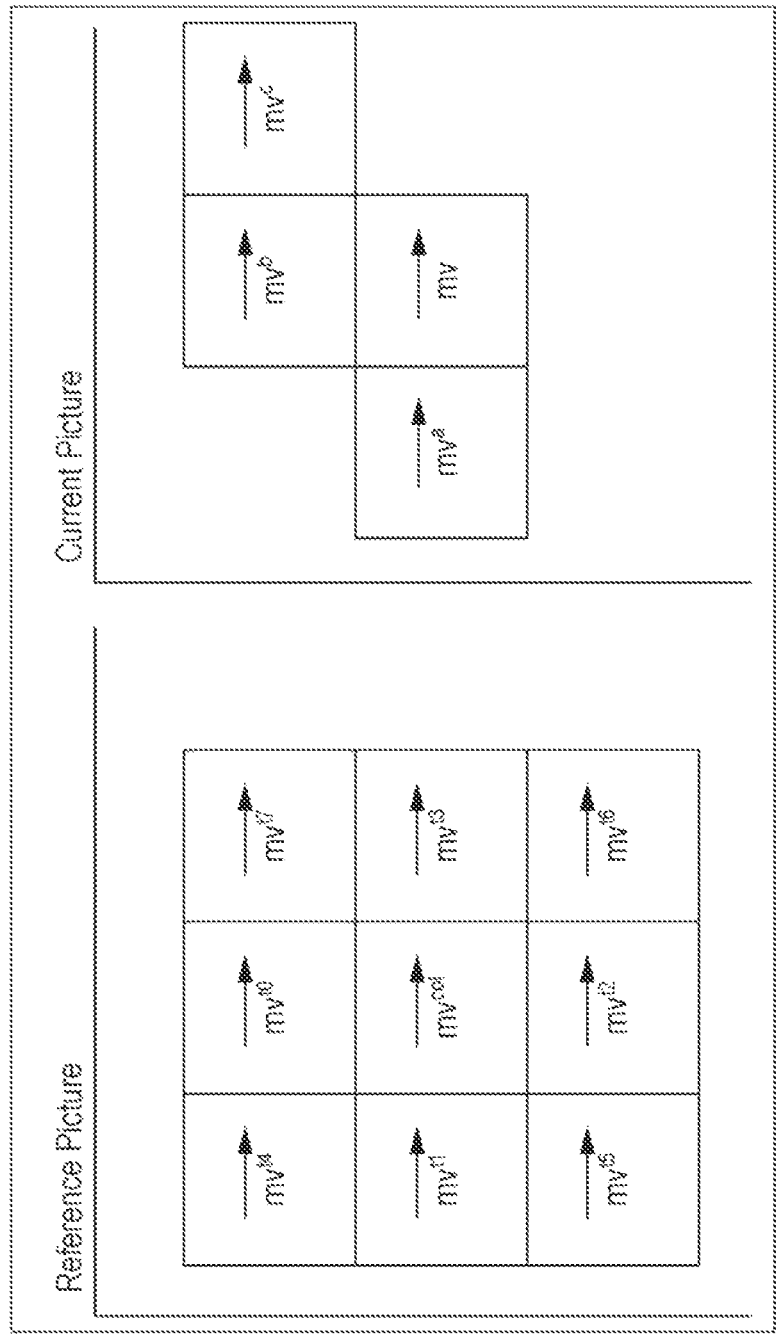
FIG. 8 is a diagram for explaining an example situation according to a motion vector encoding method suggested in Non-Patent Document 1.

Specifically, in FIG. 8, "mvcol" represents the motion vector information about a co-located block (a block having the same x-y coordinates as the current block in a reference image) of the current block, and "mvtk" (k being one of 0 through 8) represents the motion vector information about a peripheral block. The predicted motion vector information (Predictor) about each block is defined as shown in the following equations (17) through (19):

Temporal Predictor:
[Mathematical Formula 14]

$$mv_{tm5} = \mathrm{median}\{mv_{col}, mv_{t0}, \ldots, mv_{t3}\} \quad (17)$$

[Mathematical Formula 15]

$$mv_{tm9} = \mathrm{median}\{mv_{col}, mv_{t0}, \ldots, mv_{t8}\} \quad (18)$$

Spatio-Temporal Predictor:
[Mathematical Formula 16]

$$mv_{spt} = \mathrm{median}\{mv_{col}, mv_{col}, mv_a, mv_b, mv_c\} \quad (19)$$

In the image encoding device 100, the cost function values for respective blocks are calculated by using the predicted motion vector information about the respective blocks, and optimum predicted motion vector information is selected. Through the compressed image information, a flag indicating the information as to which predicted motion vector information has been used is transmitted for each block.

[Coding Unit]

The macroblock size of 16×16 pixels is not optimal for large frames such as UHD (Ultra High Definition: 4000×2000 pixels) frames to be encoded by a next-generation encoding method.

Figure 9:
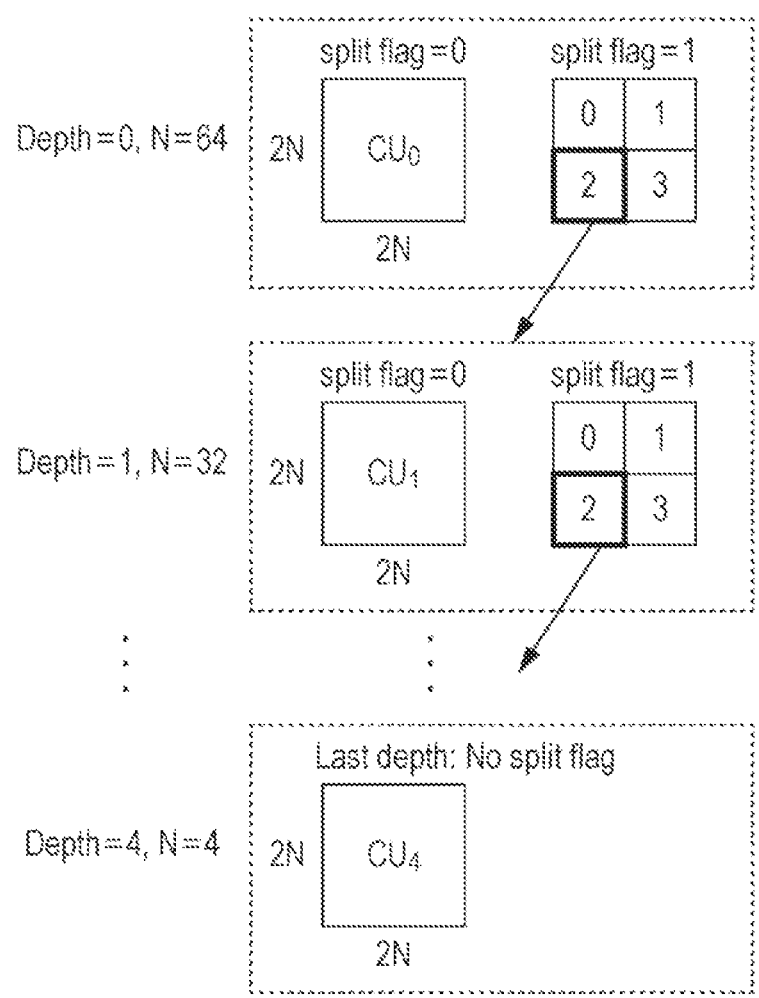
FIG. 9 is a diagram for explaining example structures of coding units.

In view of this, AVC specifies a hierarchical structure formed with macroblocks and sub macroblocks as shown in FIG. 4. In HEVC (High Efficiency Video Coding), however, coding units (CUs) are specified as shown in FIG. 9.

CUs are also called Coding Tree Blocks (CTBs), and are partial regions of picture-based images that have the same roles as those of macroblocks in AVC. While the size of the latter is limited to the size of 16×16 pixels, the size of the former is not limited to a certain size, and may be designated by the compressed image information in each sequence.

For example, in a sequence parameter set (SPS) contained in encoded data to be output, the largest coding unit (LCU) and the smallest coding unit (SCU) of the CUs are specified.

In each LCU, split-flag=1 is set within a range not lower than the SCU size, so that each LCU can be divided into CUs of a smaller size. In the example shown in FIG. 9, the size of the LCU is 128, and the greatest hierarchical depth is 5. When the value of split_flag is "1", a CU of 2N×2N in size is divided into CUs of N×N in size, which is one hierarchical level lower.

Each of the CUs is further divided into prediction units (PUs) that are processing-unit regions (partial regions of picture-based images) for intra or inter predictions, or are divided into transform units (TUs) that are processing-unit regions (partial regions of picture-based images) for orthogonal transforms. At present, 16×16 and 32×32 orthogonal transforms, as well as 4×4 and 8×8 orthogonal transforms, can be used in HEVC.

In a case where CUs are defined, and each processing operation is performed on the CU basis in an encoding operation as in the above described HEVC, the macroblocks in AVC can be considered equivalent to the LCUs. However, a CU has a hierarchical structure as shown in FIG. 9. Therefore, the size of the LCU on the highest hierarchical level is normally as large as 128×128 pixels, which is larger than the size of each macroblock in AVC, for example.

[Remarks on this Embodiment]

As described above, various predicted motion vectors are prepared. However, when predicted motion vector select information (pmv_index) indicating which predicted motion vector is to be adopted is encoded, a shorter code sequence to be assigned as binarized data is desirable, as the bit rate can be reduced with a shorter code sequence. That is, it is preferable to assign a shorter bit sequence to a predicted motion vector having a higher designation frequency.

However, the frequency varies depending on the contents of images and the like. Therefore, there might be a case where temporal_pmv is more frequently designated in an image, while spatial_pmv is more frequently designated in another image. In view of this, there is a possibility that bit sequences are not appropriately assigned to the respective predicted motion vectors with respect to the designation frequencies of the respective predicted motion vectors, and the encoding efficiency becomes lower.

Therefore, in the following description, a smaller code number is assigned to temporal_pmv when the current picture and the anchor picture containing temporal_pmv are close to each other in terms of displaying order, by taking advantage of the fact that there is a high possibility that motions of frames close to each other in terms of displaying order are similar. When the current picture and the anchor picture are large, a smaller code number is assigned to spatial_pmv. The following is a description of this method.

[Image Encoding Device]

Figure 10:
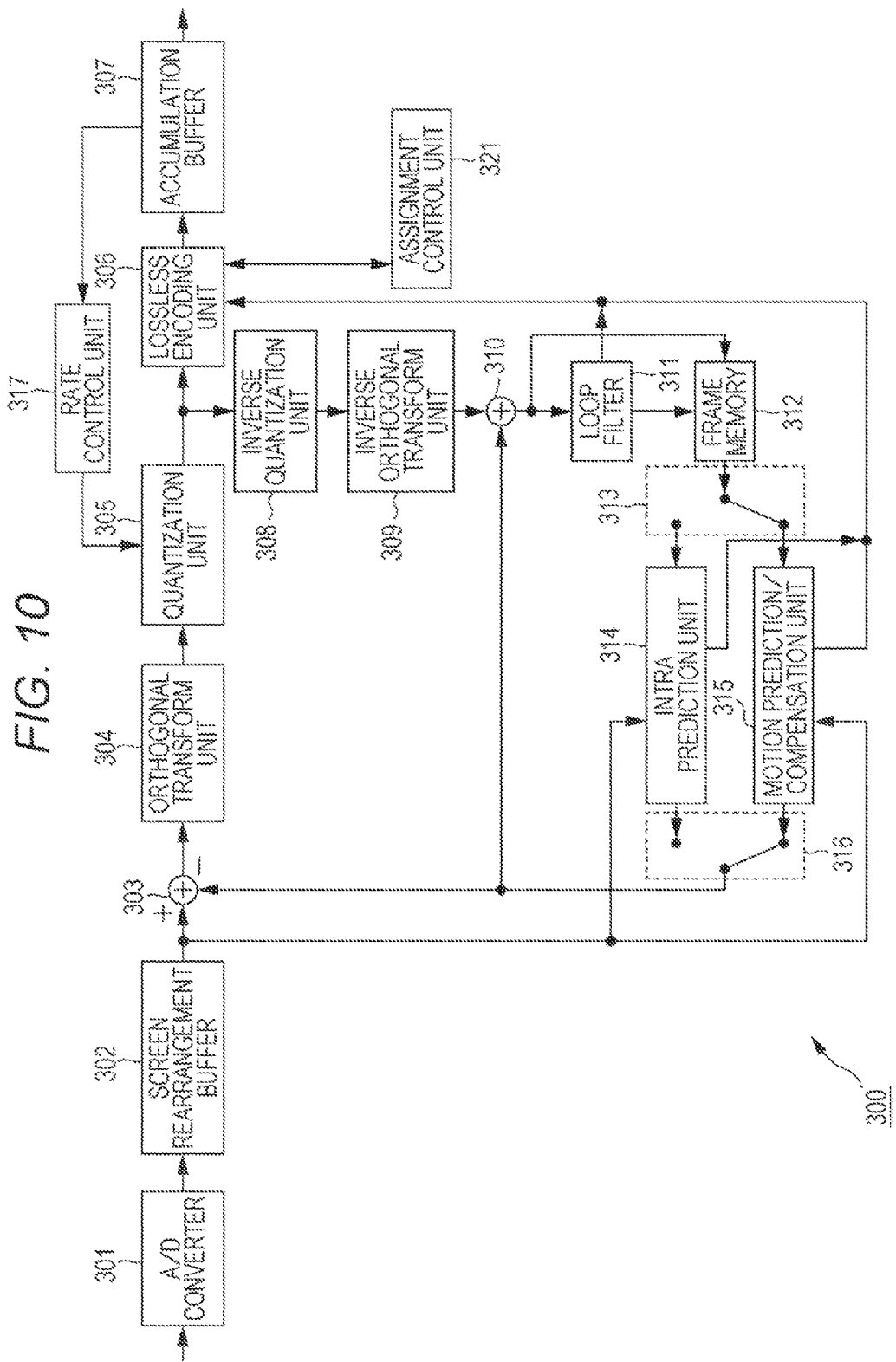
FIG. 10 is a block diagram showing a typical example structure of an image encoding device.

FIG. 10 is a block diagram showing a typical example structure of an image encoding device.

Figure 11:
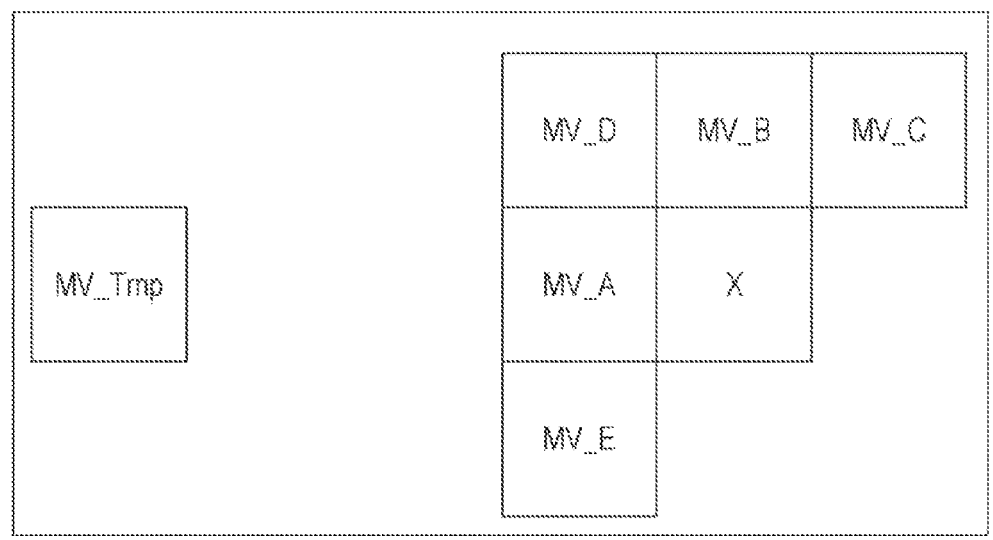
FIG. 11 is a diagram for explaining example candidate PMVs for AMVP.

The image encoding device 300 shown in FIG. 10 is basically the same device as the image encoding device 100 shown in FIG. 1, and encodes image data. As shown in FIG. 11, the image encoding device 300 includes an A/D converter 301, a screen rearrangement buffer 302, an arithmetic operation unit 303, an orthogonal transform unit 304, a quantization unit 305, a lossless encoding unit 306, and an accumulation buffer 307. The image encoding device 300 also includes an inverse quantization unit 308, an inverse orthogonal transform unit 309, an arithmetic operation unit 310, a loop filter 311, a frame memory 312, a selection unit 313, an intra prediction unit 314, a motion prediction/compensation unit 315, a selection unit 316, and a rate control unit 317.

The image encoding device 300 further includes an assignment control unit 321.

The A/D converter 301 performs an A/D conversion on input image data. The A/D converter 301 supplies and stores the converted image data (digital data) into the screen rearrangement buffer 302. The screen rearrangement buffer 302 rearranges the image frames stored in displaying order in accordance with the GOP, so that the frames are arranged in encoding order. The screen rearrangement buffer 302 supplies the image having the rearranged frame order to the arithmetic operation unit 303. The screen rearrangement buffer 302 also supplies the image having the rearranged frame order to the intra prediction unit 314 and the motion prediction/compensation unit 315.

The arithmetic operation unit 303 subtracts a predicted image supplied from the intra prediction unit 314 or the motion prediction/compensation unit 315 via the selection unit 316, from the image read from the screen rearrangement buffer 302. The arithmetic operation unit 303 then outputs the difference information to the orthogonal transform unit 304.

When intra encoding is performed on an image, for example, the arithmetic operation unit 303 subtracts a predicted image supplied from the intra prediction unit 314, from the image read from the screen rearrangement buffer 302. When inter encoding is performed on an image, for example, the arithmetic operation unit 303 subtracts a predicted image supplied from the motion prediction/compensation unit 315, from the image read from the screen rearrangement buffer 302.

The orthogonal transform unit 304 performs an orthogonal transform operation, such as a discrete cosine transform or a Karhunen-Loeve transform, on the difference information supplied from the arithmetic operation unit 303. This orthogonal transform is performed by any appropriate method. The orthogonal transform unit 304 supplies the transform coefficient to the quantization unit 305.

The quantization unit 305 quantizes the transform coefficient supplied from the orthogonal transform unit 304. Based on target bit rate value information supplied from the rate control unit 317, the quantization unit 305 sets a quantization parameter, and performs quantization. This quantization is performed by any appropriate method. The quantization unit 305 supplies the quantized transform coefficient to the lossless encoding unit 306.

The lossless encoding unit 306 encodes the transform coefficient quantized at the quantization unit 305 by an appropriate encoding method. Since the coefficient data has already been quantized under the control of the rate control unit 317, the bit rate becomes equal to the target value (or approximates the target value) that is set by the rate control unit 317.

The lossless encoding unit 306 obtains information indicating an intra prediction mode and the like from the intra prediction unit 314, and obtains information indicating an inter prediction mode, motion vector information, and the like from the motion prediction/compensation unit 315. The lossless encoding unit 306 further obtains the filter coefficient and the like used at the loop filter 311.

The lossless encoding unit 306 encodes those various kinds of information by an appropriate encoding method, and incorporates the information into (or multiplexes the information with) the header information of the encoded data. The lossless encoding unit 306 supplies the encoded data obtained through the encoding to the accumulation buffer 307 to accumulate the encoded data.

The encoding method used by the lossless encoding unit 306 may be variable-length encoding or arithmetic encoding, for example. The variable-length encoding may be CAVLC (Context-Adaptive Variable Length Coding) specified in H.264/AVC, for example. The arithmetic encoding may be CABAC (Context-Adaptive Binary Arithmetic Coding), for example.

The accumulation buffer 307 temporarily holds the encoded data supplied from the lossless encoding unit 306. The accumulation buffer 307 outputs the encoded data held therein to a recording device (a recording medium) or a transmission path or the like (not shown) in a later stage, for example, at a predetermined time.

The transform coefficient quantized at the quantization unit 305 is also supplied to the inverse quantization unit 308. The inverse quantization unit 308 inversely quantizes the quantized transform coefficient by a method compatible with the quantization performed by the quantization unit 305. The inverse quantization method may be any method as long as the method is compatible with the quantization operation performed by the quantization unit 305. The inverse quantization unit 308 supplies the obtained transform coefficient to the inverse orthogonal transform unit 309.

The inverse orthogonal transform unit 309 performs an inverse orthogonal transform on the transform coefficient supplied from the inverse quantization unit 308, by a method compatible with the orthogonal transform operation performed by the orthogonal transform unit 304. This inverse orthogonal transform may be performed by any method as long as the method is compatible with the orthogonal transform operation performed by the orthogonal transform unit 304. The output subjected to the inverse orthogonal transform (the restored difference information) is supplied to the arithmetic operation unit 310.

The arithmetic operation unit 310 obtains a locally decoded image (a decoded image) by adding the predicted image supplied from the intra prediction unit 314 or the motion prediction/compensation unit 315 via the selection unit 316 to the inverse orthogonal transform result supplied from the inverse orthogonal transform unit 309 or the restored difference information.

For example, when the difference information corresponds to an image to be intra-encoded, the arithmetic operation unit 310 adds the predicted image supplied from the intra prediction unit 314 to the difference information. When the difference information corresponds to an image to be inter-encoded, the arithmetic operation unit 310 adds the predicted image supplied from the motion prediction/compensation unit 315 to the difference information, for example.

The addition result (a decoded image) is supplied to the loop filter 311 or the frame memory 312.

The loop filter 311 includes a deblocking filter, an adaptive loop filter, and the like, and, where appropriate, performs a filtering operation on the decoded image supplied from the arithmetic operation unit 310. For example, the loop filter 311 removes block distortions from the decoded image by performing, on the decoded image, the same deblocking filtering operation as that performed by the deblocking filter 111. Also, the loop filter 311 improves image quality by performing a loop filtering operation using a Wiener filter on the result of the deblocking filtering operation (the decoded image from which block distortions have been removed).

Alternatively, the loop filter 311 may perform any appropriate filtering operation on the decoded image. Also, the loop filter 311 can supply the information such as the filter coefficient used in the filtering operation to the lossless encoding unit 306 to encode the information, where necessary.

The loop filter 311 supplies the result of the filtering operation (the decoded image after the filtering operation) to the frame memory 312. As described above, the decoded image that is output from the arithmetic operation unit 310 can be supplied to the frame memory 312 without passing through the loop filter 311. That is, the filtering operation by the loop filter 311 may be skipped.

The frame memory 312 stores the supplied decoded image, and supplies the stored decoded image as a reference image to the selection unit 313 at a predetermined time.

The selection unit 313 selects a supply destination of the reference image supplied from the frame memory 312. In the case of an intra prediction, for example, the selection unit 313 supplies the reference image supplied from the frame memory 312, to the intra prediction unit 314. In the case of an inter prediction, for example, the selection unit 313 supplies the reference image supplied from the frame memory 312, to the motion prediction/compensation unit 315.

The intra prediction unit 314 performs intra predictions (intra-screen predictions) to generate a predicted image by using the pixel values in the current picture that is the reference image supplied from the frame memory 312 via the selection unit 313. In the generation of the predicted image, a PU is used basically as a unit of processing. The intra prediction unit 314 performs intra predictions in more than one mode (intra prediction modes) that is prepared in advance. The intra prediction unit 314 can perform the intra predictions not only in the modes specified by the AVC encoding method but also in any other appropriate modes.

The intra prediction unit 314 generates predicted images in all the candidate intra prediction modes, evaluates the cost function values of the respective predicted images by using the input image supplied from the screen rearrangement buffer 102, and selects an optimum mode. After selecting the optimum intra prediction mode, the intra prediction unit 314 supplies the predicted image generated in the optimum intra prediction mode to the selection unit 316.

As described above, the intra prediction unit 314 also supplies the intra prediction mode information indicating the adopted intra prediction mode, to the lossless encoding unit 306 to encode the intra prediction mode information, where appropriate.

Using the input image supplied from the screen rearrangement buffer 302, and the reference image supplied from the frame memory 312 via the selection unit 313, the motion prediction/compensation unit 315 performs motion predictions (inter predictions), and performs a motion compensation operation in accordance with the detected motion vectors, to generate a predicted image (inter predicted image information). In the motion predictions, a PU is used basically as a unit of processing. The motion prediction/compensation unit 315 performs such inter predictions in more than one mode (inter prediction modes) that is prepared in advance. The motion prediction/compensation unit 315 can perform the inter predictions not only in the modes specified by the AVC encoding method but also in any other appropriate modes.

The motion prediction/compensation unit 315 generates predicted images in all the candidate inter prediction modes, evaluates the cost function values of the respective predicted images, and selects an optimum mode. After selecting the optimum inter prediction mode, the motion prediction/compensation unit 315 supplies the predicted image generated in the optimum intra prediction mode to the selection unit 316.

When the information indicating the selected inter prediction mode and encoded data are decoded, the motion prediction/compensation unit 315 supplies the necessary information for performing operations in the inter prediction mode, to the lossless encoding unit 306 to encode the information.

The selection unit 316 selects the supplier of the predicted image to be supplied to the arithmetic operation unit 303 and the arithmetic operation unit 310. In the case of intra encoding, for example, the selection unit 316 selects the intra prediction unit 314 as the supplier of a predicted image, and supplies the predicted image supplied from the intra prediction unit 314, to the arithmetic operation unit 303 and the arithmetic operation unit 310. In the case of inter encoding, for example, the selection unit 316 selects the motion prediction/compensation unit 315 as the supplier of a predicted image, and supplies the predicted image supplied from the motion prediction/compensation unit 315, to the arithmetic operation unit 303 and the arithmetic operation unit 310.

Based on the bit rate of the encoded data accumulated in the accumulation buffer 307, the rate control unit 317 controls the quantization operation rate of the quantization unit 305 so as not to cause an overflow or underflow.

The assignment control unit 321 controls assignment of a bit sequence (binarized data) to the predicted motion vector select information (pmv_index) indicating the adopted (selected) predicted motion vector at the lossless encoding unit 306. The assignment control unit 321 controls the assignment of a bit sequence (binarized data) in accordance with the distance between the current picture and the anchor picture in terms of displaying order.

[Bit Sequence Assignment Control]

Next, the assignment control by the assignment control unit 321 is described.

FIG. 11 is a diagram for explaining example candidate predicted motion vectors (PMVs) in AMVP. In FIG. 11, x is the current block. MV_A, MV_B, MV_C, MV_D, and MV_E are motion vectors (MVs) around the current block of the current picture, and are spatial_pmv. MV_Tmp is the MV of a co-located block located in the same position as x in an encoded picture, and is temporal_pmv. The anchor picture is normally the encoded picture that is the closest to the current picture on the L1 side.

Figure 12:
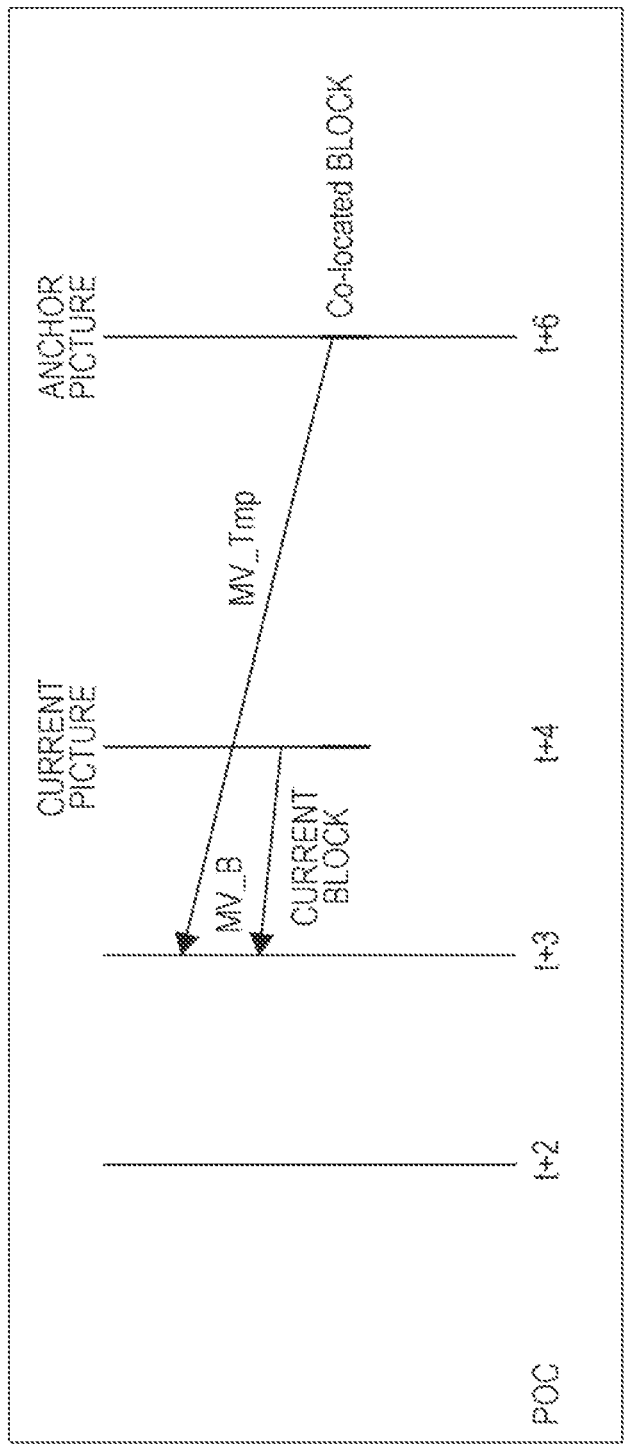
FIG. 12 is a diagram for explaining the relationship between MV_Tmp and the difference between the current picture and the anchor picture in terms of displaying order.

FIG. 12 is a diagram showing an example motion vector correlation in a case where the POC (Picture Order Count) difference dPOC between the current picture and the anchor picture is 2. In the diagram, t+4 is the POC of the current picture, and t+6 is the POC of the anchor picture. The bold line in the current picture represents the current block. The motion vectors (MVs) around the current block are spatial_pmv. In this diagram, one of the motion vectors is shown as MV_B. The bold line in the anchor picture indicates the co-located block. The motion vector MV_Tmp is temporal_pmv.

Figure 13:
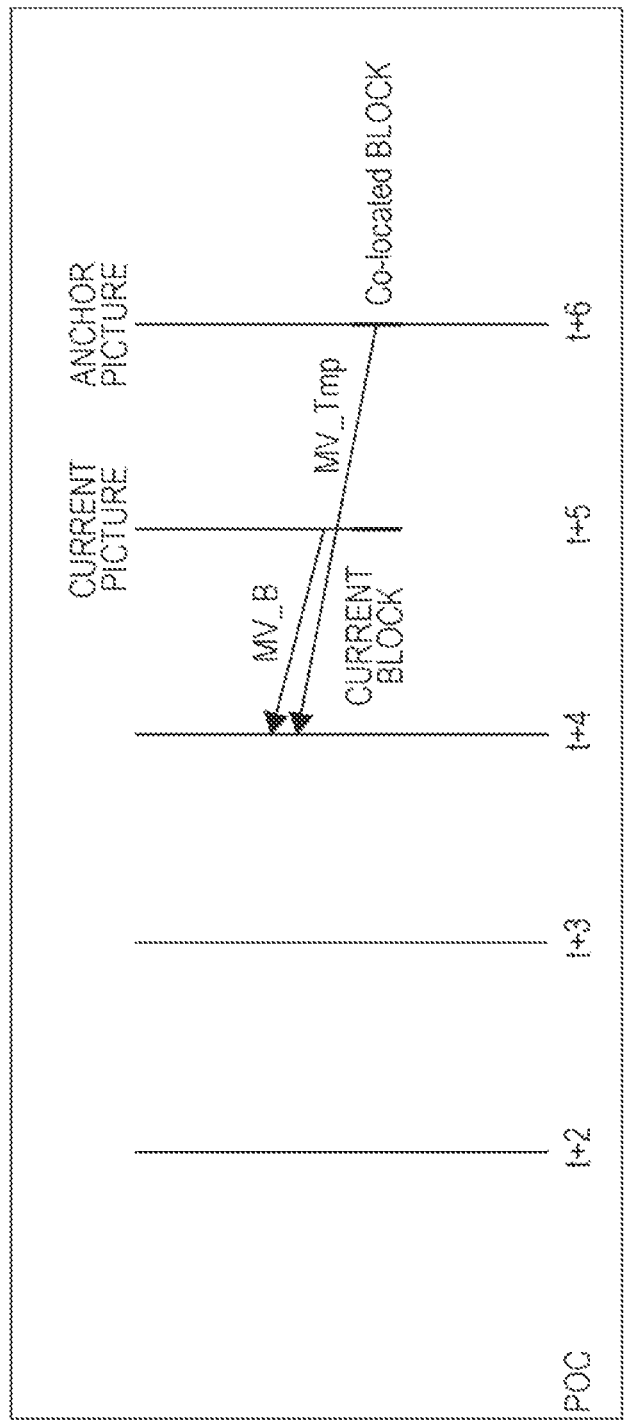
FIG. 13 is a diagram for explaining the relationship between MV_Tmp and the difference between the current picture and the anchor picture in terms of displaying order.

FIG. 13 is a diagram showing an example motion vector correlation in a case where the POC difference dPOC between the current picture and the anchor picture is 1.

As can be seen from a comparison between the example shown in FIG. 12 and the example shown in FIG. 13, temporal_pmv (MV_Tmp) is closer to spatial_pmv (MV_B) in the example shown in FIG. 13 than in the example shown in FIG. 12. That is, the smaller the dPOC, the higher the temporal_pmv prediction accuracy.

In view of this, when the dPOC is small, the assignment control unit 321 assigns a short bit sequence to temporal_pmv, and, when the dPOC is large, the assignment control unit 321 assigns a short bit sequence to spatial_pmv. By controlling the bit sequence assignment in the above manner, the assignment control unit 321 can reduce the bit rate of the predicted motion vector select information (pmv_index) for designating a candidate PMV having a high possibility to achieve high prediction accuracy.

[Lossless Encoding Unit and Assignment Control Unit]

Figure 14:
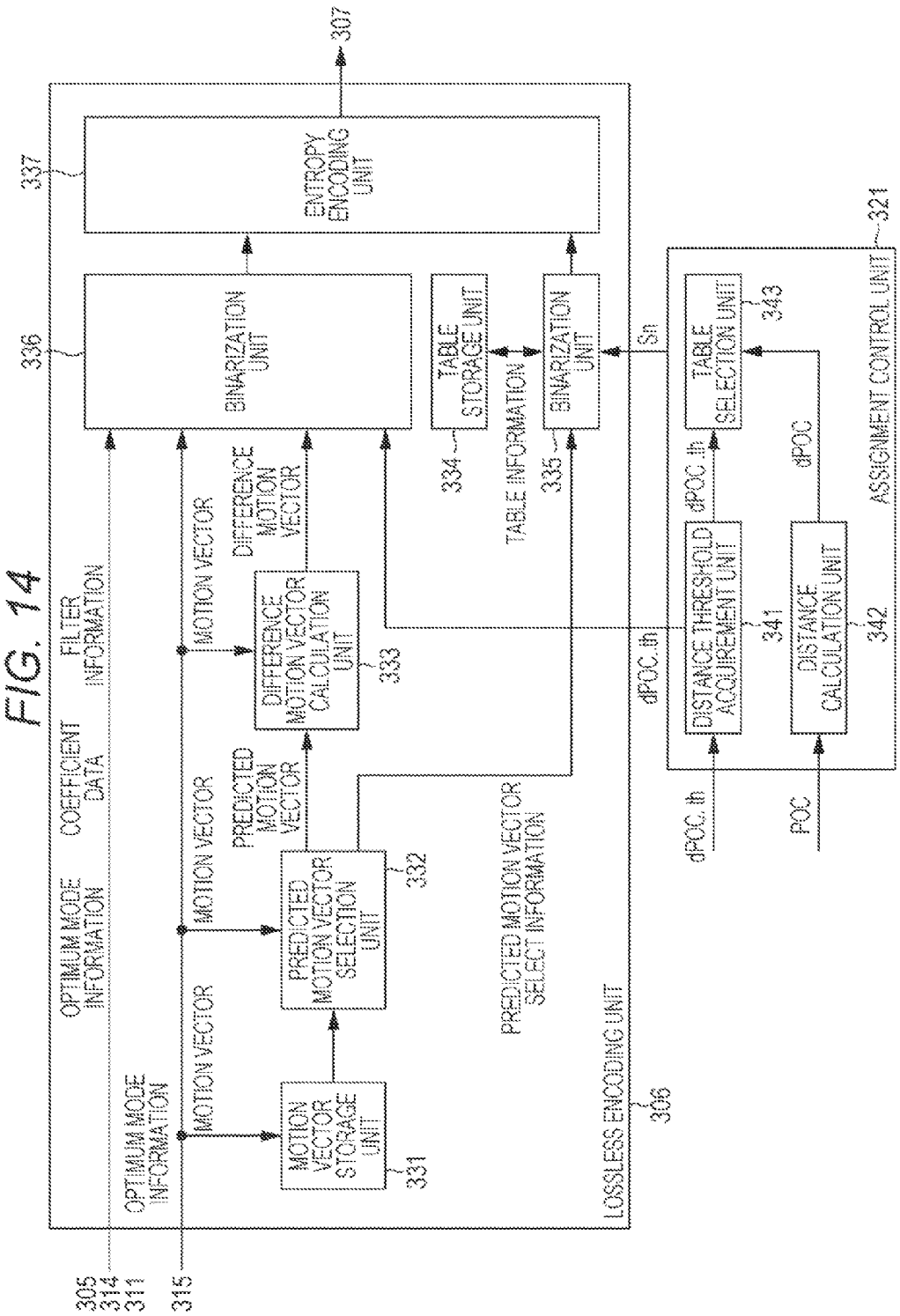
FIG. 14 is a block diagram showing typical example structures of the lossless encoding unit and the assignment control unit shown in FIG. 11.

FIG. 14 is a block diagram showing typical example structures of the lossless encoding unit 306 and the assignment control unit 321 shown in FIG. 10.

As shown in FIG. 14, the lossless encoding unit 306 includes a motion vector storage unit 331, a predicted motion vector selection unit 332, a difference motion vector calculation unit 333, a table storage unit 334, a binarization unit 335, a binarization unit 336, and an entropy encoding unit 337.

The assignment control unit 321 includes a distance threshold acquirement unit 341, a distance calculation unit 342, and a table selection unit 343.

The motion vector storage unit 331 stores the motion vector of the current PU to be processed. The motion vector of the current PU is contained in optimum mode information supplied from the motion prediction/compensation unit 315. In an operation to be performed for another region in a later stage in terms of time, the motion vector storage unit 331 supplies stored motion vectors as candidate predicted motion vectors to the predicted motion vector selection unit 332.

The predicted motion vector selection unit 332 acquires the motion vectors stored in the motion vector storage unit 331, as the candidate predicted motion vectors, and selects, from the candidate predicted motion vectors, the motion vector closest to the motion vector of the current PU contained in the optimum mode information supplied from the motion prediction/compensation unit 315, as the predicted motion vector. The predicted motion vector selection unit 332 supplies the selected motion vector as the predicted motion vector to the difference motion vector calculation unit 333. The predicted motion vector selection unit 332 also supplies predicted motion vector select information indicating which candidate predicted motion vector has been selected as the predicted motion vector, to the binarization unit 335.

The difference motion vector calculation unit 333 calculates a difference motion vector that is the difference between the predicted motion vector supplied from the predicted motion vector selection unit 332 and the motion vector of the current PU contained in the optimum mode information supplied from the motion prediction/compensation unit 315. The difference motion vector calculation unit 333 supplies the calculated difference motion vector to the binarization unit 336.

The table storage unit 334 stores table information that designates the bit sequence (binarized data) to be assigned to the predicted motion vector select information in accordance with the type of the vector selected as the predicted motion vector. The table storage unit 334 stores different sets of table information indicating different methods of bit sequence assignment in accordance with the types of vectors.

FIG. 15 is a diagram showing an example of the table information.

In the table information in FIG. 15, the bit sequence column shows the values of the bit sequences to be assigned. The S1 column shows the type of predicted motion vectors to which the respective bit sequences are to be assigned. The S2 column is the same as the S1 column, but differs from the S1 column in the correspondence relationship with the bit sequences.

According to the assignment pattern of S1, for example, when the predicted motion vector is the median value (Median) (spatial_pmv) of MV_A, MV_B, and MV_C, the bit sequence "1" of 1 bin in code length is assigned. When the predicted motion vector is MV_A, the bit sequence "010" of 3 bins in code length is assigned. Likewise, when the predicted motion vector is MV_B, the bit sequence "011" of 3 bins in code length is assigned. When the predicted motion vector is MV_C, the bit sequence "00100" of 5 bins in code length is assigned. When the predicted motion vector is MV_E, the bit sequence "00101" of 5 bins in code length is assigned. When the predicted motion vector is MV_D, the bit sequence "00110" of 5 bins in code length is assigned.

When the predicted motion vector is MV_Tmp (temporal_pmv), the bit sequence "00111" of 5 bins in code length is assigned.

That is, in the case of S1, a shorter bit sequence is assigned to spatial_pmv, and a longer bit sequence is assigned to temporal_pmv.

According to the assignment pattern of S2, on the other hand, when the predicted motion vector is MV_Tmp (temporal_pmv), the bit sequence "1" of 1 bin in code length is assigned, for example.

When the predicted motion vector is the median value (Median) (spatial_pmv) of MV_A, MV_B, and MV_C, the bit sequence "010" of 3 bins in code length is assigned. When the predicted motion vector is MV_A, the bit sequence "011" of 3 bins in code length is assigned. Likewise, when the predicted motion vector is MV_B, the bit sequence "00100" of 5 bins in code length is assigned. When the predicted motion vector is MV_C, the bit sequence "00101" of 5 bins in code length is assigned. When the predicted motion vector is MV_E, the bit sequence "00110" of 5 bins in code length is assigned. When the predicted motion vector is MV_D, the bit sequence "00111" of 5 bins in code length is assigned.

That is, in this case, a longer bit sequence is assigned to spatial_pmv, and a shorter bit sequence is assigned to temporal_pmv.

Referring back to FIG. 14, the table storage unit 334 stores different sets of table information showing different correspondence relationships, such as a table containing the "bit sequence" column and the "S1" column, and a table containing the "bit sequence" column and the "S2" column.

The code numbers shown in the example in FIG. 15 are virtual information for identifying the respective bit sequences, and therefore, have any values.

Although the table storage unit 334 stores sets of table information in the above description, more than one pattern should be prepared for assignment of bit sequences to the types of predicted motion vectors, and the assignment patterns of the respective bit sequences may be put into a single set of table information as shown in the example in FIG. 15.

The binarization unit 335 shown in FIG. 14 refers to the table information of the assignment pattern (Sn) that is stored in the table storage unit 334 and is selected by the table selection unit 343 of the assignment control unit 321, and, in accordance with the assignment pattern, binarizes the predicted motion vector select information (pmv_index) supplied from the predicted motion vector selection unit 332 (or transforms the predicted motion vector select information into the bit sequence assigned according to the table information). After the binarization, the binarization unit 335 supplies the binarized data to the entropy encoding unit 337.

The binarization unit 336 binarizes various kinds of information, such as the quantized coefficient data supplied from the quantization unit 305, the optimum mode information (such as the intra prediction mode information) supplied from the intra prediction unit 314, and filter information (containing the filter coefficient and the like) supplied from the loop filter 311, and supplies the binarized data to the entropy encoding unit 337.

The binarization unit 336 also binarizes the optimum mode information supplied from the motion prediction/compensation unit 315, and supplies the binarized data to the entropy encoding unit 337.

The binarization unit 336 further binarizes the difference motion vector supplied from the difference motion vector calculation unit 333, and supplies the binarized data to the entropy encoding unit 337.

The binarization unit 336 also binarizes a distance threshold dPOC_th supplied from the distance threshold acquirement unit 341 of the assignment control unit 321, and supplies the binarized data to the entropy encoding unit 337.

The entropy encoding unit 337 encodes the respective sets of binarized data supplied from the binarization unit 335 and the binarization unit 336, generates information such as header information where necessary, combines the respective sets of information, and supplies the combined information as a stream to the accumulation buffer 307 to accumulate the information.

The distance threshold acquirement unit 341 acquires the distance threshold dPOC_th from outside. This distance threshold dPOC_th is a threshold value for the assignment control unit 321 to control the bit sequence assignment pattern in accordance with the POC difference dPOC between the current picture and the anchor picture, or the distance between the current picture and the anchor picture in terms of displaying order.

This distance threshold dPOC_th may be set in any appropriate manner. For example, the distance threshold dPOC_th may be set in accordance with an instruction from a user, may be determined in accordance with the processing capability of the image encoding device 300, or may be set in accordance with the contents of the image.

After acquiring the distance threshold dPOC_th, which has been determined in some manner, from outside, the distance threshold acquirement unit 341 supplies the distance threshold dPOC_th to the table selection unit 343, so that the distance threshold dPOC_th is used in selecting a table (or selecting an assignment pattern).

The distance threshold acquirement unit 341 also supplies the acquired distance threshold dPOC_th to the binarization unit 336 of the lossless encoding unit 306, so that the distance threshold dPOC_th is supplied to the decoding side.

The distance calculation unit 342 counts the POC of each picture, and calculates the POC difference dPOC between the current picture and the anchor picture. The distance calculation unit 342 supplies the difference dPOC to the table selection unit 343.

The table selection unit 343 compares the difference (distance) dPOC supplied from the distance calculation unit 342 with the distance threshold dPOC_th supplied from the distance threshold acquirement unit 341, and, in accordance with the comparison result, selects a table (a bit sequence assignment pattern) Sn.

In the example case shown in FIG. 15, when the distance dPOC is longer than the distance threshold dPOC_th (or when the distance dPOC is equal to or longer than the distance threshold dPOC_th), spatial_pmv is prioritized, and accordingly, the table selection unit 343 selects S1, so that a shorter bit sequence is assigned to spatial_pmv. When the distance dPOC is equal to or shorter than the distance threshold dPOC_th (or when the distance dPOC is shorter than the distance threshold dPOC_th), temporal_pmv is prioritized, and accordingly, the table selection unit 343 selects S2, so that a shorter bit sequence is assigned to temporal_pmv.

The table selection unit 343 supplies the selection result Sn to the binarization unit 335 of the lossless encoding unit 306.

As described above, the assignment control unit 321 can appropriately control the bit sequence assignment in accordance with the distance (dPOC) between the current picture and the anchor picture in terms of displaying order. That is, the assignment control unit 321 can assign a bit sequence having a shorter code length to the selection information about a motion vector having a higher designation frequency. In other words, the assignment control unit 321 can assign a bit sequence having a longer code length to the selection information about a motion vector having a lower designation frequency. Accordingly, the lossless encoding unit 306 can reduce the bit rate of the predicted motion vector select information (pmv_index). In this manner, the image encoding device 300 can increase encoding efficiency.

[Encoding Operation Flow]

Next, the flow of each operation to be performed by the above described image encoding device 300 is described. Referring first to the flowchart shown in FIG. 16, an example flow of an encoding operation is described.

There are cases where the processing data units in the respective steps differ from one another. Therefore, in practice, the procedures of the respective steps might be carried out in parallel, or the sequence of the procedures might be changed. The same applies to the other operations described later.

In step S301, the A/D converter 301 performs an A/D conversion on input images. In step S302, the screen rearrangement buffer 302 stores the images subjected to the A/D conversion, and rearranges the respective pictures in encoding order, instead of displaying order.

In step S303, the intra prediction unit 314 performs intra prediction operations in intra prediction modes. In step S304, the motion prediction/compensation unit 315 performs inter motion prediction operations to perform motion predictions and motion compensation in inter prediction modes.

In step S305, the selection unit 316 determines an optimum mode based on the respective cost function values that are output from the intra prediction unit 314 and the motion prediction/compensation unit 315. That is, the selection unit 316 selects the predicted image generated by the intra prediction unit 314 or the predicted image generated by the motion prediction/compensation unit 315.

The selection information indicating which predicted image has been selected is supplied to the intra prediction unit 314 or the motion prediction/compensation unit 315, whichever has generated the selected predicted image. When the predicted image generated in the optimum intra prediction mode is selected, the intra prediction unit 314 supplies the intra prediction mode information indicating the optimum intra prediction mode and the like to the lossless encoding unit 306. When the predicted image generated in the optimum inter prediction mode is selected, the motion prediction/compensation unit 315 outputs the information indicating the optimum inter prediction mode to the lossless encoding unit 306.

In step S306, the arithmetic operation unit 303 calculates the difference between the images rearranged in the procedure of step S302 and the predicted image selected in the procedure of step S305. The predicted image is supplied to the arithmetic operation unit 303 via the selection unit 316 from the motion prediction/compensation unit 315 when an inter prediction is performed, and from the intra prediction unit 314 when an intra prediction is performed.

The data amount of the difference data is smaller than that of the original image data. Accordingly, the data amount can be made smaller than in a case where images are directly encoded.

In step S307, the orthogonal transform unit 304 performs an orthogonal transform on the difference information generated in the procedure of step S306. Specifically, an orthogonal transform such as a discrete cosine transform or a Karhunen-Loeve transform is performed, and a transform coefficient is output.

In step S308, the quantization unit 305 quantizes the orthogonal transform coefficient obtained in the procedure of step S307.

The difference information quantized in the procedure of step S308 is locally decoded in the following manner. In step S309, the inverse quantization unit 308 inversely quantizes the quantized orthogonal transform coefficient (also referred to as the quantized coefficient) generated in the procedure of step S308, using properties compatible with the properties of the quantization unit 305. In step S310, the inverse orthogonal transform unit 309 performs an inverse orthogonal transform on the orthogonal transform coefficient obtained in the procedure of step S307, using properties compatible with the properties of the orthogonal transform unit 304.

In step S311, the arithmetic operation unit 310 adds the predicted image to the locally decoded difference information, and generates a locally decoded image (an image corresponding to the input to the arithmetic operation unit 303). In step S312, the loop filter 311 performs a loop filtering operation including a deblocking filtering operation and an adaptive loop filtering operation on the locally decoded image obtained in the procedure of step S311, where appropriate.

In step S313, the frame memory 312 stores the decoded image subjected to the loop filtering operation in the procedure of step S312. Images that are not subjected to filtering operations by the loop filter 311 are also supplied from the arithmetic operation unit 310, and are stored into the frame memory 312.

In step S314, the lossless encoding unit 306 encodes the transform coefficient quantized in the procedure of step S308. That is, lossless encoding such as variable-length encoding or arithmetic encoding is performed on the difference image.

The lossless encoding unit 306 also encodes the quantization parameter calculated in step S308, and adds the encoded quantization parameter to the encoded data. The lossless encoding unit 306 also encodes the information about the mode of the predicted image selected in the procedure of step S305, and adds the encoded information to the encoded data obtained by encoding the difference image. That is, the lossless encoding unit 306 also encodes the optimum intra prediction mode information supplied from the intra prediction unit 314 or the optimum inter prediction mode supplied from the motion prediction/compensation unit 315, and adds the encoded information to the encoded data.

In step S315, the accumulation buffer 307 accumulates the encoded data that is output from the lossless encoding unit 306. The encoded data accumulated in the accumulation buffer 307 is read where appropriate, and is transmitted to the decoding side via a transmission path or a recording medium.

In step S316, based on the bit rate (bit generation rate) of the encoded data that is accumulated in the accumulation buffer 307 in the procedure of step S315, the rate control unit 317 controls the quantization operation rate of the quantization unit 305 so as not to cause an overflow or underflow.

When the procedure of step S316 is completed, the encoding operation comes to an end.

[Lossless Encoding Operation Flow]

Figure 16:
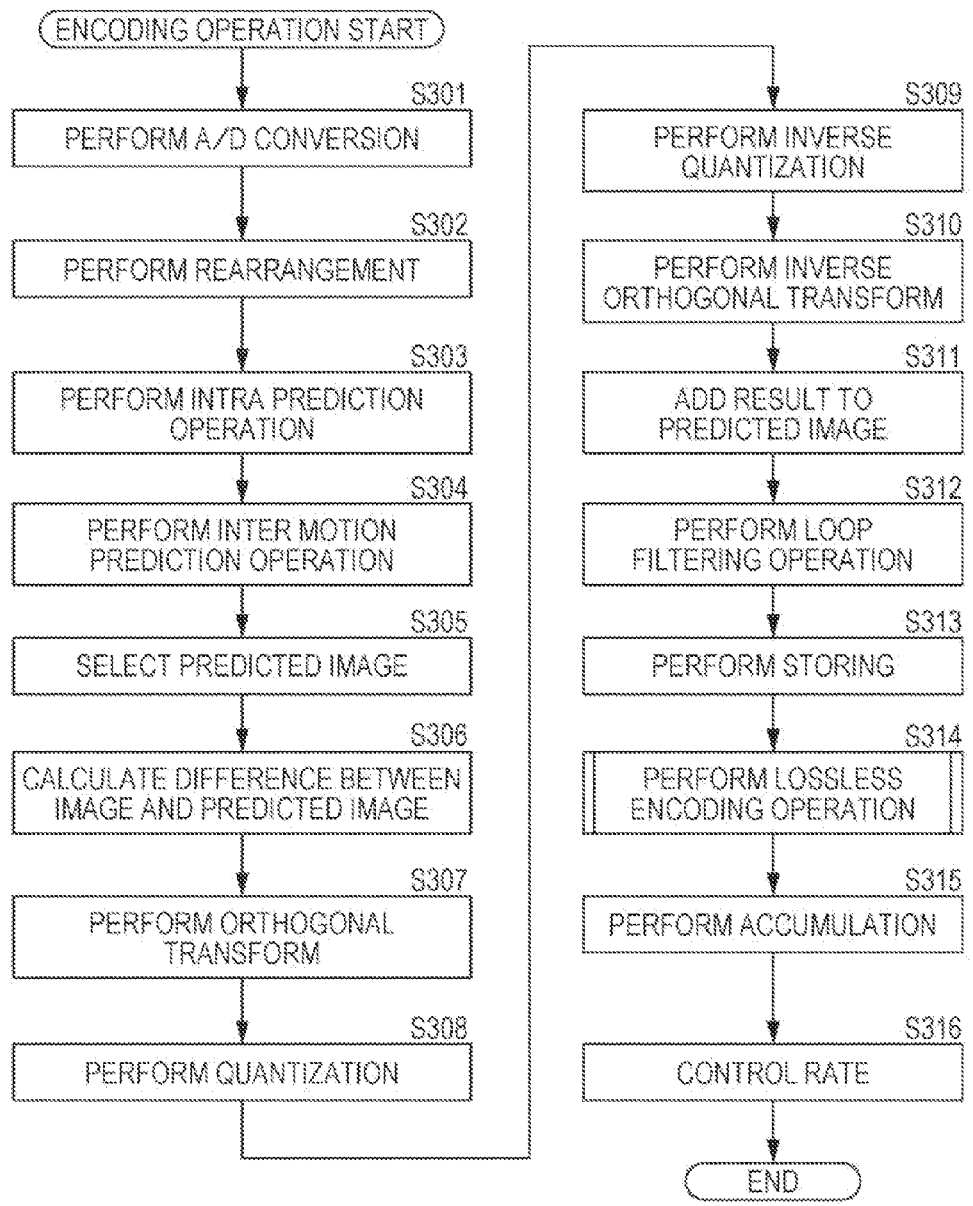
FIG. 16 is a flowchart for explaining an example flow of an encoding operation.
Figure 17:
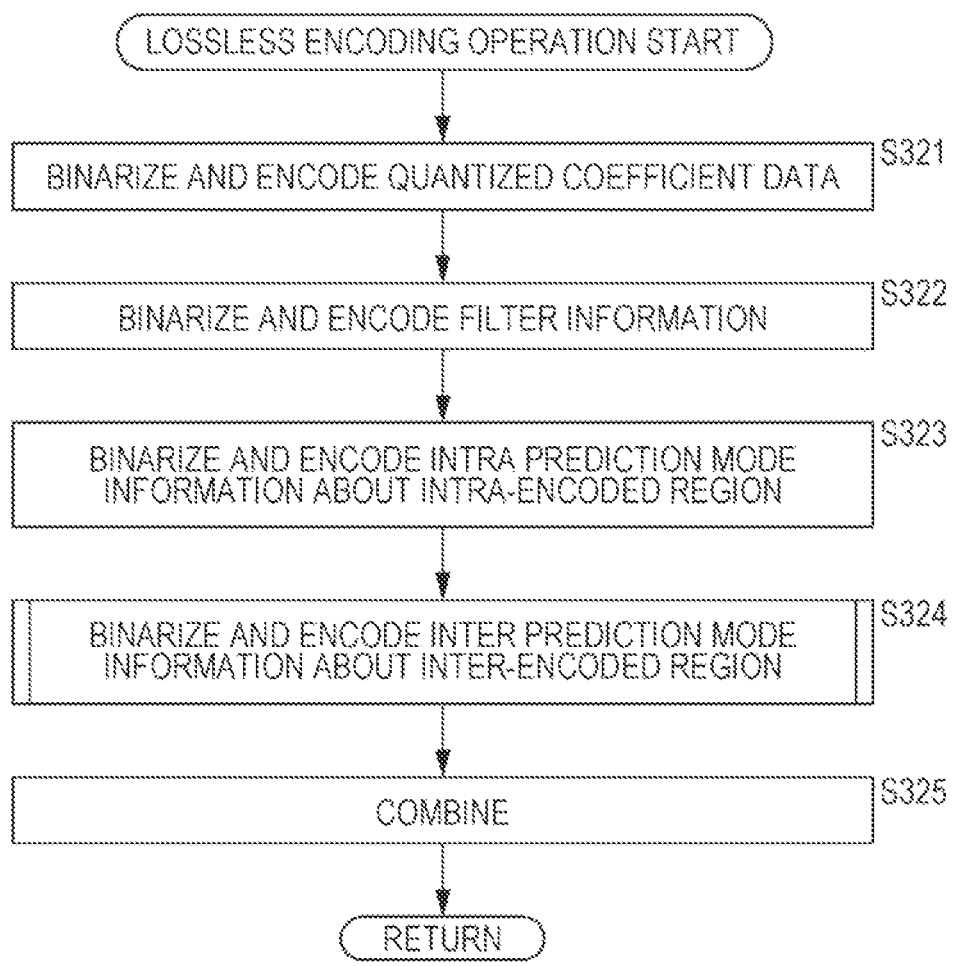
FIG. 17 is a flowchart for explaining an example flow of a lossless encoding operation.

Referring now to the flowchart shown in FIG. 17, an example flow of the lossless encoding operation performed in step S314 of FIG. 16 is described.

When the lossless encoding operation is started, the binarization unit 336 and the entropy encoding unit 337 binarize and encode the quantized coefficient data in step S321, binarize and encode the filter information in step S3322, and binarize and encode the intra prediction mode information about the intra-encoded region in step S323.

In step S324, the lossless encoding unit 306 and the assignment control unit 321 binarize and encode the inter prediction mode information about the inter-encoded region.

In step S325, the entropy encoding unit 337 combines the respective sets of encoded data into a stream.

After the procedure of step S325 is completed, the entropy encoding unit 337 ends the lossless encoding operation. The operation then returns to step S314 of FIG. 16, and moves on to step S315.

[Flow of the Inter Prediction Mode Information Encoding Operation]

Figure 18:
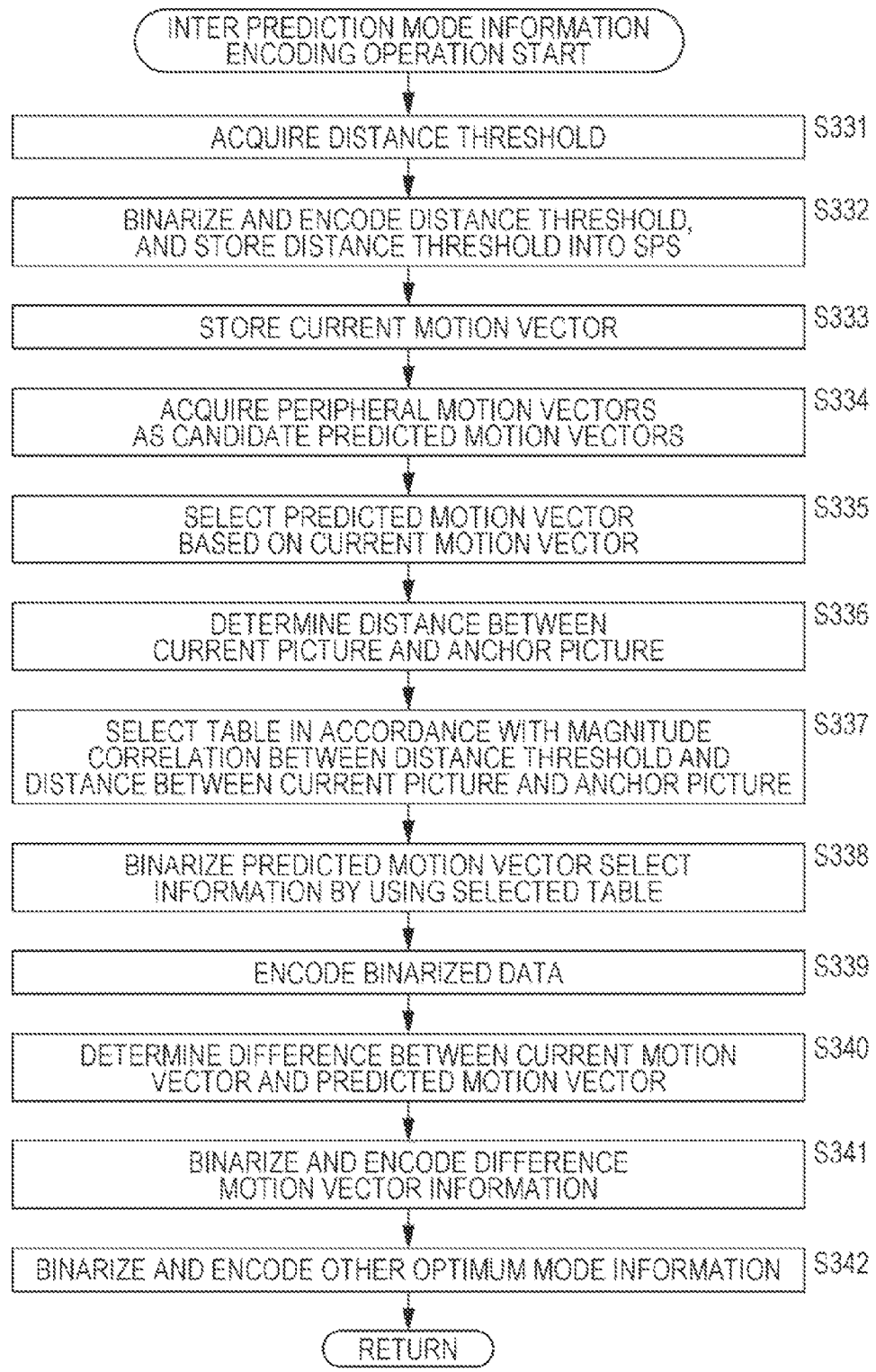
FIG. 18 is a flowchart for explaining an example flow of an inter prediction mode information encoding operation.

Referring now to the flowchart shown in FIG. 18, an example flow of the inter prediction mode information encoding operation performed in step S324 of FIG. 17 is described.

When the inter prediction mode information encoding operation is started, the distance threshold acquirement unit 341 acquires the distance threshold dPOC_th in step S331. In step S332, the binarization unit 336 and the entropy encoding unit 337 binarize and encode the distance threshold dPOC_th acquired in step S331, and store the encoded distance threshold dPOC_th into the sequence parameter set (SPS).

In step S333, the motion vector storage unit 331 stores the motion vector of the current PU contained in the optimum mode information (inter prediction mode information). In step S334, the predicted motion vector selection unit 332 acquires the peripheral motion vectors stored in the motion vector storage unit 331, as candidate predicted motion vectors. In step S335, the predicted motion vector selection unit 332 selects the candidate predicted motion vector closest to the motion vector of the current PU, as the predicted motion vector.

In step S336, the distance calculation unit 342 calculates the distance dPOC between the current picture and the anchor picture. In step S337, the table selection unit 343 selects the table information indicating a bit sequence assignment pattern, in accordance with the magnitude relationship between the distance dPOC determined in step S336 and the distance threshold dPOC_th acquired in step S331.

In step S338, the binarization unit 335 refers to the table information that is stored in the table storage unit 334 and has been selected in step S337, and binarizes the predicted motion vector select information indicating which candidate predicted motion vector has been selected in step S335. In step S339, the entropy encoding unit 337 encodes the binarized data of the predicted motion vector select information binarized in step S338.

In step S340, the difference motion vector calculation unit 333 determines the difference motion vector that is the difference between the current motion vector and the predicted motion vector. In step S341, the binarization unit 336 and the entropy encoding unit 337 binarize and encode the difference motion vector acquired in step S340.

In step S342, the binarization unit 336 and the entropy encoding unit 337 binarize and encode other optimum mode information.

After the procedure of step S342 is completed, the entropy encoding unit 337 ends the inter prediction mode information encoding operation. The operation then returns to step S324 of FIG. 17, and moves on to step S325.

As the respective operations are performed in the above described manner, the assignment control unit 321 can appropriately control the bit sequence assignment in accordance with the distance (dPOC) between the current picture and the anchor picture in terms of displaying order. That is, the assignment control unit 321 can assign a bit sequence having a shorter code length to the selection information about a motion vector having a higher designation frequency. In other words, the assignment control unit 321 can assign a bit sequence having a longer code length to the selection information about a motion vector having a lower designation frequency. Accordingly, the lossless encoding unit 306 can reduce the bit rate of the predicted motion vector select information (pmv_index). In this manner, the image encoding device 300 can increase encoding efficiency.

[Image Decoding Device]

Figure 19:
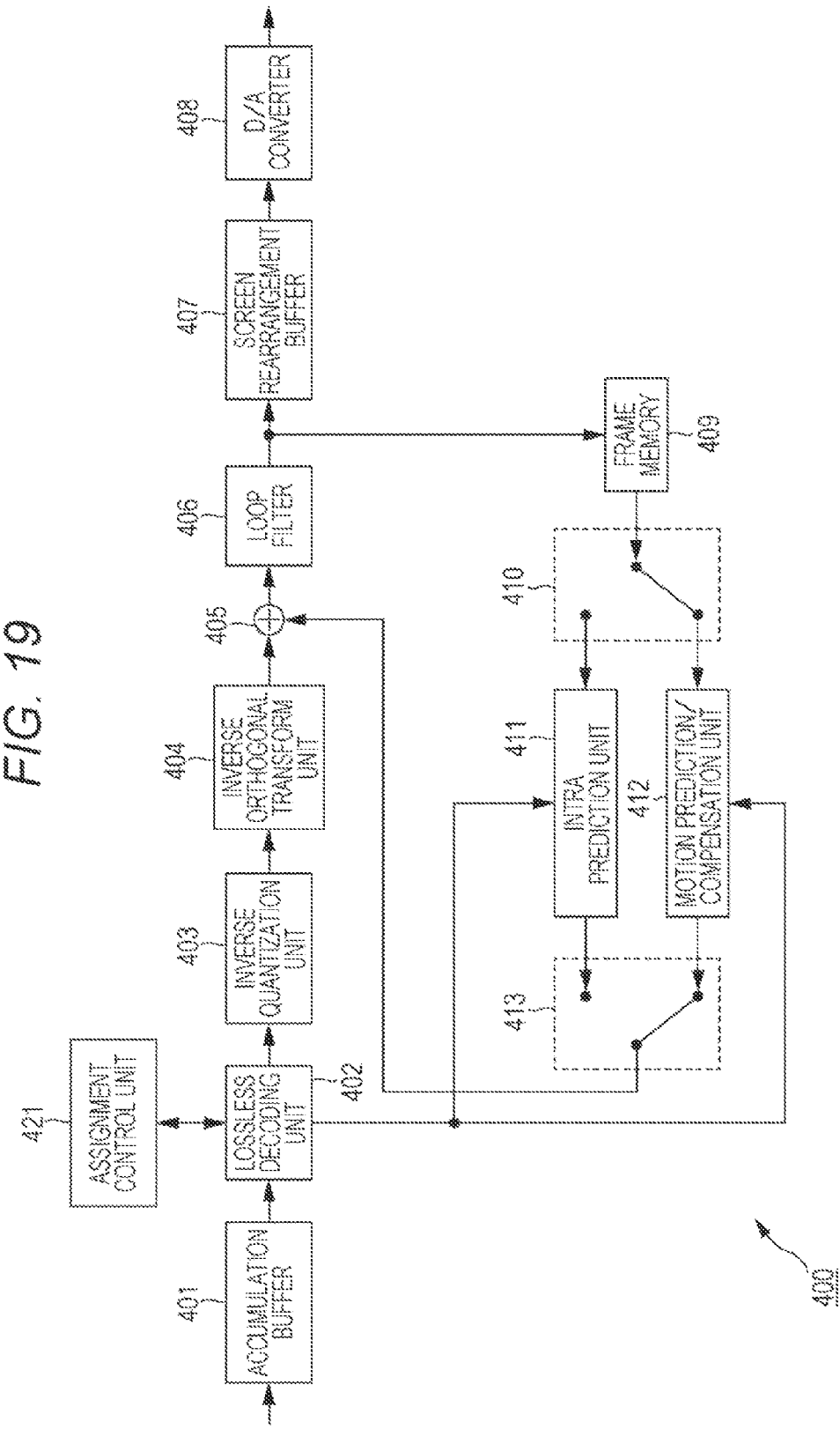
FIG. 19 is a block diagram showing a typical example structure of an image decoding device.

FIG. 19 is a block diagram showing a typical example structure of an image decoding device. The image decoding device 400 shown in FIG. 19 is a decoding device that is compatible with the image encoding device 300 shown in FIG. 10. Data encoded by the image encoding device 300 is supplied to the image decoding device 400 via a passage such as a transmission path or a recording medium, and is then decoded.

As shown in FIG. 19, the image decoding device 400 includes an accumulation buffer 401, a lossless decoding unit 402, an inverse quantization unit 403, an inverse orthogonal transform unit 404, an arithmetic operation unit 405, a loop filter 406, a screen rearrangement buffer 407, and a D/A converter 408. The image decoding device 400 also includes a frame memory 409, a selection unit 410, an intra prediction unit 411, a motion prediction/compensation unit 412, and a selection unit 413.

The image decoding device 400 further includes an assignment control unit 421.

The accumulation buffer 401 accumulates transmitted encoded data. The encoded data has been encoded by the image encoding device 300. The lossless decoding unit 402 reads the encoded data from the accumulation buffer 401 at a predetermined time, and decodes the encoded data by a method compatible with the encoding method used by the lossless encoding unit 306 shown in FIG. 10.

When the current frame is an intra-encoded frame, the header portion of the encoded data stores intra prediction mode information. The lossless decoding unit 402 also decodes the intra prediction mode information, and supplies the resultant information to the intra prediction unit 411. When the current frame is an inter-encoded frame, on the other hand, the header portion of the encoded data stores motion vector information and inter prediction mode information. The lossless decoding unit 402 also decodes the motion vector information and the inter prediction mode information, and supplies the resultant information to the motion prediction/compensation unit 412.

The inverse quantization unit 403 inversely quantizes the coefficient data (the quantized coefficient) decoded by the lossless decoding unit 402, by a method compatible with the quantization method used by the quantization unit 305 shown in FIG. 10. That is, the inverse quantization unit 403 inversely quantizes the quantized coefficient by the same method as the method used by the inverse quantization unit 308 shown in FIG. 10.

The inverse quantization unit 403 supplies the inversely-quantized coefficient data, or the orthogonal transform coefficient, to the inverse orthogonal transform unit 404. The inverse orthogonal transform unit 404 performs an inverse orthogonal transform on the orthogonal transform coefficient by a method compatible with the orthogonal transform method used by the orthogonal transform unit 304 shown in FIG. 10 (or by the same method as that used by the inverse orthogonal transform unit 309 shown in FIG. 10). The inverse orthogonal transform unit 404 obtains decoded residual error data equivalent to the residual error data from the time prior to the orthogonal transform in the image encoding device 300. For example, a fourth-order inverse orthogonal transform is performed.

The decoded residual error data obtained through the inverse orthogonal transform is supplied to the arithmetic operation unit 405. A predicted image is also supplied to the arithmetic operation unit 405 from the intra prediction unit 411 or the motion prediction/compensation unit 412 via the selection unit 413.

The arithmetic operation unit 405 adds the decoded residual error data to the predicted image, and obtains decoded image data corresponding to the image data from the time prior to the predicted image subtraction performed by the arithmetic operation unit 303 of the image encoding device 300. The arithmetic operation unit 405 supplies the decoded image data to the loop filter 406.

The loop filter 406 performs a loop filtering operation including a deblocking filtering operation and an adaptive loop filtering operation on the supplied decoded image, where appropriate, and supplies the resultant decoded image to the screen rearrangement buffer 407.

The loop filter 406 includes a deblocking filter, an adaptive loop filter, and the like, and, where appropriate, performs a filtering operation on the decoded image supplied from the arithmetic operation unit 405. For example, the loop filter 406 removes block distortions from the decoded image by performing a deblocking filtering operation on the decoded image. Also, the loop filter 406 improves image quality by performing a loop filtering operation using a Wiener filter on the result of the deblocking filtering operation (the decoded image from which block distortions have been removed).

Alternatively, the loop filter 406 may perform any appropriate filtering operation on the decoded image. The loop filter 406 may also perform a filtering operation by using the filter coefficient supplied from the image encoding device 300 shown in FIG. 10.

The loop filter 406 supplies the result of the filtering operation (the decoded image after the filtering operation) to the screen rearrangement buffer 407 and the frame memory 409. The decoded image that is output from the arithmetic operation unit 405 can be supplied to the screen rearrangement buffer 407 and the frame memory 409 without passing through the loop filter 406. That is, the filtering operation by the loop filter 406 may be skipped.

The screen rearrangement buffer 407 performs image rearrangement. Specifically, the frame sequence rearranged in the encoding order by the screen rearrangement buffer 302 shown in FIG. 10 is rearranged in the original displaying order. The D/A converter 408 performs a D/A conversion on the images supplied from the screen rearrangement buffer 407, and outputs the converted images to a display (not shown) to display the images.

The frame memory 409 stores the supplied decoded image, and supplies the stored decoded image as a reference image to the selection unit 410 at a predetermined time or in response to an external request from the intra prediction unit 411 or the motion prediction/compensation unit 412 or the like.

The selection unit 410 selects a supply destination of the reference image supplied from the frame memory 409. When an intra-encoded image is decoded, the selection unit 410 supplies the reference image supplied from the frame memory 409, to the intra prediction unit 411. When an inter-encoded image is decoded, the selection unit 410 supplies the reference image supplied from the frame memory 409, to the motion prediction/compensation unit 412.

Information that has been obtained by decoding the header information and indicates an intra prediction mode or the like is supplied from the lossless decoding unit 402 to the intra prediction unit 411, where appropriate. The intra prediction unit 411 performs intra predictions in the intra prediction modes used by the intra prediction unit 314 shown in FIG. 10, by using the reference image acquired from the frame memory 409. A predicted image is thus generated. Like the intra prediction unit 314 shown in FIG. 10, the intra prediction unit 411 can perform the intra predictions not only in the modes specified by the AVC encoding method but also in any other appropriate modes.

The intra prediction unit 411 supplies the generated predicted image to the selection unit 413.

The motion prediction/compensation unit 412 obtains, from the lossless decoding unit 402, the information obtained by decoding the header information (optimum mode information, motion vector information, reference frame information, a flag, respective parameters, and the like).

The motion prediction/compensation unit 412 performs inter predictions in the inter prediction modes used by the motion prediction/compensation unit 315 shown in FIG. 10, by using the reference image acquired from the frame memory 409. A predicted image is thus generated. Like the motion prediction/compensation unit 315 shown in FIG. 10, the motion prediction/compensation unit 412 can perform the intra predictions not only in the modes specified by the AVC encoding method but also in any other appropriate modes.

Like the motion prediction/compensation unit 212, the motion prediction/compensation unit 412 supplies the generated predicted image to the selection unit 413.

The selection unit 413 selects the supplier of the predicted image to be supplied to the arithmetic operation unit 405. Specifically, the selection unit 413 supplies the predicted image generated by the motion prediction/compensation unit 412 or the intra prediction unit 411, to the arithmetic operation unit 405.

The assignment control unit 421 performs the same bit sequence assignment control as that performed in the image encoding device 300, so as to correctly debinarize the binarized data of the predicted motion vector select information in the debinarization to be performed in the lossless decoding unit 402.

[Lossless Decoding Unit and Assignment Control Unit]

Figure 20:
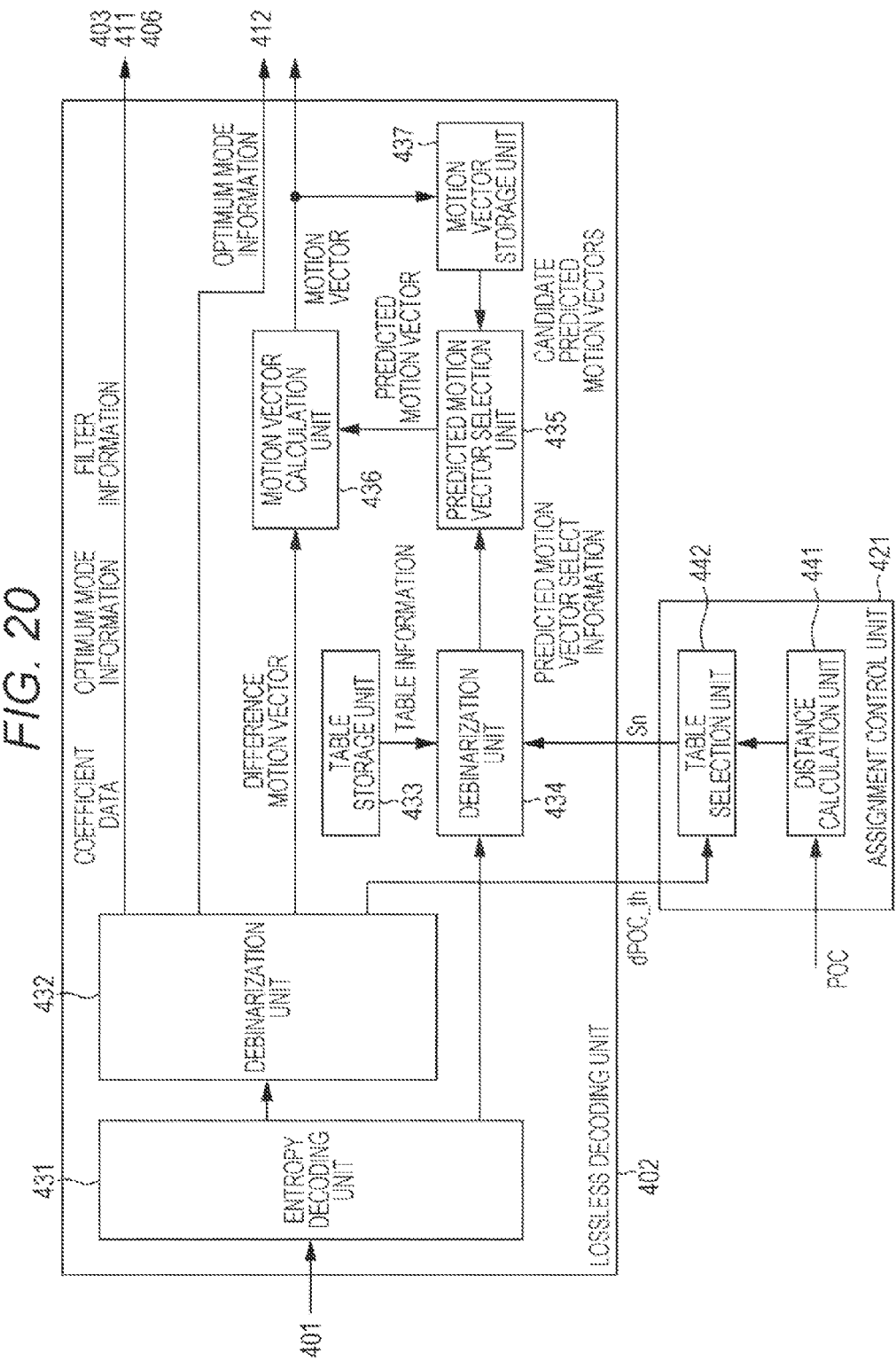
FIG. 20 is a block diagram showing typical example structures of the lossless decoding unit and the assignment control unit shown in FIG. 19.

FIG. 20 is a block diagram showing typical example structures of the lossless decoding unit 402 and the assignment control unit 421 shown in FIG. 19.

As shown in FIG. 20, the lossless decoding unit 402 includes an entropy decoding unit 431, a debinarization unit 432, a table storage unit 433, a debinarization unit 434, a predicted motion vector selection unit 435, a motion vector calculation unit 436, and a motion vector storage unit 437.

The assignment control unit 421 includes a distance calculation unit 441 and a table selection unit 442.

The entropy decoding unit 431 decodes a code stream supplied from the accumulation buffer 401, and supplies the binarized data to the debinarization unit 432 and the debinarization unit 434.

The debinarization unit 432 debinarizes the binarized data of various kinds of information supplied from the image encoding device 300, such as the quantized coefficient data, the optimum mode information, the filter information, the difference motion vector, and the distance threshold dPOC_th. The debinarization unit 432 supplies the obtained coefficient data to the inverse quantization unit 403. The debinarization unit 432 also supplies the obtained optimum mode information to the intra prediction unit 411 or the motion prediction/compensation unit 412. The debinarization unit 432 further supplies the obtained filter information to the loop filter 406. The debinarization unit 432 also supplies the obtained difference motion vector to the motion vector calculation unit 436. The debinarization unit 432 further supplies the obtained distance threshold dPOC_th to the table selection unit 442 of the assignment control unit 421.

The table storage unit 433 stores table information that indicates bit sequence assignment patterns for predicted motion vector select information, like the table information stored in the table storage unit 334 of the image encoding device 300 as shown in FIG. 15, for example. Like the table storage unit 334, the table storage unit 433 stores more than one set of table information (S1 and S2, for example) indicating different assignment patterns from each other. The table information may be put into one table as in the case of the table storage unit 334.

The debinarization unit 434 refers to table information Sn that is stored in the table storage unit 433 and has been selected by the table selection unit 442 of the assignment control unit 421, and, in accordance with the assignment pattern, debinarizes the binarized data of the predicted motion vector select information supplied from the entropy decoding unit 431. The debinarization unit 434 supplies the predicted motion vector select information obtained through the debinarization to the predicted motion vector selection unit 435.

The predicted motion vector selection unit 435 acquires the motion vectors (peripheral motion vectors) that are located around the current PU and are stored in the motion vector storage unit 437, as candidate predicted motion vectors. From the candidate predicted motion vectors, the predicted motion vector selection unit 435 selects the candidate predicted motion vector indicated by the predicted motion vector select information supplied from the debinarization unit 434, as the predicted motion vector. The predicted motion vector selection unit 435 supplies the selected predicted motion vector to the motion vector calculation unit 436.

The motion vector calculation unit 436 calculates the motion vector of the current PU by adding the predicted motion vector supplied from the predicted motion vector selection unit 435 to the difference motion vector supplied from the debinarization unit 432. The motion vector calculation unit 436 supplies the calculated motion vector to the motion prediction/compensation unit 412. The motion vector calculation unit 436 also supplies and stores the calculated motion vector into the motion vector storage unit 437.

The motion vectors stored in the motion vector storage unit 437 are used as the peripheral motion vectors (the candidate predicted motion vectors) in operations to be performed for regions to be processed in later stages than the current PU in terms of time.

The distance calculation unit 441 of the assignment control unit 421 counts the POC of each picture, and calculates the POC difference dPOC between the current picture and the anchor picture. The distance calculation unit 441 supplies the difference dPOC to the table selection unit 442.

The table selection unit 442 compares the difference dPOC supplied from the distance calculation unit 441 with the distance threshold dPOC_th that is supplied from the debinarization unit 432 and has been used at the time of encoding, and, in accordance with the comparison result, selects a table (a bit sequence assignment pattern) Sn. The table selection unit 442 supplies the selection result Sn to the debinarization unit 434 of the lossless encoding unit 306.

As described above, as the assignment control unit 421 appropriately controls the bit sequence assignment in accordance with the distance (dPOC) between the current picture and the anchor picture in terms of displaying order, the lossless decoding unit 402 can reproduce the same bit sequence assignment as that used in the encoding, and correctly decode the encoded data supplied from the image encoding device 300. In short, the image decoding device 400 can increase encoding efficiency.

[Decoding Operation Flow]

Next, the flow of each operation to be performed by the above described image decoding device 400 is described. Referring first to the flowchart shown in FIG. 21, an example flow of a decoding operation is described.

When the decoding operation is started, the accumulation buffer 401 accumulates transmitted encoded data in step S401. In step S402, the lossless decoding unit 402 decodes the encoded data (encoded data generated by the image encoding device 300 encoding image data) supplied from the accumulation buffer 401.

In step S403, the inverse quantization unit 403 inversely quantizes the quantized orthogonal transform coefficient obtained through the decoding performed by the lossless decoding unit 402, by a method compatible with the quantization operation performed by the quantization unit 305 shown in FIG. 10. In step S404, the inverse orthogonal transform unit 404 performs an inverse orthogonal transform on the orthogonal transform coefficient obtained through the inverse quantization performed by the inverse quantization unit 403, by a method compatible with the orthogonal transform operation performed by the orthogonal transform unit 304 shown in FIG. 10. As a result, the difference information corresponding to the input to the orthogonal transform unit 304 (or the output from the arithmetic operation unit 303) shown in FIG. 10 is decoded.

In step S405, the intra prediction unit 411 and the motion prediction/compensation unit 412 perform prediction operations, and generate predicted images.

In step S406, the selection unit 413 selects a predicted image generated in the procedure of step S405. Specifically, the predicted image generated by the intra prediction unit 411, or the predicted image generated by the motion prediction/compensation unit 412 is supplied to the selection unit 413. The selection unit 413 selects the supplied predicted image, and supplies the predicted image to the arithmetic operation unit 405.

In step S407, the arithmetic operation unit 405 adds the predicted image selected in step S406 to the difference information obtained in the procedure of step S404. In this manner, the original image data is decoded.

In step S408, the loop filter 406 performs filtering on the decoded image obtained in the procedure of step S407, where appropriate.

In step S409, the screen rearrangement buffer 407 rearranges the frames of the decoded images appropriately subjected to the filtering in step S408. Specifically, the order of frames rearranged for encoding by the screen rearrangement buffer 302 of the image encoding device 300 (FIG. 10) is rearranged in the original displaying order.

In step S410, the D/A converter 408 performs a D/A conversion on the decoded image data having the frames rearranged in step S409. The decoded image data is output to a display (not shown), and the images are displayed.

In step S411, the frame memory 409 stores the decoded images appropriately subjected to the filtering in step S408.

After the procedure of step S411 is completed, the frame memory 409 ends the decoding operation.

[Lossless Decoding Operation Flow]

Figure 21:
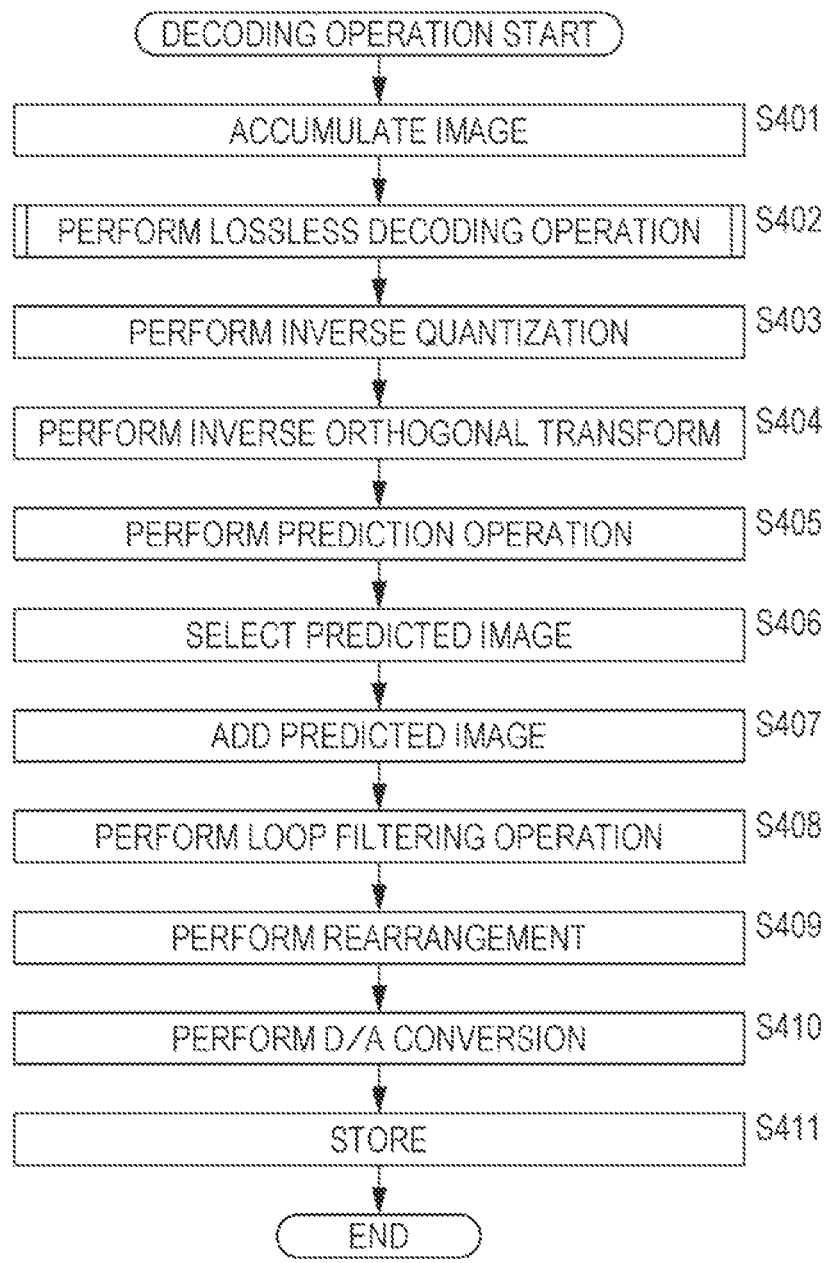
FIG. 21 is a flowchart for explaining an example flow of a decoding operation.
Figure 22:
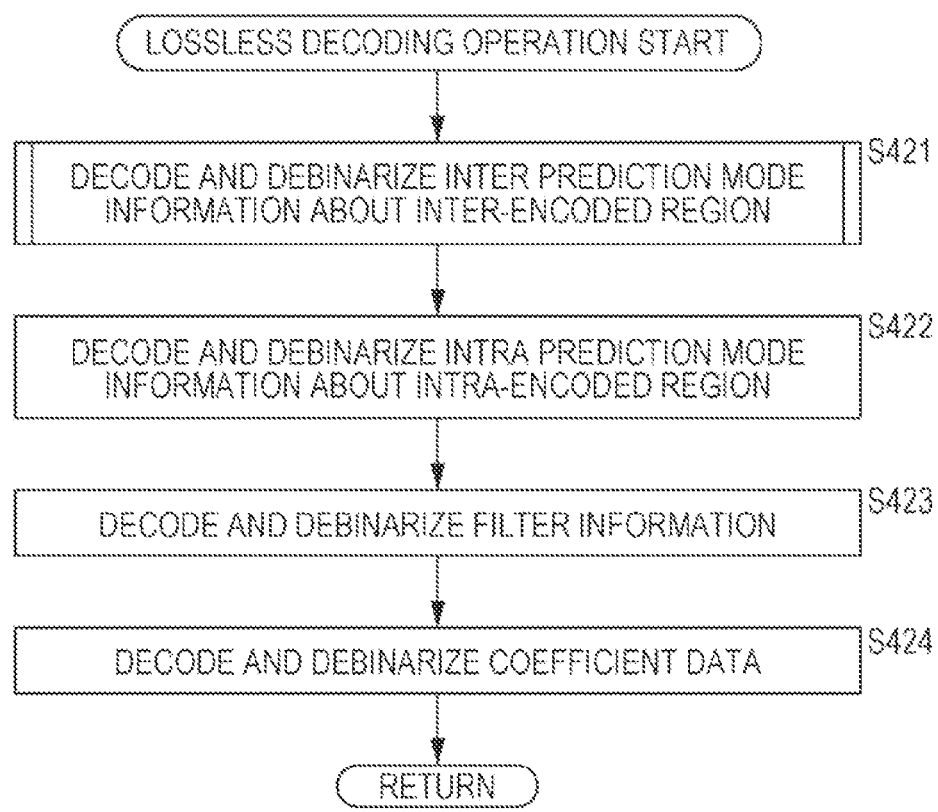
FIG. 22 is a flowchart for explaining an example flow of a lossless decoding operation.

Referring now to the flowchart shown in FIG. 22, an example flow of the lossless decoding operation performed in step S402 of FIG. 21 is described.

When the lossless decoding operation is started, the lossless decoding unit 402 and the assignment control unit 421 decode and debinarize the inter prediction mode information about the inter-encoded region in step S421.

The entropy decoding unit 431 and the debinarization unit 432 decode and debinarize the intra prediction mode information about the intra-encoded region in step S422, decode and debinarize the filter information in step S423, and decode and debinarize the coefficient data in step S424.

After the procedure of step S424 is completed, the debinarization unit 432 ends the lossless decoding operation. The operation then returns to step S402 of FIG. 21, and moves on to step S403.

[Flow of the Inter Prediction Mode Information Decoding Operation]

Figure 23:
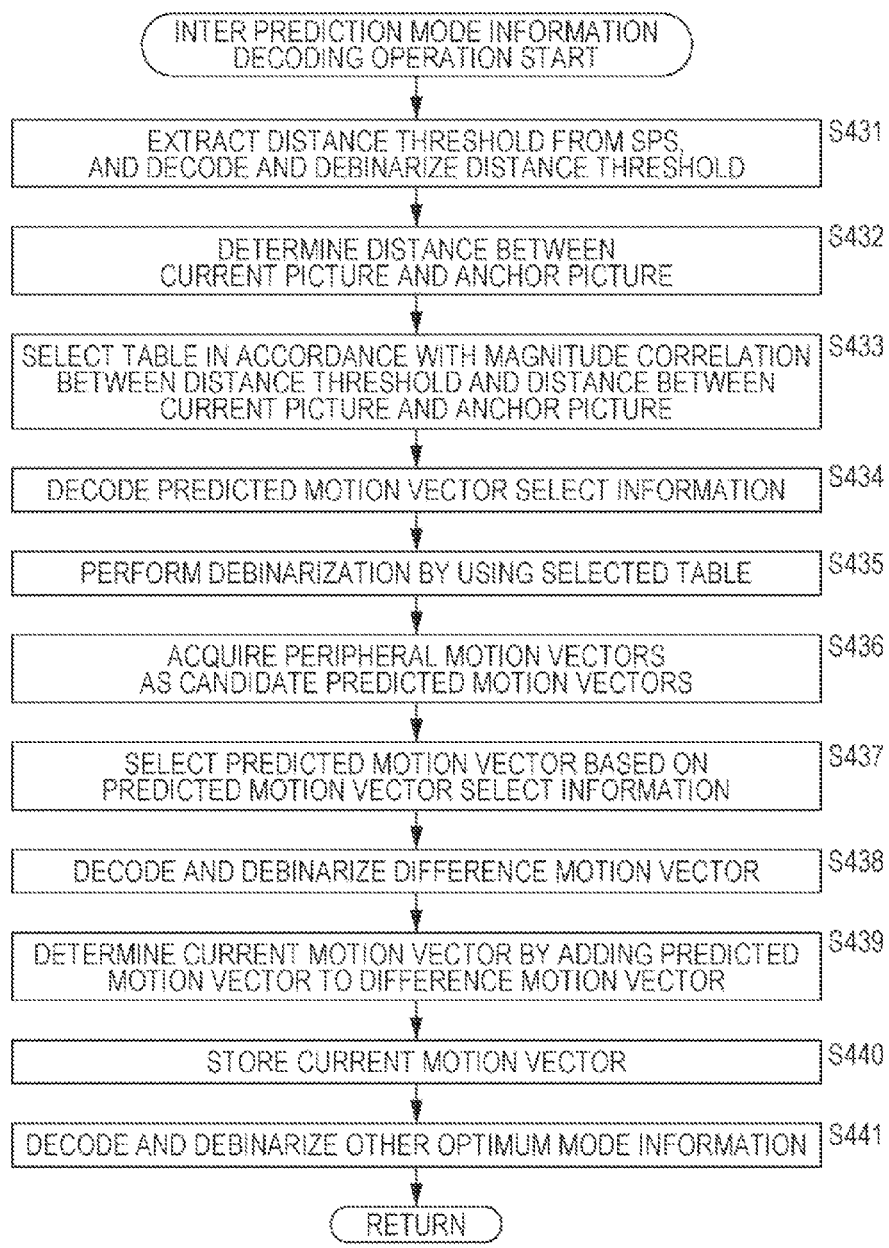
FIG. 23 is a flowchart for explaining an example flow of an inter prediction mode information decoding operation.

Referring now to the flowchart shown in FIG. 23, an example flow of the inter prediction mode information decoding operation performed in step S421 of FIG. 22 is described.

When the inter prediction mode information decoding operation is started, the entropy decoding unit 431 and the debinarization unit 432, in step S431, extract the encoded data of the distance threshold dPOC_th from the SPS, and decode and debinarize the extracted encoded data.

In step S432, the distance calculation unit 441 of the assignment control unit 421 calculates the distance dPOC between the current picture and the anchor picture.

In step S433, the table selection unit 442 of the assignment control unit 421 compares the distance dPOC between the current picture and the anchor picture calculated in step S432 with the threshold distance dPOC_th acquired in step S431, and selects the table information Sn to be used in debinarization in accordance with the magnitude relationship between the distance dPOC and the threshold distance dPOC_th.

In step S434, the entropy decoding unit 431 decodes the predicted motion vector select information.

In step S435, the debinarization unit 434 refers to the table that is stored in the table storage unit 433 and has been selected in step S433, and, in accordance with the bit sequence assignment pattern Sn, debinarizes the binarized data of the predicted motion vector select information obtained in step S434 (or transforms a bit sequence into information indicating the motion vector corresponding to the bit sequence).

In step S436, the predicted motion vector selection unit 435 acquires the peripheral motion vectors stored in the motion vector storage unit 437, as candidate predicted motion vectors.

In step S437, the predicted motion vector selection unit 435 selects, from the candidate predicted motion vectors obtained in step S436, the motion vector designated by the predicted motion vector select information obtained through the debinarization performed in step S435, and sets the selected motion vector as the predicted motion vector.

In step S438, the entropy decoding unit 431 and the debinarization unit 432 decode the encoded data of the difference motion vector, and debinarize the resultant binarized data, to obtain the difference motion vector.

In step S439, the motion vector calculation unit 436 calculates the motion vector of the current PU by adding the predicted motion vector selected in step S437 to the difference motion vector obtained in the procedure of step S438.

In step S440, the motion vector storage unit 437 stores the motion vector of the current PU obtained in the procedure of step S439.

In step S441, the entropy decoding unit 431 and the debinarization unit 432 decode the encoded data of other optimum mode information, and debinarize the resultant binarized data, to obtain the other optimum mode information.

After the procedure of step S441 is completed, the debinarization unit 432 ends the inter prediction mode information decoding operation. The operation then returns to step S421 of FIG. 22, and moves on to step S422.

As described above, by performing the respective operations, the lossless decoding unit 402 can reproduce the same bit sequence assignment as that used in the encoding, and correctly decode the encoded data supplied from the image encoding device 300. In short, the image decoding device 400 can increase encoding efficiency.

[Other Examples]

Although example bit sequence assignment patterns have been described with reference to FIG. 15, other bit sequence assignment methods may be used. For example, when the distance dPOC is equal to or shorter than the distance threshold dPOC_th (or when the distance dPOC is shorter than the distance threshold dPOC_th), S3 in the table information shown in FIG. 24 may be selected, instead of S2 in FIG. 15.

In the case of S3, the bit sequence to be assigned when the predicted motion vector MV_Tmp (temporal_pmv) and the bit sequence to be assigned when the predicted motion vector is the median value (Median) (spatial_pmv) of MV_A, MV_B, and MV_C are switched, compared with those in S1.

It is of course possible to prepare assignment patterns other than that.

In FIG. 15, exponential Golomb values are used as bit sequential values, but any values may be used as the bit sequential values, as long as those values can be distinguished from one another. For example, unary codes may be used as in the example table information shown in FIG. 25.

In the above description, the distance threshold dPOC_th has been described as a variable value, but the distance threshold dPOC_th may be a fixed value that is determined in advance. For example, the image encoding device 300 and the image decoding device 400 may share the distance threshold dPOC_th, which is a fixed value. In that case, the transmission and the reception of the distance threshold dPOC_th are skipped. Alternatively, the image encoding device 300 may supply the fixed distance threshold dPOC_th to the image decoding device 400 prior to transmission of encoded data. Further, the image decoding device 400 may supply the fixed distance threshold dPOC_th to the image encoding device 300 prior to encoding. Also, a device other than the image encoding device 300 and the image decoding device 400 may supply the fixed distance threshold dPOC_th to the image encoding device 300 and the image decoding device 400.

Also, more than one distance threshold dPOC_th may be prepared. In that case, three or more sets of table information (code sequence assignment patterns Sn) are prepared, and an appropriate pattern is selected in accordance with the magnitude relationship between the distance dPOC and the distance threshold dPOC_th.

The distance threshold dPOC_th can be stored in any position in a stream, other than the SPS. For example, the distance threshold dPOC_th may be stored in the picture parameter set (PPS) or the slice header. The distance threshold dPOC_th may also be stored in the SEI (Supplemental Enhancement Information) or the like.

Further, the optimum mode information may be transmitted to the decoding side, independently of encoded data.

Also, the distance threshold dPOC_th may be changed for each processing unit. For example, the distance threshold dPOC_th may be changed for each picture, may be changed for each slice, may be changed for each CU, or may be changed in some other manner.

<2. Second Embodiment>
[Lossless Encoding Unit and Assignment Control Unit]

In the above description, the bit sequence assignment pattern is controlled in accordance with the distance dPOC between the current picture and the anchor picture. However, the present invention is not limited to that, and the bit sequence assignment pattern may be controlled based on the similarity between peripheral motion vectors that are motion vectors of regions located around the current PU.

Figure 26:
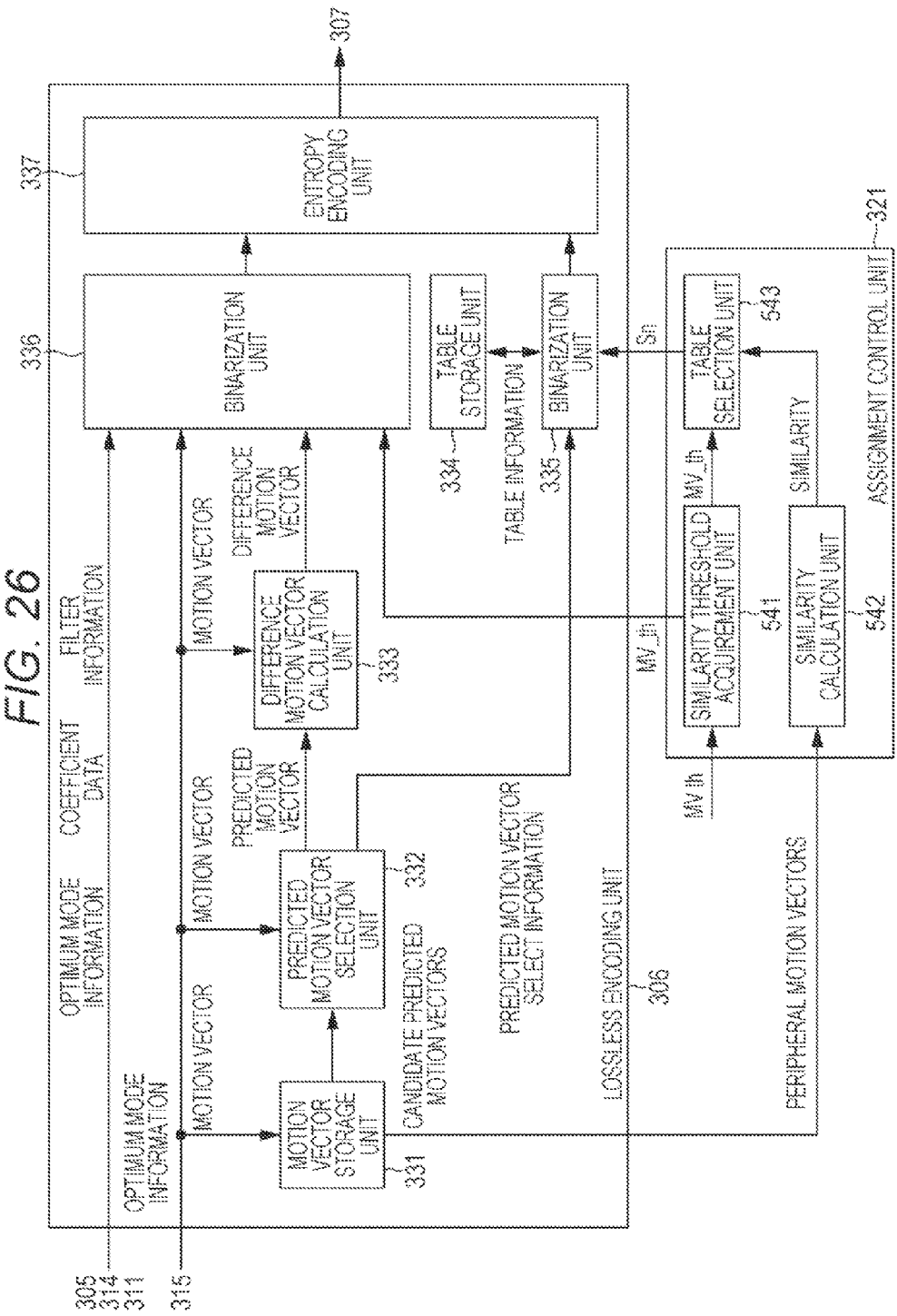
FIG. 26 is a block diagram showing typical example structures of the lossless encoding unit and the assignment control unit shown in FIG. 11.

FIG. 26 is a block diagram showing typical example structures of the lossless encoding unit 306 and the assignment control unit 321 in such a case.

In the example case illustrated in FIG. 26, the lossless encoding unit 306 has basically the same structure as that in the example case described with reference to FIG. 14.

In this case, however, the assignment control unit 321 includes a similarity threshold acquirement unit 541, a similarity calculation unit 542, and a table selection unit 543.

As in the case of the distance threshold dPOC_th, the similarity threshold acquirement unit 541 acquires a similarity threshold MV_th from outside. This similarity threshold MV_th is the threshold value for the assignment control unit 321 to control the bit sequence assignment pattern in accordance with the similarity between peripheral motion vectors.

Like the distance threshold dPOC_th, this similarity threshold MV_th may also be set in any appropriate manner. After acquiring the similarity threshold MV_th, which has been determined in some manner, from outside, the similarity threshold acquirement unit 541 supplies the similarity threshold MV_th to the table selection unit 543, so that the similarity threshold MV_th is used in selecting a table (selecting an assignment pattern). The similarity threshold acquirement unit 541 also supplies the acquired similarity threshold MV_th to the binarization unit 336 of the lossless encoding unit 306, so that the similarity threshold MV_th is supplied to the decoding side.

The similarity calculation unit 542 acquires, from the motion vector storage unit 331, peripheral motion vectors that are the motion vectors of regions located around the current PU, and calculates the similarity between the peripheral motion vectors by comparing the peripheral motion vectors. In calculating the similarity, any peripheral motion vectors may be used. The similarity calculation unit 542 supplies the calculated similarity to the table selection unit 543.

The table selection unit 543 compares the similarity supplied from the similarity calculation unit 542 with the similarity threshold MV_th supplied from the similarity threshold acquirement unit 541, and, in accordance with the comparison result, selects a table (a bit sequence assignment pattern) Sn.

Figure 27:
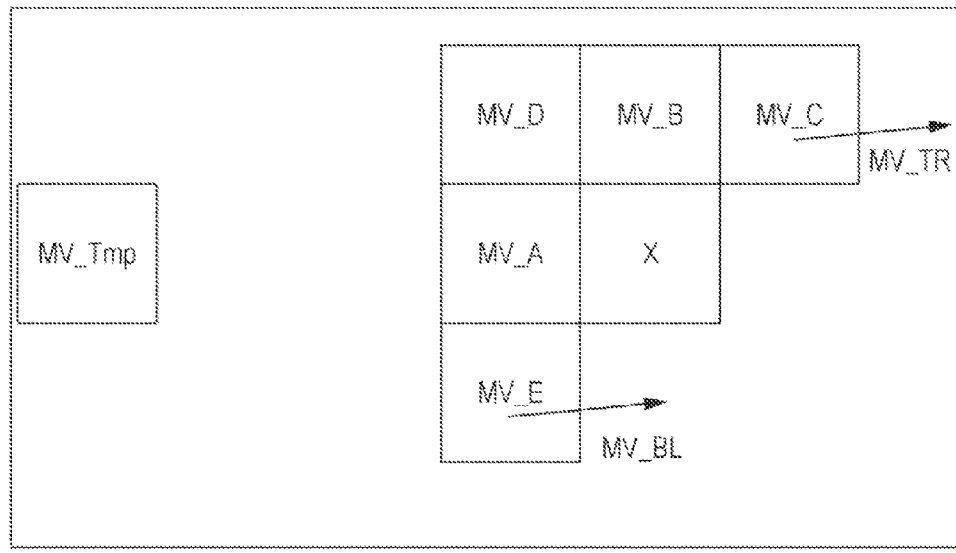
FIG. 27 is a diagram for explaining an example relationship between peripheral motion vectors.

FIG. 27 shows an example case where the upper right peripheral motion vector (MV_TR) in the current region is similar to the lower left peripheral motion vector (MV_BL). In this case, the motion vector of the current region x is expected to be also similar to those peripheral motion vectors. Therefore, in the example case illustrated in FIG. 15, the table selection unit 543 selects S1.

Figure 28:
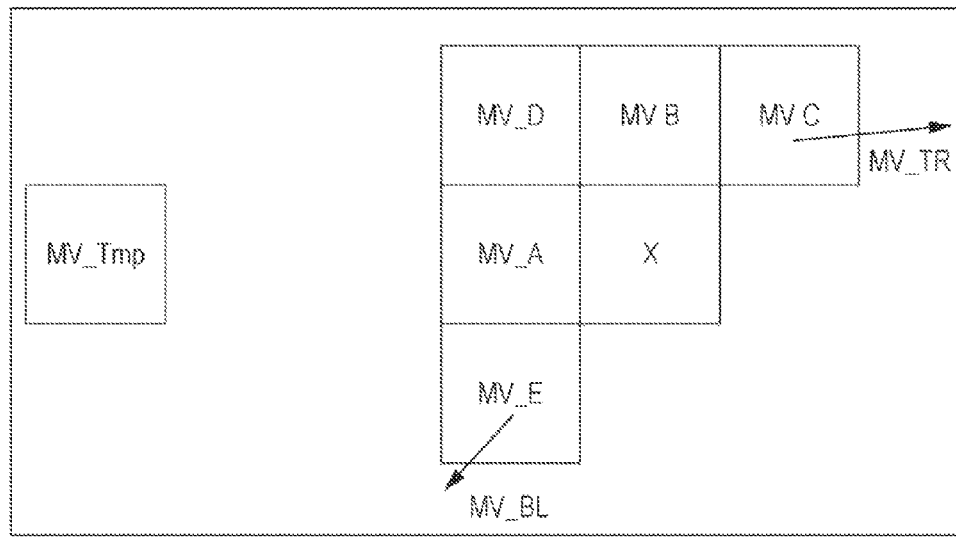
FIG. 28 is a diagram for explaining another example relationship between peripheral motion vectors.

On the other hand, FIG. 28 shows an example case where the upper right peripheral motion vector (MV_TR) is not similar to the lower left peripheral motion vector (MV_BL).

In this case, the motion vector of the current region x is determined not to be necessarily similar to those peripheral motion vectors. Therefore, in the example case illustrated in FIG. 15, the table selection unit 543 selects S2.

Figure 30:
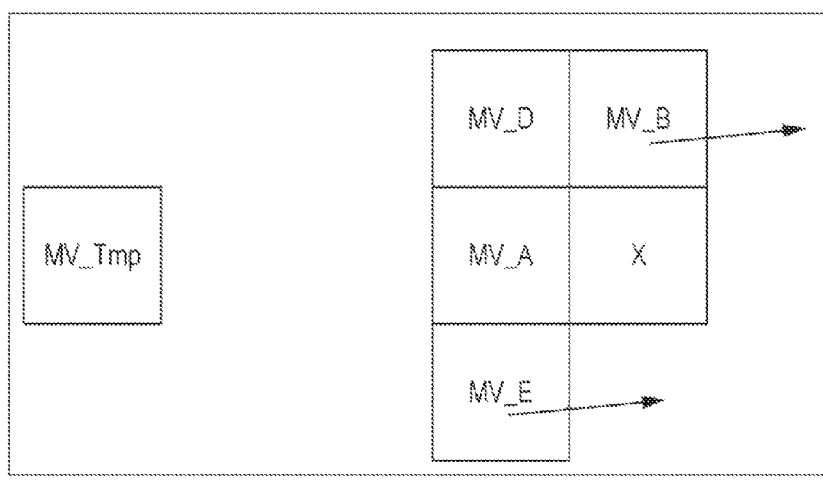
FIG. 30 is a diagram for explaining still another example relationship between peripheral motion vectors.
Figure 31:
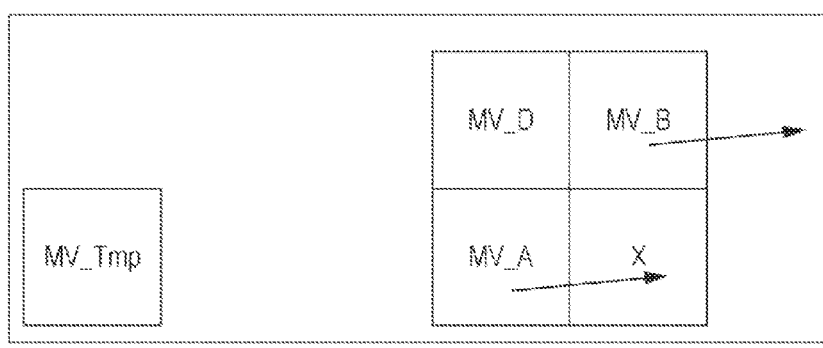
FIG. 31 is a diagram for explaining yet another example relationship between peripheral motion vectors.

There are cases where the region C and the region E have not been encoded, or are not inter prediction blocks. In view of this, the upper-right peripheral motion vector and the lower-left peripheral motion vector that are used in calculating a similarity may be peripheral motion vectors of other regions, as shown in FIGS. 29 through 31.

Figure 29:
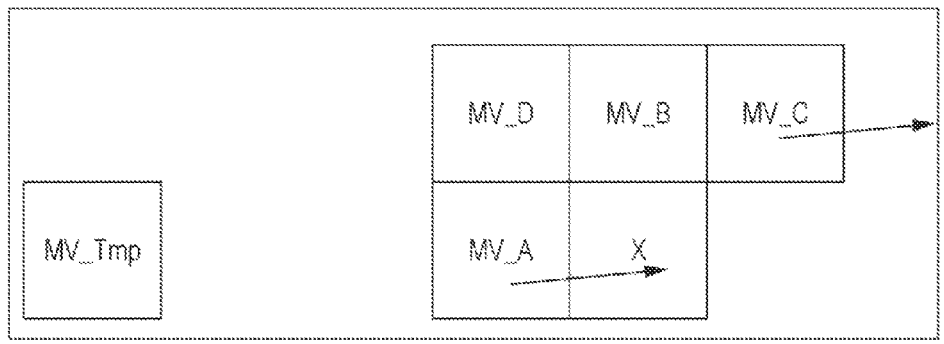
FIG. 29 is a diagram for explaining yet another example relationship between peripheral motion vectors.

For example, in a case where the peripheral motion vector MV_E is not available, the similarity between the motion vector MV_A of the region A and the motion vector MV_C of the region C may be calculated as shown in FIG. 29. Also, in a case where the peripheral motion vector MV_C is not available, for example, the similarity between the motion vector MV_E of the region E and the motion vector MV_B of the region B may be calculated as shown in FIG. 30. Further, in a case where the peripheral motion vector MV_E and the peripheral motion vector MV_C are not available, for example, the similarity between the motion vector MV_A of the region A and the motion vector MV_B of the region B may be calculated as shown in FIG. 31. It is of course possible to use peripheral motion vectors other than the above. Which vector should be used instead may be acknowledged beforehand between the encoding side and the decoding side, and information indicating which vectors have been used may be transmitted and received.

The similarity between the upper-right peripheral motion vector (MV_TR) and the lower-left peripheral motion vector (MV_BL) is calculated as the absolute value of the vector difference |MV_TR−MV_BL|. When the absolute value is larger than the similarity threshold Myth, there is a high possibility that temporal_pmv is used, and therefore, a bit sequence of S2 is selected.

Referring back to FIG. 26, the table selection unit 543 supplies the selection result Sn to the binarization unit 335 of the lossless encoding unit 306.

As described above, the assignment control unit 321 can appropriately control the bit sequence assignment in accordance with the similarity between peripheral motion vectors. That is, the assignment control unit 321 can also assign a bit sequence having a shorter code length to the selection information about a motion vector having a higher designation frequency in this case. In other words, the assignment control unit 321 can assign a bit sequence having a longer code length to the selection information about a motion vector having a lower designation frequency. Accordingly, the lossless encoding unit 306 can reduce the bit rate of the predicted motion vector select information (pmv_index). In this manner, the image encoding device 300 can increase encoding efficiency.

[Flow of the Inter Prediction Mode Information Encoding Operation]

Figure 32:
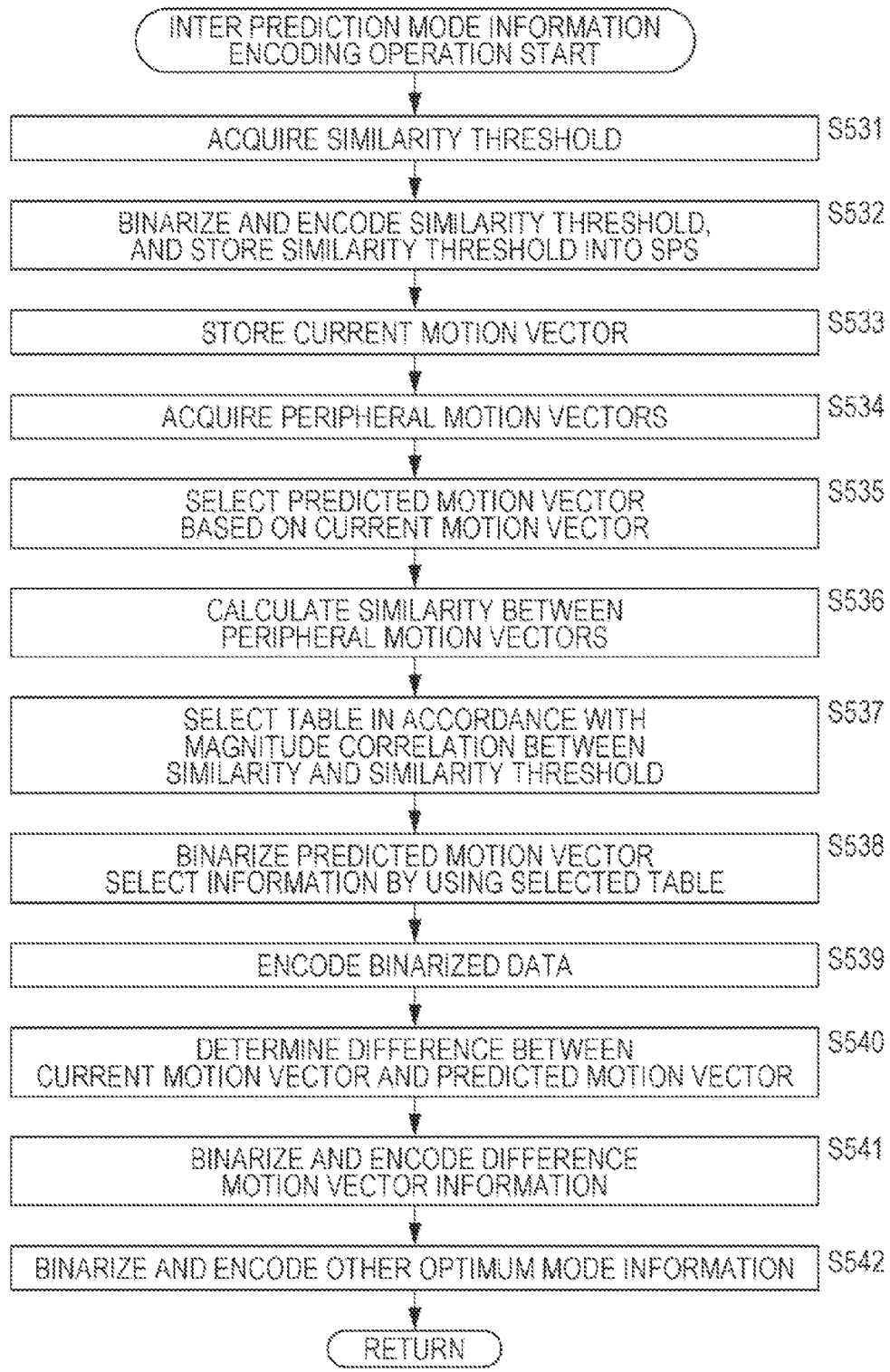
FIG. 32 is a flowchart for explaining another example flow of the inter prediction mode information encoding operation.

Referring now to the flowchart shown in FIG. 32, an example flow of the inter prediction mode information encoding operation in this case is described.

The operation to be performed in this case is also basically the same as the operation performed in the case where the distance threshold is used as described above with reference to the flowchart shown in FIG. 18.

In step S531, however, the similarity threshold acquirement unit 541 acquires the similarity threshold MV_th, instead of the distance threshold. In step S532, the binarization unit 336 and the entropy encoding unit 337 binarize and encode the similarity threshold MV_th acquired in step S531, and store the similarity threshold MV_th into the SPS.

In step S533, the same procedure as step S333 is carried out. In step S534, the similarity calculation unit 542 acquires peripheral motion vectors. In step S535, the same procedure as step S335 is carried out.

In step S536, the similarity calculation unit 542 calculates the similarity between the peripheral motion vectors.

In step S537, the table selection unit 543 selects a table in accordance with the magnitude relationship between the similarity and the similarity threshold MV_th.

In steps S538 through S542, the same procedures as steps S338 through S342 are carried out.

After the procedure of step S542 is completed, the entropy encoding unit 337 ends the inter prediction mode information encoding operation. The operation then returns to step S324 of FIG. 17, and moves on to step S325.

As the respective operations are performed in the above described manner, the lossless encoding unit 306 can also reduce the bit rate of the predicted motion vector select information (pmv_index) in this case. In this manner, the image encoding device 300 can increase encoding efficiency.

[Lossless Decoding Unit and Assignment Control Unit]

Next, the image decoding device 400 compatible with the image encoding device 300 in this case is described.

Figure 33:
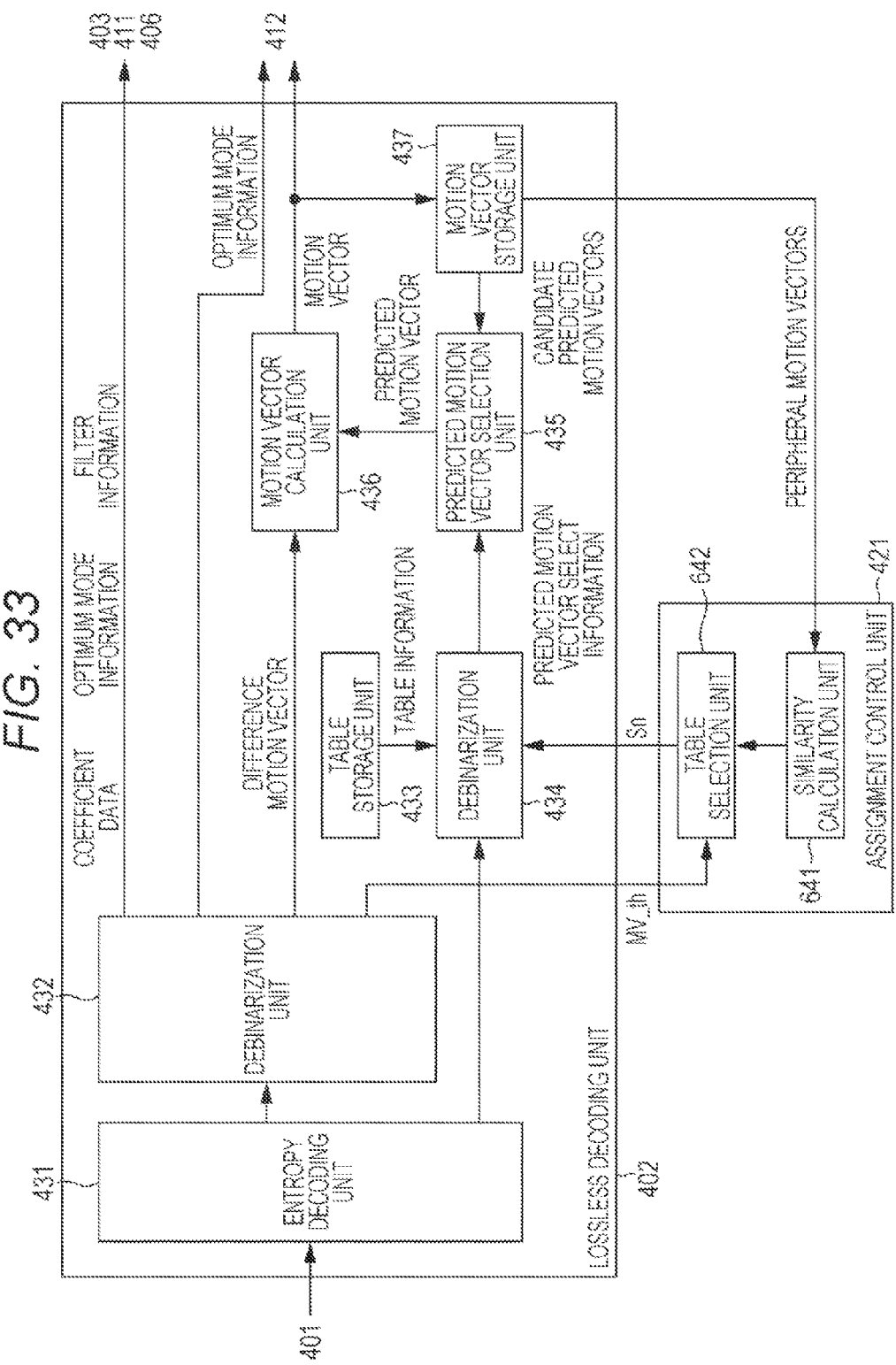
FIG. 33 is a block diagram showing typical example structures of the lossless decoding unit and the assignment control unit shown in FIG. 19.

FIG. 33 is a block diagram showing typical example structures of the lossless decoding unit 402 and the assignment control unit 421 of the image decoding device 400 in this case.

In this case, the lossless decoding unit 402 has the same structure as that in the case illustrated in FIG. 20, but the assignment control unit 421 includes a similarity calculation unit 641 and a table selection unit 642.

The entropy decoding unit 431 decodes the encoded data of the similarity threshold MV_th used in the image encoding device 300. The debinarization unit 432 debinarizes the obtained binarized data, and supplies the obtained similarity threshold MV_th to the table selection unit 642.

The similarity calculation unit 641 acquires peripheral motion vectors stored in the motion vector storage unit 437, and calculates the similarity between the peripheral motion vectors. The method of calculating the similarity is the same as the method used by the similarity calculation unit 542.

The similarity calculation unit 641 supplies the calculated similarity to the table selection unit 642.

The table selection unit 642 compares the similarity with the similarity threshold MV_th, and, in accordance with the magnitude relationship, selects a table (a bit sequence assignment pattern) Sn. The method of selecting a table is the same as the method used by the table selection unit 543.

The table selection unit 642 supplies the selection result Sn to the debinarization unit 434 of the lossless decoding unit 402.

As described above, as the assignment control unit 421 appropriately controls the bit sequence assignment in accordance with the similarity between peripheral motion vectors, the lossless decoding unit 402 can reproduce the same bit sequence assignment as that used in the encoding, and correctly decode the encoded data supplied from the image encoding device 300. In short, the image decoding device 400 can increase encoding efficiency.

[Flow of the Inter Prediction Mode Information Decoding Operation]

Figure 34:
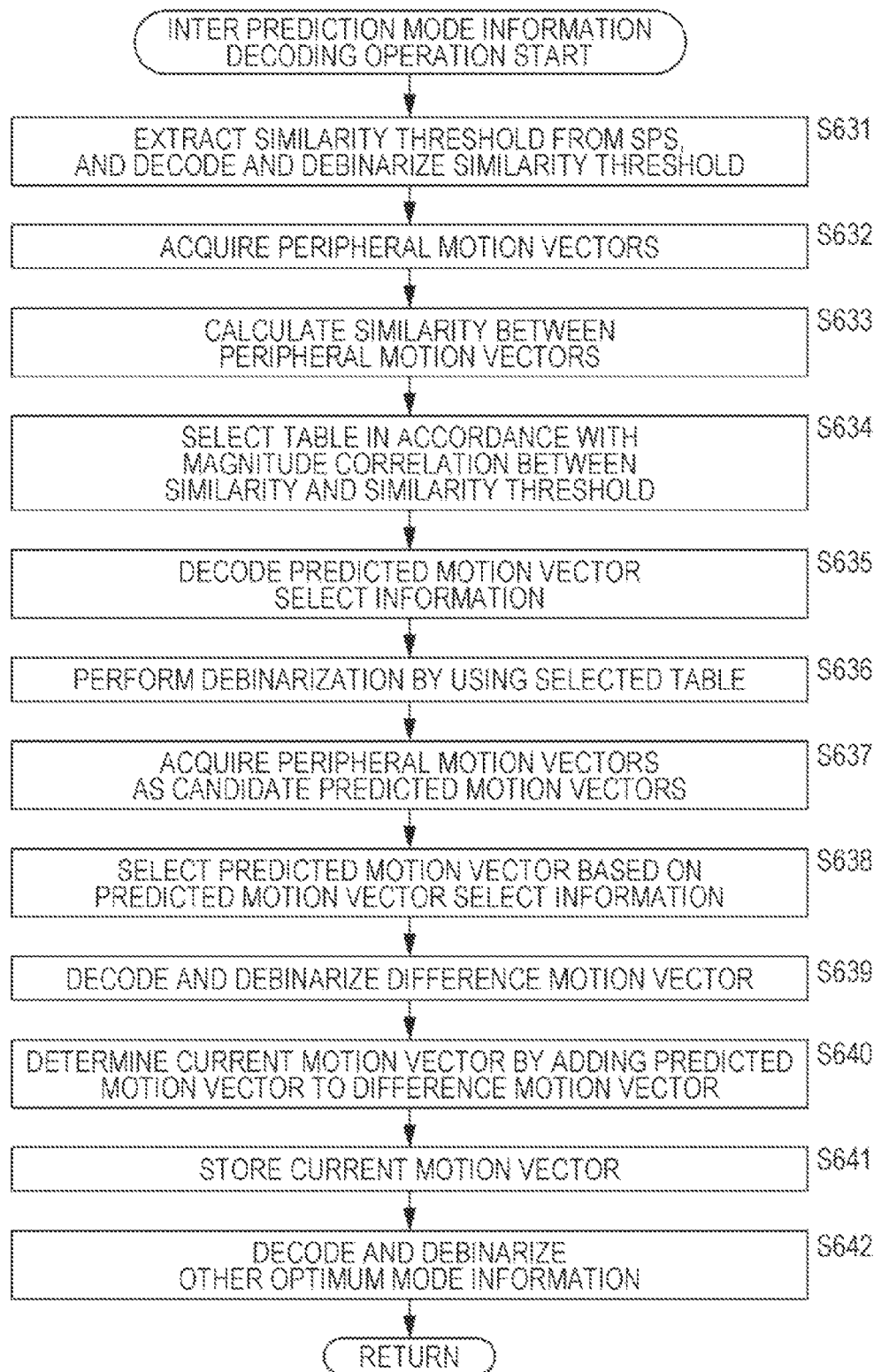
FIG. 34 is a flowchart for explaining another example flow of the inter prediction mode information decoding operation.

Referring now to the flowchart shown in FIG. 34, an example flow of the inter prediction mode information decoding operation in this case is described.

The operation to be performed in this case is also basically the same as the operation performed in the example case illustrated in FIG. 23.

In step S631, however, the entropy decoding unit 431 and the debinarization unit 432 extract the encoded data of the similarity threshold MV_th from the SPS, and decode and debinarize the extracted encoded data.

The similarity calculation unit 641 of the assignment control unit 421 acquires peripheral motion vectors from the motion vector storage unit 437 in step 632, and calculates the similarity between the acquired peripheral motion vectors in step S633.

In step S634, the table selection unit 642 selects a table in accordance with the magnitude relationship between the similarity and the similarity threshold MV_th.

In steps S635 through S642, the same procedures as steps S434 through S441 are carried out.

After the procedure of step S642 is completed, the debinarization unit 432 ends the inter prediction mode information decoding operation. The operation then returns to step S421 of FIG. 22, and moves on to step S422.

As described above, by performing the respective operations, the lossless decoding unit 402 can also reproduce the same bit sequence assignment as that used in the encoding, and correctly decode the encoded data supplied from the image encoding device 300 in this case. In short, the image decoding device 400 can increase encoding efficiency.

[Other Examples]

Like the distance threshold dPOC_th, the similarity threshold MV_th may be a fixed value that is determined in advance. Also, more than one similarity threshold MV_th may be prepared. Further, like the distance threshold dPOC_th, the similarity threshold MV_th can also be stored in any position in a stream, other than the SPS. Also, like the distance threshold dPOC_th, the similarity threshold MV_th can also be changed for each arbitrary processing unit.

<3. Third Embodiment>

[Lossless Encoding Unit and Assignment Control Unit]

In the above description, a parameter threshold such as the distance threshold or the similarity threshold is transmitted from the image encoding device 300 to the image decoding device 400, and the same table selection as that performed in the image encoding device 300 is performed in the image decoding device 400 using the threshold value. However, the present invention is not limited to them, and information indicating the table that has been selected in the image encoding device 300 may be provided to the image decoding device 400. In the image decoding device 400 in this case, the same table as the table that has been selected in the image encoding device 300 is selected based on the information.

In this case, the image decoding device 400 can select the same table as that selected in the image encoding device 300, without depending on the table selection method used in the image encoding device 300.

For example, the image encoding device 300 may control the bit sequence assignment pattern based on the cost function values of the results of predicted motion vector selection, as described below.

Figure 35:
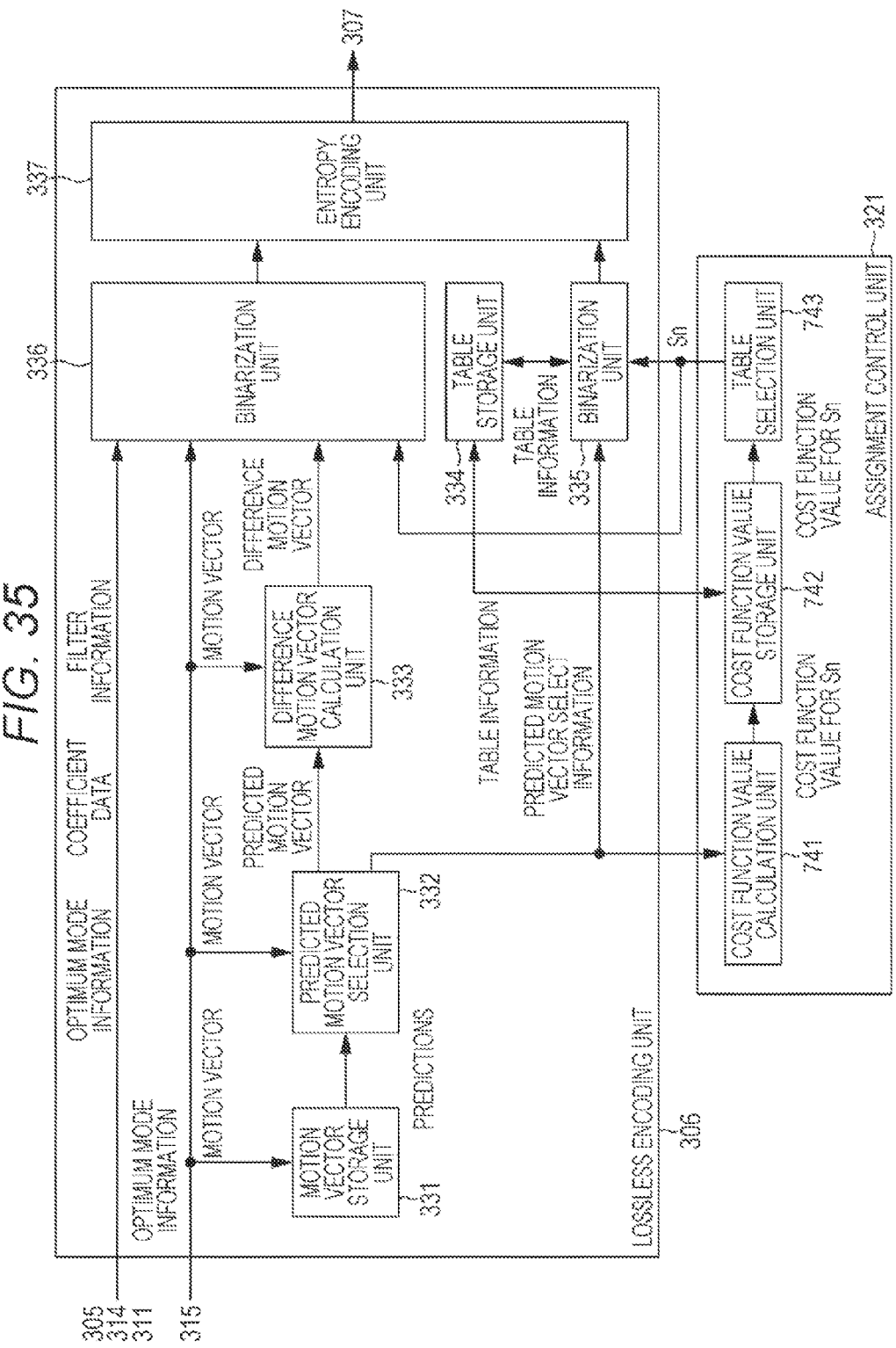
FIG. 35 is a block diagram showing other typical example structures of the lossless encoding unit and the assignment control unit shown in FIG. 11.

FIG. 35 is a block diagram showing typical example structures of the lossless encoding unit 306 and the assignment control unit 321 in such a case.

In this case, the lossless encoding unit 306 also has the same structure as that of the above described other embodiments, but the assignment control unit 321 calculates the cost function values of the results of the predicted motion vector selection performed by the lossless encoding unit 306, and controls the bit sequence assignment pattern based on the cost function values.

The assignment control unit 321 includes a cost function value calculation unit 741, a cost function value storage unit 742, and a table selection unit 743.

The cost function value calculation unit 741 acquires the predicted motion vector select information from the predicted motion vector selection unit 332, and calculates the cost function values of selection results for table (Sn) selection. The cost function value calculation unit 741 supplies the calculated cost function values for Sn to the cost function value storage unit 742.

The cost function value storage unit 742 aggregates the supplied cost functions values for Sn in each table stored in the table storage unit 334, and then stores the cost function values for Sn. The aggregation result is used in selecting tables for regions to be processed in later stages in terms of time than the current PU, which is the current object to be processed.

The table selection unit 743 acquires the result of aggregation of the cost function values for Sn in each of the tables stored in the cost function value storage unit 742. Based on the aggregation result, the table selection unit 743 selects a table (Sn), and supplies the selection result to the binarization unit 335.

The binarization unit 335 refers to the table information that is stored in the table storage unit 334 and has been selected by the table selection unit 743, and binarizes the predicted motion vector select information. The binarized data is supplied to the entropy encoding unit 337, and is then encoded.

The table selection unit 743 also supplies the selection result Sn to the binarization unit 336. Specifically, the table selection result Sn from the table selection unit 743 is binarized by the binarization unit 336, is encoded by the entropy encoding unit 337, and is then supplied to the image decoding device 400.

As described above, the assignment control unit 321 can appropriately control the bit sequence assignment in accordance with the cost function values of the results of predicted motion vector selection. That is, the assignment control unit 321 can also assign a bit sequence having a shorter code length to the selection information about a motion vector having a higher designation frequency in this case. In other words, the assignment control unit 321 can assign a bit sequence having a longer code length to the selection information about a motion vector having a lower designation frequency. Accordingly, the lossless encoding unit 306 can reduce the bit rate of the predicted motion vector select information (pmv_index). In this manner, the image encoding device 300 can increase encoding efficiency.

[Flow of the Inter Prediction Mode Information Encoding Operation]

Figure 36:
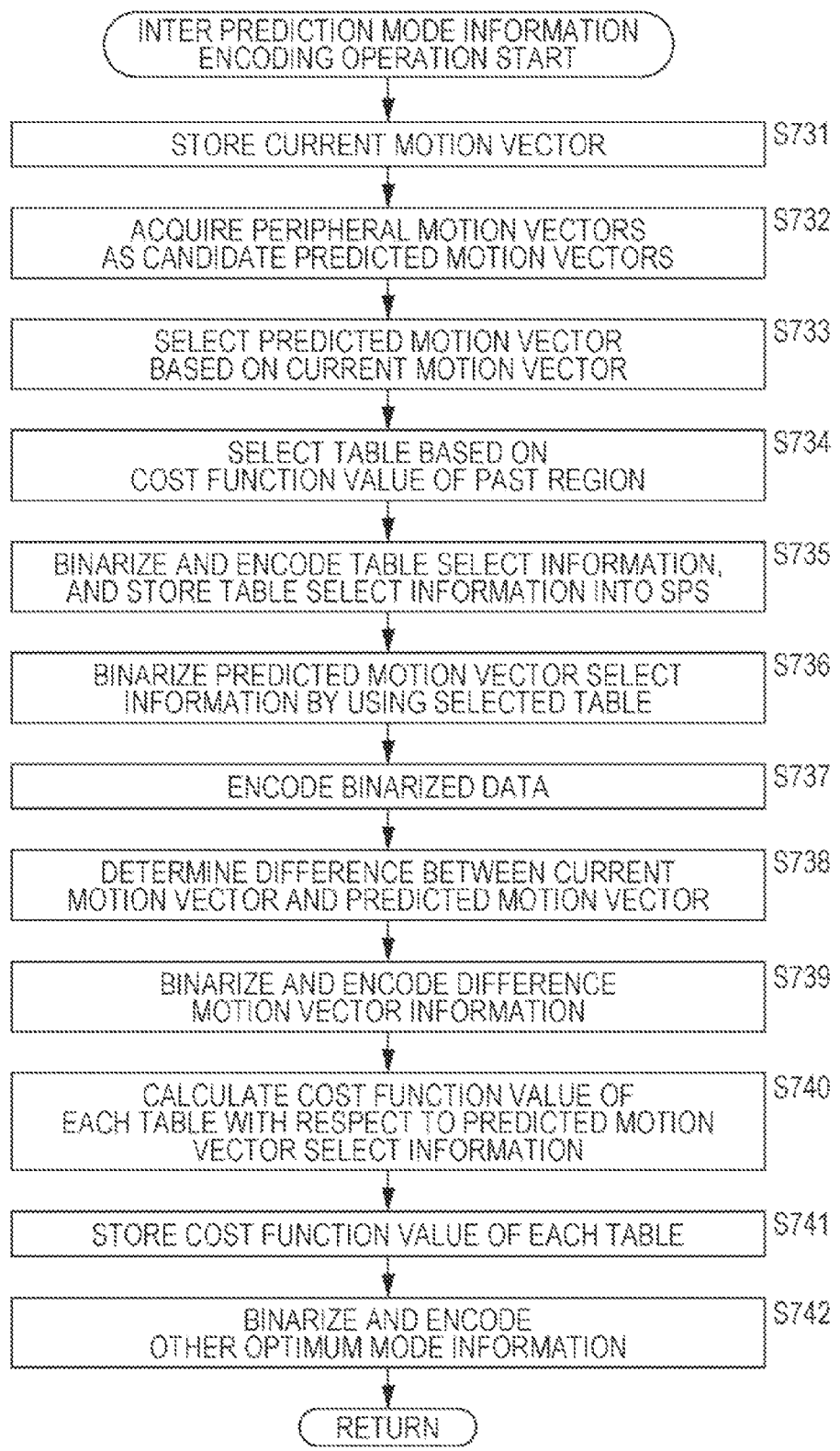
FIG. 36 is a flowchart for explaining yet another example flow of the inter prediction mode information encoding operation.

Referring now to the flowchart shown in FIG. 36, an example flow of the inter prediction mode information encoding operation in this case is described.

The operation to be performed in this case is also basically the same as the operation performed in the case where the distance threshold is used as described above with reference to the flowchart shown in FIG. 18.

In steps S731 through S733, the same procedures as steps S333 through S335 are carried out.

In step S734, the table selection unit 743 selects a table based on (the aggregation result in each table of) the cost function values of the past regions stored in the cost function value storage unit 742.

In step S735, the binarization unit 336 and the entropy encoding unit 337 binarize and encode the table select information (the result of table selection) obtained in step S734, and stores the table select information into the SPS.

In steps S736 through S739, the same procedures as steps S338 through S341 are carried out.

In step S740, the cost function value calculation unit 741 calculates the cost function values corresponding to each table with respect to the predicted motion vector select information. In step S741, the cost function value storage unit 742 aggregates and stores the cost function values calculated in step S740 for each table.

In step S742, the same procedure as step S342 is carried out. After the procedure of step S742 is completed, the entropy encoding unit 337 ends the inter prediction mode information encoding operation. The operation then returns to step S324 of FIG. 17, and moves on to step S325.

As the respective operations are performed in the above described manner, the lossless encoding unit 306 can also reduce the bit rate of the predicted motion vector select information (pmv_index) in this case. In this manner, the image encoding device 300 can increase encoding efficiency.

[Lossless Decoding Unit and Assignment Control Unit]

Next, the image decoding device 400 compatible with the image encoding device 300 in this case is described.

Figure 37:
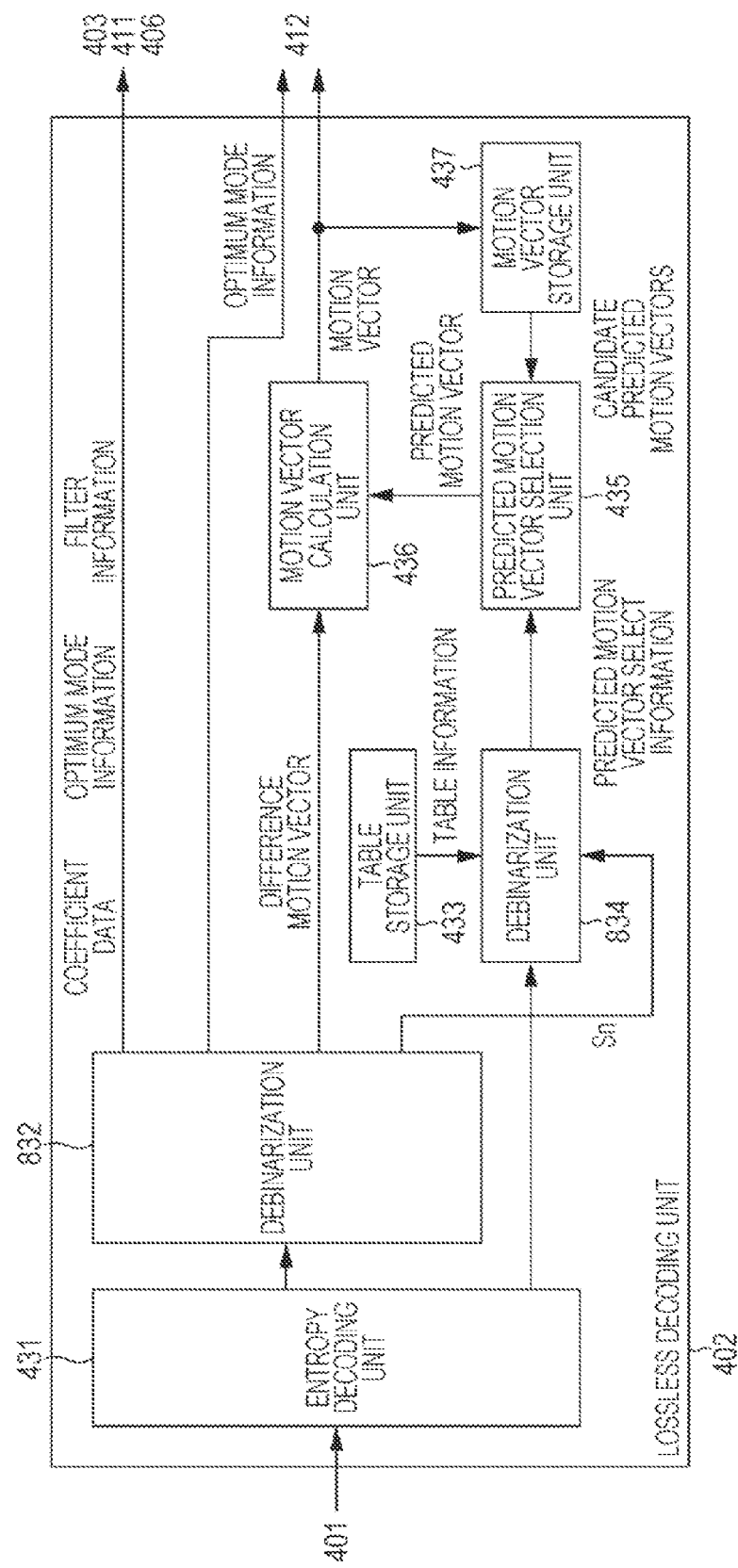
FIG. 37 is a block diagram showing other typical example structures of the lossless decoding unit and the assignment control unit shown in FIG. 19.

FIG. 37 is a block diagram showing a typical example structure of the lossless decoding unit 402 of the image decoding device 400 in this case. In this case, the image decoding device 400 selects a table by using the table select information Sn supplied from the image encoding device 300, and therefore, the assignment control unit 421 is removed.

As shown in FIG. 37, unlike the lossless decoding unit 402 in the example case illustrated in FIG. 20, the lossless decoding unit 402 in this case includes a debinarization unit 832 in place of the debinarization unit 432, and a debinarization unit 834 in place of the debinarization unit 434.

Like the debinarization unit 432, the debinarization unit 832 debinarizes the binarized data of the coefficient data, the optimum mode information, the filter information, the difference motion vector, and the like, and also debinarizes the binarized data of the table select information Sn. The debinarization unit 832 supplies the table select information Sn obtained through the debinarization, to the debinarization unit 834.

The debinarization unit 834 refers to the table information that is stored in the table storage unit 433 and is indicated by the table select information Sn supplied from the debinarization unit 832, and debinarizes the binarized data that is formed by binarizing the predicted motion vector select information and is supplied from the entropy decoding unit 431.

The debinarization unit 834 supplies the predicted motion vector select information obtained through the debinarization, to the predicted motion vector selection unit 435.

In this manner, the lossless decoding unit 402 appropriately debinarizes the binarized data of the predicted motion vector select information, by using the result of table information selection performed in the image encoding device 300, the result being supplied from the image encoding device 300. That is, the lossless decoding unit 402 can also reproduce the same bit sequence assignment as that used in the encoding, and correctly decode the encoded data supplied from the image encoding device 300 in this case. In short, the image decoding device 400 can increase encoding efficiency.

[Flow of the Inter Prediction Mode Information Decoding Operation]

Figure 38:
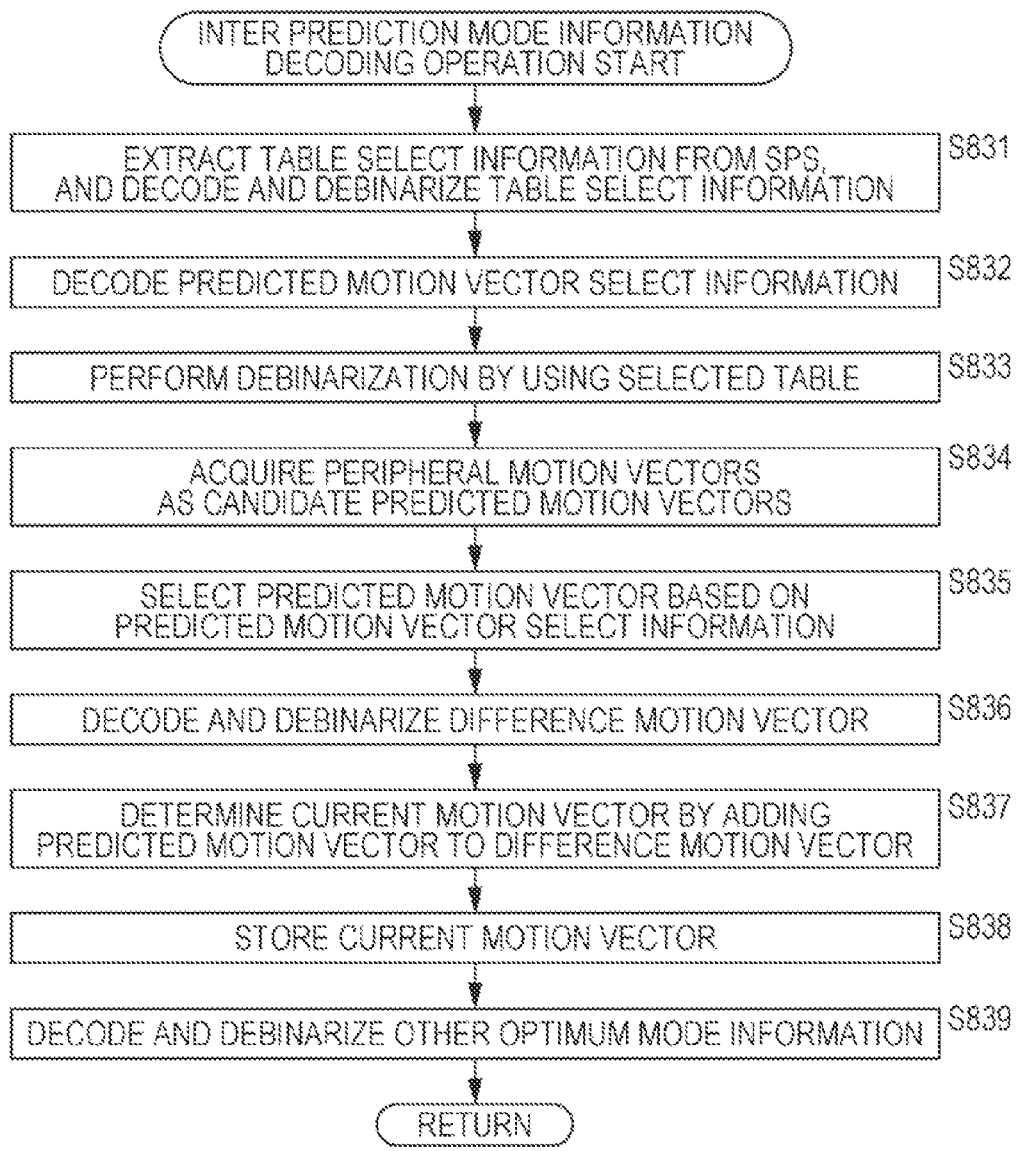
FIG. 38 is a flowchart for explaining yet another example flow of the inter prediction mode information decoding operation.

Referring now to the flowchart shown in FIG. 38, an example flow of the inter prediction mode information decoding operation in this case is described.

The operation to be performed in this case is also basically the same as the operation performed in the example case illustrated in FIG. 23.

In step S831, however, the entropy decoding unit 431 and the debinarization unit 832 extract the encoded data of the table select information Sn from the SPS, and decode and debinarize the extracted encoded data. That is, a table is selected at this point.

In steps S832 through S839, the same procedures as steps S434 through S441 are carried out.

After the procedure of step S839 is completed, the debinarization unit 832 ends the inter prediction mode information decoding operation. The operation then returns to step S421 of FIG. 22, and moves on to step S422.

As described above, by performing the respective operations, the lossless decoding unit 402 can also reproduce the same bit sequence assignment as that used in the encoding, and correctly decode the encoded data supplied from the image encoding device 300 in this case. In short, the image decoding device 400 can increase encoding efficiency.

[Other Examples]

In the above description, the cost function values are calculated based on the predicted motion vector select information about the regions that have been processed in the past, and the table information about the current region to be processed is selected by using the cost function values. However, the table information about the current region to be processed may be selected by using the cost function value of the predicted motion vector select information about the current region to be processed.

Although the table select information Sn is stored into the SPS in the above description, the table select information Sn may be stored in any position in a stream other than the SPS, like the distance threshold dPOC_th.

The method of transmitting the table select information Sn from the image encoding device 300 to the image decoding device 400 can be applied in the above described case where the image encoding device 300 selects a table by using the distance threshold dPOC_th, or in the above described case where the image encoding device 300 selects a table by using the similarity threshold MV_th. In either case, however, the image decoding device 400 selects a table based on the table select information Sn supplied from the image encoding device 300, as described above with reference to FIG. 37.

In any of the above described cases, the switching of tables can be performed for each arbitrary processing unit, such as each PU (or each divided part thereof), each slice, each picture, or each sequence.

<4. Fourth Embodiment>
[Personal Computer]

The above described series of operations can be performed by hardware or can be performed by software. In this case, the operations may be performed by the computer shown in FIG. 39, for example.

Figure 39:
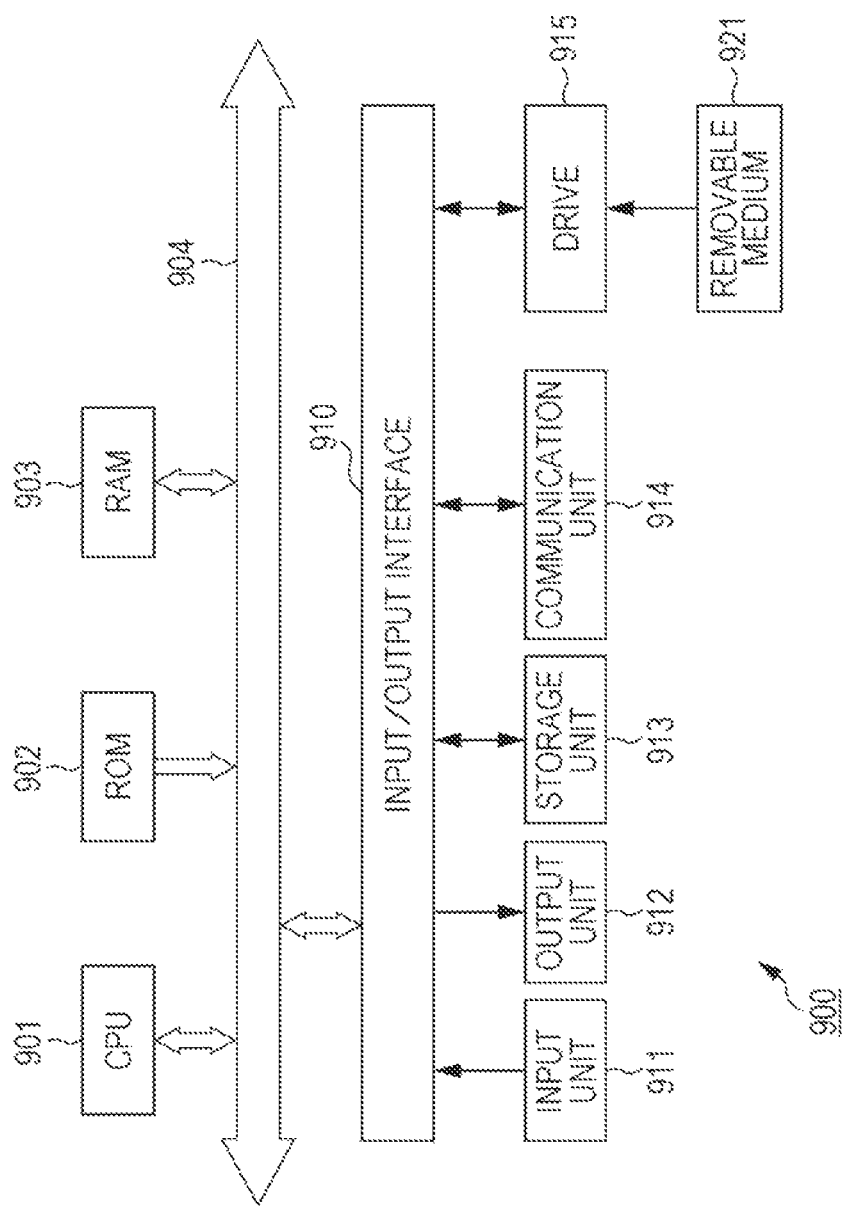
FIG. 39 is a block diagram showing a typical example structure of a personal computer.

In FIG. 39, the CPU (Central Processing Unit) 901 of the personal computer 900 performs various kinds of operations in accordance with a program stored in a ROM (Read Only Memory) 902 or a program loaded into a RAM (Random Access Memory) 903 from a storage unit 913. The data necessary for the CPU 901 to perform various kinds of operations is also stored in the RAM 903 where necessary.

The CPU 901, the ROM 902, and the RAM 903 are connected to one another via a bus 904. An input/output interface 910 is also connected to the bus 904.

The input/output interface 910 has the following components connected thereto: an input unit 911 formed with a keyboard, a mouse, or the like; an output unit 912 formed with a display such as a CRT (Cathode Ray Tube) or a LCD (Liquid Crystal Display), and a speaker; the storage unit 913 formed with a hard disk or the like; and a communication unit 914 formed with a modem. The communication unit 914 performs communications via networks including the Internet.

A drive 915 is also connected to the input/output interface 910 where necessary, and a removable medium 921 such as a magnetic disk, an optical disk, a magnetooptical disk, or a semiconductor memory is mounted on the drive as appropriate. A computer program read from such a removable disk is installed in the storage unit 913 where necessary.

When the above described series of operations are performed by software, a program to form the software is installed from a network or a recording medium.

As shown in FIG. 39, this recording medium is formed with the removable medium 921 that is distributed for delivering the program to users separately from the device, such as a magnetic disk (including a flexible disk), an optical disk (including a CD-ROM (Compact Disc-Read Only Memory) or a DVD (Digital Versatile Disc)), a magnetooptical disk (including an MD (Mini Disc)), or a semiconductor memory, which has the program recorded thereon. Alternatively, the recording medium may be formed with the ROM 902 having the program recorded therein or a hard disk included in the storage unit 913. Such a recording medium is incorporated beforehand into the device prior to the delivery to users.

The program to be executed by the computer may be a program for carrying out processes in chronological order in accordance with the sequence described in this specification, or a program for carrying out processes in parallel or whenever necessary such as in response to a call.

In this specification, the step written in the program to be recorded in a recording medium includes operations to be performed in parallel or independently of one another if not necessarily in chronological order, as well as operations to be performed in chronological order in accordance with the sequence described herein.

In this specification, a "system" means an entire apparatus formed with two or more devices (apparatuses).

Also, in the above described examples, any structure described as one device (or one processing unit) may be divided into two or more devices (or processing units). Conversely, any structure described as two or more devices (or processing units) may be combined to form one device (or one processing unit). Also, it is of course possible to add a structure other than the above described ones to the structure of any of the devices (or any of the processing units). Further, as long as the structure and function of the entire system remain the same, part of the structure of a device (or a processing unit) may be incorporated into another device (or another processing unit). That is, embodiments of the present technique are not limited to the above described embodiments, and various modifications may be made to them without departing from the scope of the technique.

For example, the above described image encoding device 300 and the image decoding device 400 can be applied to any electronic apparatuses. The following is a description of such examples.

<5. Fifth Embodiment>
[Television Receiver]

Figure 40:
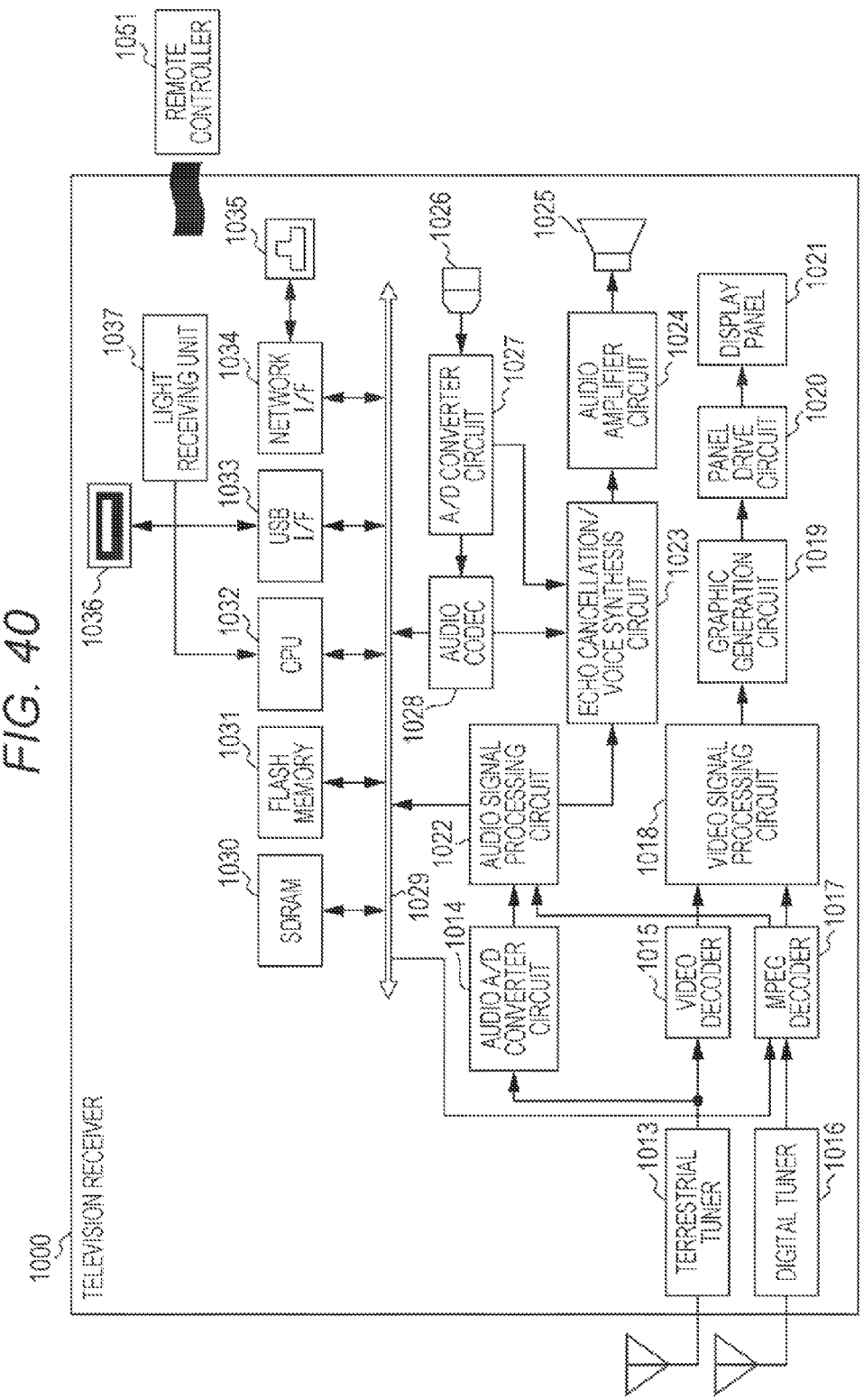
FIG. 40 is a block diagram showing a typical example structure of a television receiver.

FIG. 40 is a block diagram showing a typical example structure of a television receiver using the image decoding device 400.

The television receiver 1000 shown in FIG. 40 includes a terrestrial tuner 1013, a video decoder 1015, a video signal processing circuit 1018, a graphic generation circuit 1019, a panel drive circuit 1020, and a display panel 1021.

The terrestrial tuner 1013 receives a broadcast wave signal of analog terrestrial broadcasting via an antenna, and demodulates the signal to obtain a video signal. The terrestrial tuner 1013 supplies the video signal to the video decoder 1015. The video decoder 1015 performs a decoding operation on the video signal supplied from the terrestrial tuner 1013, and supplies the resultant digital component signal to the video signal processing circuit 1018.

The video signal processing circuit 1018 performs predetermined processing such as denoising on the video data supplied from the video decoder 1015, and supplies the resultant video data to the graphic generation circuit 1019.

The graphic generation circuit 1019 generates video data of a show to be displayed on the display panel 1021, or image data by performing an operation based on an application supplied via a network. The graphic generation circuit 1019 supplies the generated video data or image data to the panel drive circuit 1020. The graphic generation circuit 1019 also generates video data (graphics) for displaying a screen to be used by a user to select an item, and superimposes the video data on the video data of the show. The resultant video data is supplied to the panel drive circuit 1020 where appropriate.

Based on the data supplied from the graphic generation circuit 1019, the panel drive circuit 1020 drives the display panel 1021, and causes the display panel 1021 to display the video image of the show and each screen described above.

The display panel 1021 is formed with an LCD (Liquid Crystal Display) or the like, and displays the video image of a show or the like under the control of the panel drive circuit 1020.

The television receiver 1000 also includes an audio A/D (Analog/Digital) converter circuit 1014, an audio signal processing circuit 1022, an echo cancellation/voice synthesis circuit 1023, an audio amplifier circuit 1024, and a speaker 1025.

The terrestrial tuner 1013 obtains not only a video signal but also an audio signal by demodulating a received broadcast wave signal. The terrestrial tuner 1013 supplies the obtained audio signal to the audio A/D converter circuit 1014.

The audio A/D converter circuit 1014 performs an A/D converting operation on the audio signal supplied from the terrestrial tuner 1013, and supplies the resultant digital audio signal to the audio signal processing circuit 1022.

The audio signal processing circuit 1022 performs predetermined processing such as denoising on the audio data supplied from the audio A/D converter circuit 1014, and supplies the resultant audio data to the echo cancellation/voice synthesis circuit 1023.

The echo cancellation/voice synthesis circuit 1023 supplies the audio data supplied from the audio signal processing circuit 1022 to the audio amplifier circuit 1024.

The audio amplifier circuit 1024 performs a D/A converting operation and an amplifying operation on the audio data supplied from the echo cancellation/voice synthesis circuit 1023. After adjusted to a predetermined sound volume, the sound is output from the speaker 1025.

The television receiver 1000 further includes a digital tuner 1016 and an MPEG decoder 1017.

The digital tuner 1016 receives a broadcast wave signal of digital broadcasting (digital terrestrial broadcasting or digital BS (Broadcasting Satellite)/CS (Communications Satellite) broadcasting) via the antenna, and demodulates the broadcast wave signal, to obtain an MPEG-TS (Moving Picture Experts Group-Transport Stream). The MPEG-TS is supplied to the MPEG decoder 1017.

The MPEG decoder 1017 descrambles the MPEG-TS supplied from the digital tuner 1016, and extracts the stream containing the data of the show to be reproduced (to be viewed). The MPEG decoder 1017 decodes the audio packet forming the extracted stream, and supplies the resultant audio data to the audio signal processing circuit 1022. The MPEG decoder 1017 also decodes the video packet forming the stream, and supplies the resultant video data to the video signal processing circuit 1018. The MPEG decoder 1017 also supplies EPG (Electronic Program Guide) data extracted from the MPEG-TS to a CPU 1032 via a path (not shown).

The television receiver 1000 uses the above described image decoding device 400 as the MPEG decoder 1017, which decodes the video packet as described above. The MPEG-TS transmitted from a broadcast station or the like has been encoded by the image encoding device 300.

As in the case of the image decoding device 400, the MPEG decoder 1017 appropriately controls bit sequence assignment in accordance with a predetermined parameter. Accordingly, the MPEG decoder 1017 can reproduce the same bit sequence assignment as that used in the encoding, and correctly decode encoded data supplied from the encoding side. In this manner, the MPEG decoder 1017 can increase encoding efficiency for encoded data.

The video data supplied from the MPEG decoder 1017 is subjected to predetermined processing at the video signal processing circuit 1018, as in the case of the video data supplied from the video decoder 1015. At the graphic generation circuit 1019, generated video data and the like are superimposed on the video data where appropriate. The resultant video data is supplied to the display panel 1021 via the panel drive circuit 1020, and the image is displayed.

The audio data supplied from the MPEG decoder 1017 is subjected to predetermined processing at the audio signal processing circuit 1022, as in the case of the audio data supplied from the audio A/D converter circuit 1014. The resultant audio data is supplied to the audio amplifier circuit 1024 via the echo cancellation/voice synthesis circuit 1023, and is subjected to a D/A converting operation or an amplifying operation. As a result, a sound that is adjusted to a predetermined sound level is output from the speaker 1025.

The television receiver 1000 also includes a microphone 1026 and an A/D converter circuit 1027.

The A/D converter circuit 1027 receives a signal of a user's voice captured by the microphone 1026 provided for voice conversations in the television receiver 1000. The A/D converter circuit 1027 performs an A/D converting operation on the received audio signal, and supplies the resultant digital audio data to the echo cancellation/voice synthesis circuit 1023.

When audio data of a user (a user A) of the television receiver 1000 is supplied from the A/D converter circuit 1027, the echo cancellation/voice synthesis circuit 1023 performs echo cancellation on the audio data of the user A, and combines the audio data with other audio data or the like. The resultant audio data is output from the speaker 1025 via the audio amplifier circuit 1024.

The television receiver 1000 further includes an audio codec 1028, an internal bus 1029, an SDRAM (Synchronous Dynamic Random Access Memory) 1030, a flash memory 1031, the CPU 1032, a USB (Universal Serial Bus) I/F 1033, and a network I/F 1034.

The A/D converter circuit 1027 receives the signal of the user's voice captured by the microphone 1026 provided for voice conversations in the television receiver 1000. The A/D converter circuit 1027 performs an A/D converting operation on the received audio signal, and supplies the resultant digital audio data to the audio codec 1028.

The audio codec 1028 transforms the audio data supplied from the A/D converter circuit 1027 into data in a predetermined format for transmission via a network, and supplies the result to the network I/F 1034 via the internal bus 1029.

The network I/F 1034 is connected to a network via a cable attached to a network terminal 1035. The network I/F 1034 transmits the audio data supplied from the audio codec 1028 to another device connected to the network, for example. The network I/F 1034 also receives, via the network terminal 1035, audio data transmitted from another device connected to the network, and supplies the audio data to the audio codec 1028 via the internal bus 1029.

The audio codec 1028 transforms the audio data supplied from the network I/F 1034 into data in a predetermined format, and supplies the result to the echo cancellation/voice synthesis circuit 1023.

The echo cancellation/voice synthesis circuit 1023 performs echo cancellation on the audio data supplied from the audio codec 1028, and combines the audio data with other audio data or the like. The resultant audio data is output from the speaker 1025 via the audio amplifier circuit 1024.

The SDRAM 1030 stores various kinds of data necessary for the CPU 1032 to perform processing.

The flash memory 1031 stores the program to be executed by the CPU 1032. The program stored in the flash memory 1031 is read by the CPU 1032 at a predetermined time, such as when the television receiver 1000 is activated. The flash memory 1031 also stores EPG data obtained through digital broadcasting, data obtained from a predetermined server via a network, and the like.

For example, the flash memory 1031 stores a MPEG-TS containing content data obtained from a predetermined server via a network, under the control of the CPU 1032. The flash memory 1031 supplies the MPEG-TS to the MPEG decoder 1017 via the internal bus 1029, under the control of the CPU 1032, for example.

The MPEG decoder 1017 processes the MPEG-TS, as in the case of the MPEG-TS supplied from the digital tuner 1016. In this manner, the television receiver 1000 receives the content data formed with a video image and a sound via the network, and decodes the content data by using the MPEG decoder 1017, to display the video image and output the sound.

The television receiver 1000 also includes a light receiving unit 1037 that receives an infrared signal transmitted from a remote controller 1051.

The light receiving unit 1037 receives an infrared ray from the remote controller 1051, and performs demodulation. The light receiving unit 1037 outputs a control code indicating the contents of a user operation obtained through the demodulation, to the CPU 1032.

The CPU 1032 executes the program stored in the flash memory 1031, and controls the entire operation of the television receiver 1000 in accordance with the control code and the like supplied from the light receiving unit 1037. The respective components of the television receiver 1000 are connected to the CPU 1032 via paths (not shown).

The USB I/F 1033 exchanges data with an apparatus that is located outside the television receiver 1000 and is connected thereto via a USB cable attached to a USB terminal 1036. The network I/F 1034 is connected to the network via the cable attached to the network terminal 1035, and also exchanges data other than audio data with various kinds of devices connected to the network.

Using the image decoding device 400 as the MPEG decoder 1017, the television receiver 1000 can increase the encoding efficiency of broadcast wave signals received via an antenna or content data obtained via a network.

<6. Sixth Embodiment>
[Portable Telephone Device]

Figure 41:
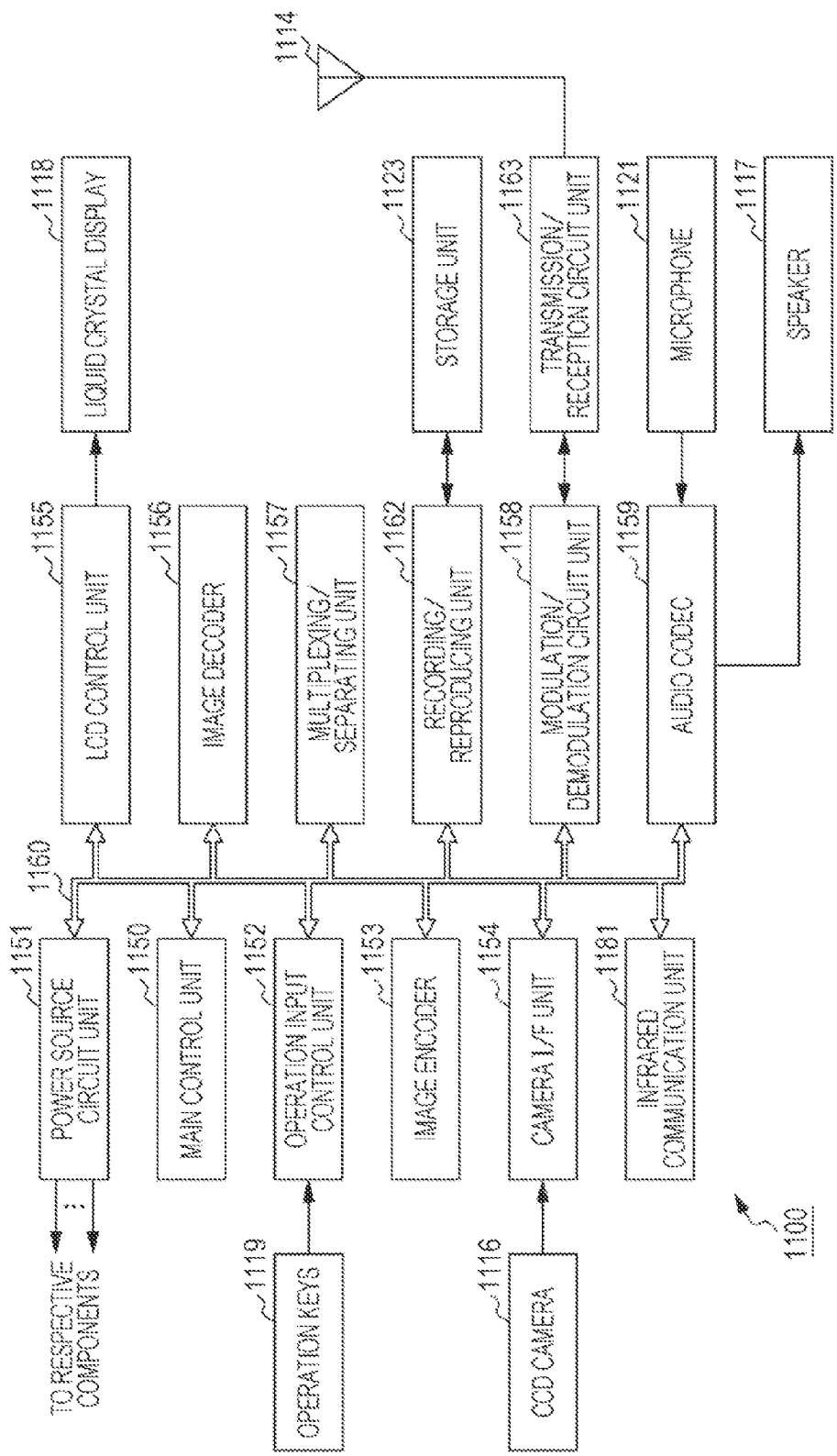
FIG. 41 is a block diagram showing a typical example structure of a portable telephone device.

FIG. 41 is a block diagram showing a typical example structure of a portable telephone device using the image encoding device 300 and the image decoding device 400.

The portable telephone device 1100 shown in FIG. 41 includes a main control unit 1150 designed to collectively control respective components, a power source circuit unit 1151, an operation input control unit 1152, an image encoder 1153, a camera I/F unit 1154, an LCD control unit 1155, an image decoder 1156, a multiplexing/separating unit 1157, a recording/reproducing unit 1162, a modulation/demodulation circuit unit 1158, and an audio codec 1159. Those components are connected to one another via a bus 1160.

The portable telephone device 1100 also includes operation keys 1119, a CCD (Charge Coupled Device) camera 1116, a liquid crystal display 1118, a storage unit 1123, a transmission/reception circuit unit 1163, an antenna 1114, a microphone (mike) 1121, and a speaker 1117.

When a call is ended or the power key is switched on by a user's operation, the power source circuit unit 1151 puts the portable telephone device 1100 into an operable state by supplying power from a battery pack to the respective components.

Under the control of the main control unit 1150 formed with a CPU, a ROM, a RAM, and the like, the portable telephone device 1100 performs various kinds of operations, such as transmission and reception of audio signals, transmission and reception of electronic mail and image data, image capturing, and data recording, in various kinds of modes such as a voice communication mode and a data communication mode.

In the portable telephone device 1100 in the voice communication mode, for example, an audio signal captured by the microphone (mike) 1121 is transformed into digital audio data by the audio codec 1159, and the digital audio data is subjected to spread spectrum processing at the modulation/demodulation circuit unit 1158. The resultant data is then subjected to a digital-analog converting operation and a frequency converting operation at the transmission/reception circuit unit 1163. The portable telephone device 1100 transmits the transmission signal obtained through the converting operations to a base station (not shown) via the antenna 1114. The transmission signal (audio signal) transmitted to the base station is further supplied to the portable telephone device at the other end of the communication via a public telephone line network.

Also, in the portable telephone device 1100 in the voice communication mode, for example, a reception signal received by the antenna 1114 is amplified at the transmission/reception circuit unit 1163, and is further subjected to a frequency converting operation and an analog-digital converting operation. The resultant signal is subjected to inverse spread spectrum processing at the modulation/demodulation circuit unit 1158, and is transformed into an analog audio signal by the audio codec 1159. The portable telephone device 1100 outputs, from the speaker 1117, the analog audio signal obtained through the conversions.

Further, when electronic mail is transmitted in the data communication mode, for example, the operation input control unit 1152 of the portable telephone device 1100 receives text data of the electronic mail that is input by operating the operation keys 1119. The portable telephone device 1100 processes the text data at the main control unit 1150, and displays the text data as an image on the liquid crystal display 1118 via the LCD control unit 1155.

In the portable telephone device 1100, the main control unit 1150 generates electronic mail data based on text data, a user's instruction, or the like received by the operation input control unit 1152. The portable telephone device 1100 subjects the electronic mail data to spread spectrum processing at the modulation/demodulation circuit unit 1158, and to a digital-analog converting operation and a frequency converting operation at the transmission/reception circuit unit 1163. The portable telephone device 1100 transmits the transmission signal obtained through the converting operations to a base station (not shown) via the antenna 1114. The transmission signal (electronic mail) transmitted to the base station is supplied to a predetermined address via a network, a mail server, and the like.

When electronic mail is received in the data communication mode, for example, the transmission/reception circuit unit 1163 of the portable telephone device 1100 receives a signal transmitted from a base station via the antenna 1114, and the signal is amplified and is further subjected to a frequency converting operation and an analog-digital converting operation. The portable telephone device 1100 subjects the received signal to inverse spread spectrum processing at the modulation/demodulation circuit unit 1158, to restore the original electronic mail data. The portable telephone device 1100 displays the restored electronic mail data on the liquid crystal display 1118 via the LCD control unit 1155.

The portable telephone device 1100 can also record (store) the received electronic mail data into the storage unit 1123 via the recording/reproducing unit 1162.

The storage unit 1123 is a rewritable storage medium. The storage unit 1123 may be a semiconductor memory such as a RAM or an internal flash memory, a hard disk, or a removable medium such as a magnetic disk, a magnetooptical disk, an optical disk, a USB memory, or a memory card. It is of course possible to use a memory other than the above.

Further, when image data is transmitted in the data communication mode, for example, the portable telephone device 1100 generates the image data at the CCD camera 1116 capturing an image. The CCD camera 1116 includes optical devices such as a lens and a diaphragm, and a CCD as a photoelectric conversion device. The CCD camera 1116 captures an image of an object, converts the intensity of received light into an electrical signal, and generates image data of the image of the object. The CCD camera 1116 encodes the image data at the image encoder 1153 via the camera I/F unit 1154, to obtain encoded image data.

The portable telephone device 1100 uses the above described image encoding device 300 as the image encoder 1153 that performs the above operation. As in the case of the image encoding device 300, the image encoder 1153 appropriately controls bit sequence assignment in accordance with a predetermined parameter. That is, the image encoder 1153 can assign a bit sequence having a shorter code length to the selection information about a motion vector having a higher designation frequency. In this manner, the image encoder 1153 can increase encoding efficiency for encoded data.

At the same time as above, in the portable telephone device 1100, the sound captured by the microphone (mike) 1121 during the image capturing by the CCD camera 1116 is analog-digital converted at the audio codec 1159, and is further encoded.

The multiplexing/separating unit 1157 of the portable telephone device 1100 multiplexes the encoded image data supplied from the image encoder 1153 and the digital audio data supplied from the audio codec 1159 by a predetermined method. The portable telephone device 1100 subjects the resultant multiplexed data to spread spectrum processing at the modulation/demodulation circuit unit 1158, and to a digital-analog converting operation and a frequency converting operation at the transmission/reception circuit unit 1163. The portable telephone device 1100 transmits the transmission signal obtained through the converting operations to a base station (not shown) via the antenna 1114. The transmission signal (image data) transmitted to the base station is supplied to the other end of the communication via a network or the like.

When image data is not transmitted, the portable telephone device 1100 can also display image data generated at the CCD camera 1116 on the liquid crystal display 1118 via the LCD control unit 1155, instead of the image encoder 1153.

When the data of a moving image file linked to a simplified homepage or the like is received in the data communication mode, for example, the transmission/reception circuit unit 1163 of the portable telephone device 1100 receives a signal transmitted from a base station via the antenna 1114. The signal is amplified, and is further subjected to a frequency converting operation and an analog-digital converting operation. The portable telephone device 1100 subjects the received signal to inverse spread spectrum processing at the modulation/demodulation circuit unit 1158, to restore the original multiplexed data. The portable telephone device 1100 divides the multiplexed data into encoded image data and audio data at the multiplexing/separating unit 1157.

By decoding the encoded image data at the image decoder 1156, the portable telephone device 1100 generates reproduced moving image data, and displays the reproduced moving image data on the liquid crystal display 1118 via the LCD control unit 1155. In this manner, the moving image data contained in a moving image file linked to a simplified homepage, for example, is displayed on the liquid crystal display 1118.

The portable telephone device 1100 uses the above described image decoding device 400 as the image decoder 1156 that performs the above operation. As in the case of the image decoding device 400, the image decoder 1156 appropriately controls bit sequence assignment in accordance with a predetermined parameter. Accordingly, the image decoder 1156 can reproduce the same bit sequence assignment as that used in the encoding, and correctly decode encoded data supplied from the encoding side. In this manner, the image decoder 1156 can increase encoding efficiency for encoded data.

At the same time as above, the portable telephone device 1100 transforms the digital audio data into an analog audio signal at the audio codec 1159, and outputs the analog audio signal from the speaker 1117. In this manner, the audio data contained in a moving image file linked to a simplified homepage, for example, is reproduced.

As in the case of electronic mail, the portable telephone device 1100 can also record (store) received data linked to a simplified homepage or the like into the storage unit 1123 via the recording/reproducing unit 1162.

The main control unit 1150 of the portable telephone device 1100 can also analyze a two-dimensional code obtained by the CCD camera 1116 performing image capturing, and obtain the information recorded in the two-dimensional code.

Further, an infrared communication unit 1181 of the portable telephone device 1100 can communicate with an external apparatus by using infrared rays.

By using the image encoding device 300 as the image encoder 1153, the portable telephone device 1100 can increase encoding efficiency for encoded data when image data generated by the CCD camera 1116 is encoded and is then transmitted, for example.

Also, by using the image decoding device 400 as the image decoder 1156, the portable telephone device 1100 can increase the encoding efficiency for the data (encoded data) of a moving image file linked to a simplified homepage, for example.

In the above description, the portable telephone device 1100 uses the CCD camera 1116. However, instead of the CCD camera 1116, an image sensor (a CMOS image sensor) using a CMOS (Complementary Metal Oxide Semiconductor) may be used. In that case, the portable telephone device 1100 can also capture an image of an object, and generate the image data of the image of the object, as in the case where the CCD camera 1116 is used.

Although the portable telephone device 1100 has been described above, the image encoding device 300 and the image decoding device 400 can also be applied to any device in the same manner as in the case of the portable telephone device 1100, as long as the device has the same image capturing function and the same communication function as the portable telephone 1100. Such a device may be a PDA (Personal Digital Assistant), a smartphone, an UMPC (Ultra Mobile Personal Computer), a netbook, or a notebook personal computer, for example.

<7. Seventh Embodiment>
[Hard Disk Recorder]

Figure 42:
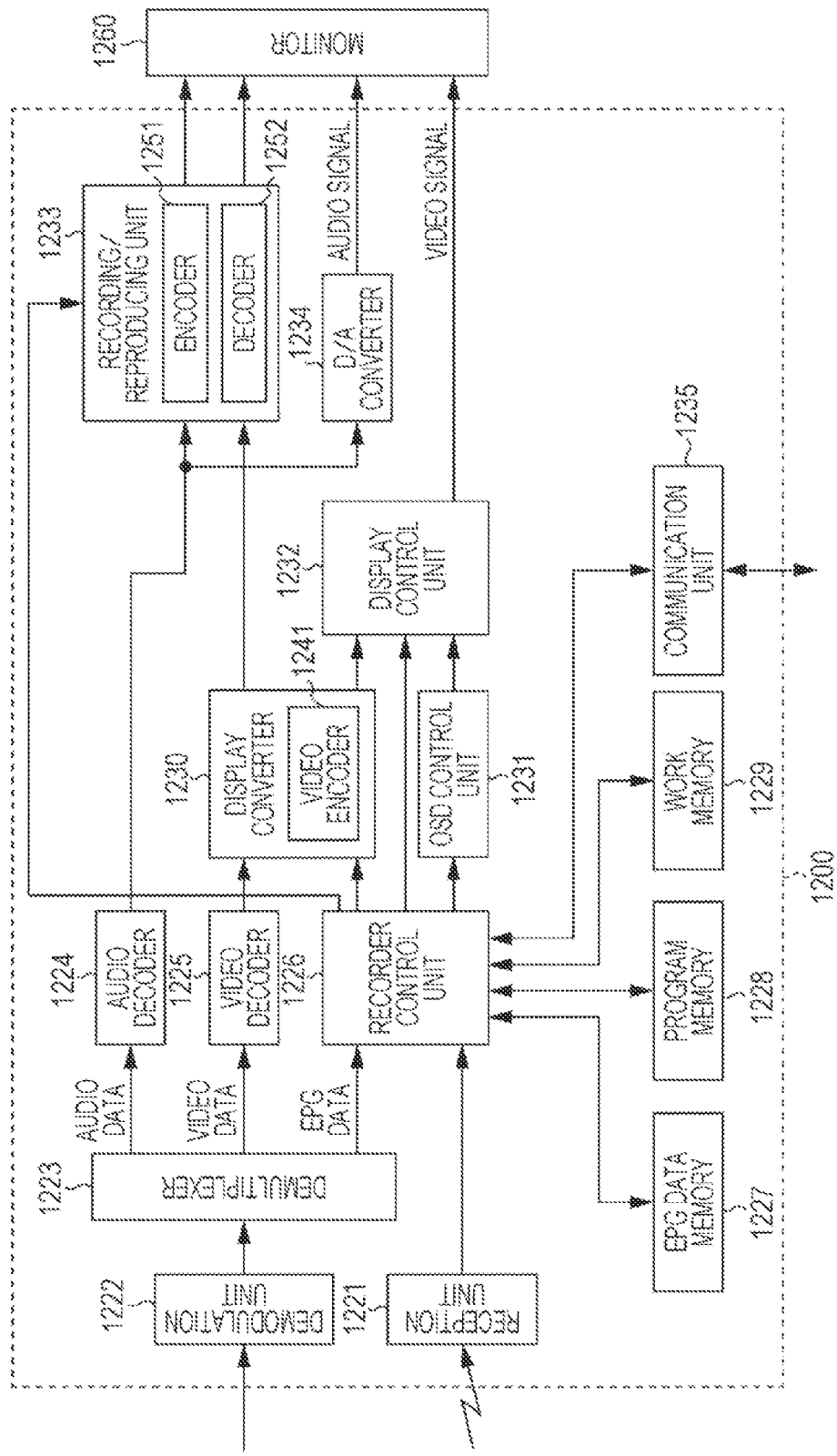
FIG. 42 is a block diagram showing a typical example structure of a hard disk recorder.

FIG. 42 is a block diagram showing a typical example structure of a hard disk recorder using the image encoding device 300 and the image decoding device 400.

The hard disk recorder (a HDD recorder) 1200 shown in FIG. 42 is a device that stores, into an internal hard disk, the audio data and the video data of a broadcast show contained in a broadcast wave signal (a television signal) that is transmitted from a satellite or a terrestrial antenna or the like and is received by a tuner, and provides the stored data to a user at a time designated by an instruction from the user.

The hard disk recorder 1200 can extract audio data and video data from a broadcast wave signal, for example, decode those data where appropriate, and store the data into an internal hard disk. Also, the hard disk recorder 1200 can obtain audio data and video data from another device via a network, for example, decode those data where appropriate, and store the data into an internal hard disk.

Further, the hard disk recorder 1200 can decode audio data and video data recorded on an internal hard disk, for example, supply those data to a monitor 1260, display the image on the screen of the monitor 1260, and output the sound from the speaker of the monitor 1260. Also, the hard disk recorder 1200 can decode audio data and video data extracted from a broadcast wave signal obtained via a tuner, or audio data and video data obtained from another device via a network, for example, supply those data to the monitor 1260, display the image on the screen of the monitor 1260, and output the sound from the speaker of the monitor 1260.

The hard disk recorder 700 can of course perform operations other than the above.

As shown in FIG. 42, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes an EPG data memory 1227, a program memory 1228, a work memory 1229, a display converter 1230, an OSD (On-Screen Display) control unit 1231, a display control unit 1232, a recording/reproducing unit 1233, a D/A converter 1234, and a communication unit 1235.

The display converter 1230 includes a video encoder 1241. The recording/reproducing unit 1233 includes an encoder 1251 and a decoder 1252.

The reception unit 1221 receives an infrared signal from a remote controller (not shown), converts the infrared signal into an electrical signal, and outputs the electrical signal to the recorder control unit 1226. The recorder control unit 1226 is formed with a microprocessor, for example, and performs various kinds of operations in accordance with a program stored in the program memory 1228. At this point, the recorder control unit 1226 uses the work memory 1229 where necessary.

The communication unit 1235 is connected to a network, and performs a communication operation with another device via the network. For example, under the control of the recorder control unit 1226, the communication unit 1235 communicates with a tuner (not shown), and outputs a station select control signal mainly to the tuner.

The demodulation unit 1222 demodulates a signal supplied from the tuner, and outputs the signal to the demultiplexer 1223. The demultiplexer 1223 divides the data supplied from the demodulation unit 1222 into audio data, video data, and EPG data. The demultiplexer 1223 outputs the audio data, the video data, and the EPG data to the audio decoder 1224, the video decoder 1225, and the recorder control unit 1226, respectively.

The audio decoder 1224 decodes the input audio data, and outputs the decoded audio data to the recording/reproducing unit 1233. The video decoder 1225 decodes the input video data, and outputs the decoded video data to the display converter 1230. The recorder control unit 1226 supplies and stores the input EPG data into the EPG data memory 1227.

The display converter 1230 encodes video data supplied from the video decoder 1225 or the recorder control unit 1226 into video data compliant with the NTSC (National Television Standards Committee) standards, for example, using the video encoder 1241. The encoded video data is output to the recording/reproducing unit 1233. Also, the display converter 1230 converts the screen size of video data supplied from the video decoder 1225 or the recorder control unit 1226 into a size compatible with the size of the monitor 1260. The video encoder 1241 converts the video data into video data compliant with the NTSC standards. The NTSC video data is converted into an analog signal, and is output to the display control unit 1232.

Under the control of the recorder control unit 1226, the display control unit 1232 superimposes an OSD signal output from the OSD (On-Screen Display) control unit 1231 on the video signal input from the display converter 1230, and outputs the resultant signal to the display of the monitor 1260 to display the image.

Audio data that is output from the audio decoder 1224 and is converted into an analog signal by the D/A converter 1234 is also supplied to the monitor 1260. The monitor 1260 outputs the audio signal from an internal speaker.

The recording/reproducing unit 1233 includes a hard disk as a storage medium for recording video data, audio data, and the like.

The recording/reproducing unit 1233 causes the encoder 1251 to encode audio data supplied from the audio decoder 1224, for example. The recording/reproducing unit 1233 also causes the encoder 1251 to encode video data supplied from the video encoder 1241 of the display converter 1230. The recording/reproducing unit 1233 combines the encoded data of the audio data with the encoded data of the video data, using a multiplexer. The recording/reproducing unit 1233 amplifies the combined data through channel coding, and writes the resultant data on the hard disk via a recording head.

The recording/reproducing unit 1233 reproduces data recorded on the hard disk via a reproduction head, amplifies the data, and divides the data into audio data and video data by using a demultiplexer. The recording/reproducing unit 1233 decodes the audio data and the video data by using the decoder 1252. The recording/reproducing unit 1233 performs a D/A conversion on the decoded audio data, and outputs the resultant data to the speaker of the monitor 1260. The recording/reproducing unit 1233 also performs a D/A conversion on the decoded video data, and outputs the resultant data to the display of the monitor 1260.

Based on a user's instruction indicated by an infrared signal that is transmitted from a remote controller and is received via the reception unit 1221, the recorder control unit 1226 reads the latest EPG data from the EPG data memory 1227, and supplies the EPG data to the OSD control unit 1231. The OSD control unit 1231 generates image data corresponding to the input EPG data, and outputs the image data to the display control unit 1232. The display control unit 1232 outputs the video data input from the OSD control unit 1231 to the display of the monitor 1260, to display the image. In this manner, an EPG (Electronic Program Guide) is displayed on the display of the monitor 1260.

The hard disk recorder 1200 can also obtain various kinds of data, such as video data, audio data, and EPG data, which are supplied from another device via a network such as the Internet.

Under the control of the recorder control unit 1226, the communication unit 1235 obtains encoded data of video data, audio data, EPG data, and the like from another device via a network, and supplies those data to the recorder control unit 1226. For example, the recorder control unit 1226 supplies encoded data of obtained video data and audio data to the recording/reproducing unit 1233, and stores those data into the hard disk. At this point, the recorder control unit 1226 and the recording/reproducing unit 1233 may perform an operation such as a re-encoding where necessary.

The recorder control unit 1226 also decodes encoded data of obtained video data and audio data, and supplies the resultant video data to the display converter 1230. The display converter 1230 processes the video data supplied from the recorder control unit 1226 in the same manner as processing video data supplied from the video decoder 1225, and supplies the resultant data to the monitor 1260 via the display control unit 1232, to display the image.

In synchronization with the image display, the recorder control unit 1226 may supply the decoded audio data to the monitor 1260 via the D/A converter 1234, and output the sound from the speaker.

Further, the recorder control unit 1226 decodes encoded data of obtained EPG data, and supplies the decoded EPG data to the EPG data memory 1227.

The above described hard disk recorder 1200 uses the image decoding device 400 as the video decoder 1225, the decoder 1252, and the decoder installed in the recorder control unit 1226. As in the case of the image decoding device 400, the video decoder 1225, the decoder 1252, and the decoder installed in the recorder control unit 1226 appropriately control bit sequence assignment in accordance with a predetermined parameter. Accordingly, the video decoder 1225, the decoder 1252, and the decoder installed in the recorder control unit 1226 can reproduce the same bit sequence assignment as that used in the encoding. In this manner, the video decoder 1225, the decoder 1252, and the decoder installed in the recorder control unit 1226 can increase encoding efficiency for encoded data.

Thus, the hard disk recorder 1200 can increase encoding efficiency for video data (encoded data) received by a tuner or the communication unit 1235 and video data (encoded data) to be reproduced by the recording/reproducing unit 1233.

The hard disk recorder 1200 also uses the image encoding device 300 as the encoder 1251. As in the case of the image encoding device 300, the encoder 1251 appropriately controls bit sequence assignment in accordance with a predetermined parameter. That is, the encoder 1251 can assign a bit sequence having a shorter code length to the selection information about a motion vector having a higher designation frequency. In this manner, the encoder 1251 can increase encoding efficiency for encoded data.

Thus, the hard disk recorder 1200 can increase encoding efficiency for data to be recorded on the hard disk, for example.

In the above description, the hard disk recorder 1200 that records video data and audio data on a hard disk has been described. However, any other recording medium may be used. For example, as in the case of the above described hard disk recorder 1200, the image encoding device 300 and the image decoding device 400 can be applied to a recorder that uses a recording medium other than a hard disk, such as a flash memory, an optical disk, or a videotape.

>8. Eighth Embodiment>

[Camera]

Figure 43:
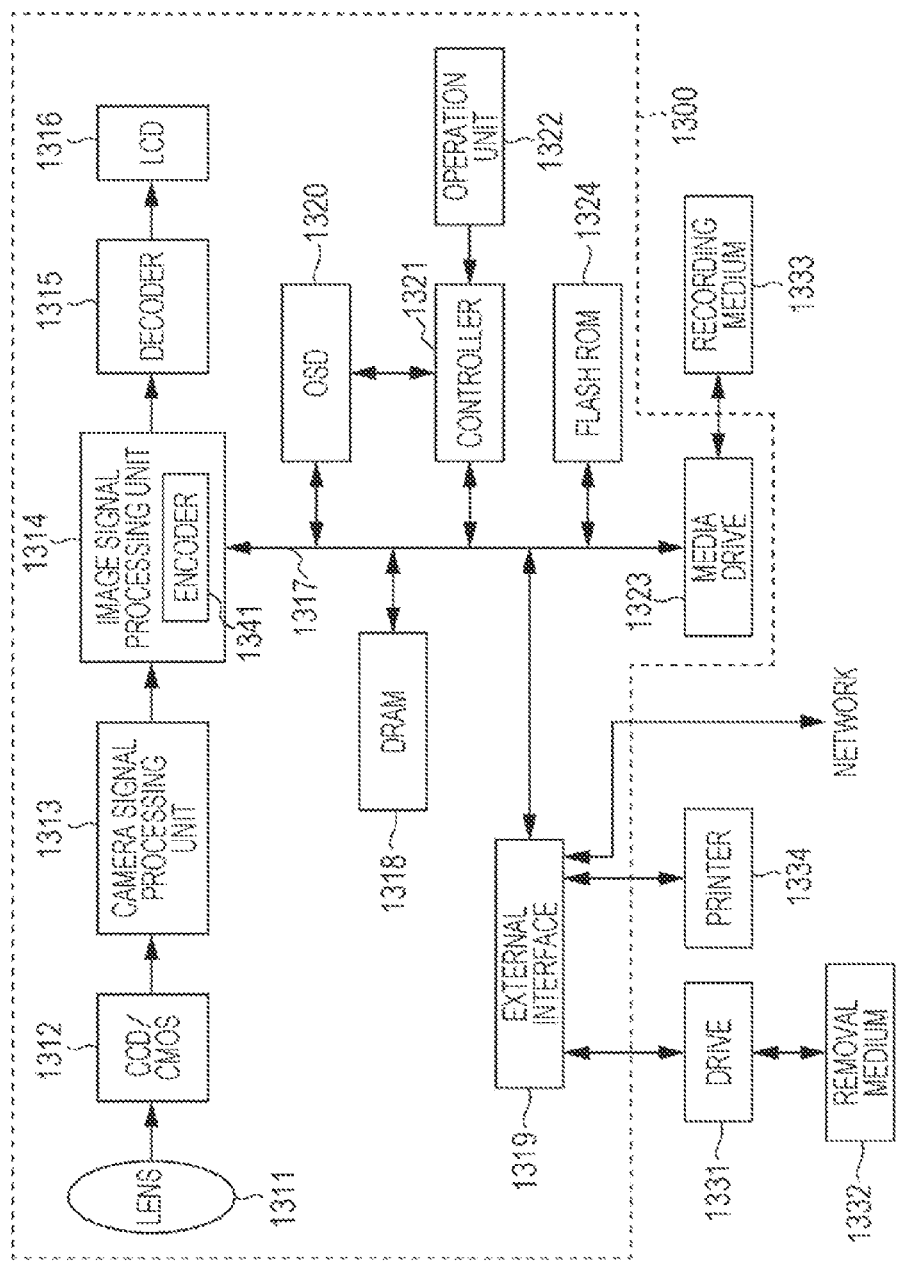
FIG. 43 is a block diagram showing a typical example structure of a camera.

FIG. 43 is a block diagram showing a typical example structure of a camera using the image encoding device 300 and the image decoding device 400.

The camera 1300 shown in FIG. 43 captures an image of an object, and displays the image of the object on an LCD 1316 or records the image of the object as image data on a recording medium 1333.

A lens block 1311 has light (or a video image of an object) incident on a CCD/CMOS 1312. The CCD/CMOS 1312 is an image sensor using a CCD or a CMOS. The CCD/CMOS 1312 converts the intensity of the received light into an electrical signal, and supplies the electrical signal to a camera signal processing unit 1313.

The camera signal processing unit 1313 transforms the electrical signal supplied from the CCD/CMOS 1312 into a Y, Cr, Cb chrominance signal, and supplies the signal to an image signal processing unit 1314. Under the control of a controller 1321, the image signal processing unit 1314 performs predetermined image processing on the image signal supplied from the camera signal processing unit 1313, and encodes the image signal by using an encoder 1341. The image signal processing unit 1314 supplies the encoded data generated by encoding the image signal to a decoder 1315. The image signal processing unit 1314 further obtains display data generated at an on-screen display (OSD) 1320, and supplies the display data to the decoder 1315.

In the above operation, the camera signal processing unit 1313 uses a DRAM (Dynamic Random Access Memory) 1318 connected thereto via a bus 1317, to store the image data and the encoded data or the like generated by encoding the image data into the DRAM 1318 where necessary.

The decoder 1315 decodes the encoded data supplied from the image signal processing unit 1314, and supplies the resultant image data (decoded image data) to the LCD 1316. The decoder 1315 also supplies the display data supplied from the image signal processing unit 1314 to the LCD 1316. The LCD 1316 combines the image corresponding to the decoded image data supplied from the decoder 1315 with the image corresponding to the display data, and displays the combined image.

Under the control of the controller 1321, the on-screen display 1320 outputs the display data of a menu screen or icons formed with symbols, characters, and figures, to the image signal processing unit 1314 via the bus 1317.

Based on a signal indicating contents designated by a user using an operation unit 1322, the controller 1321 performs various kinds of operations, and controls, via the bus 1317, the image signal processing unit 1314, the DRAM 1318, an external interface 1319, the on-screen display 1320, a media drive 1323, and the like. A flash ROM 1324 stores programs, data, and the like necessary for the controller 1321 to perform various kinds of operations.

For example, in place of the image signal processing unit 1314 and the decoder 1315, the controller 1321 can encode the image data stored in the DRAM 1318, and decode the encoded data stored in the DRAM 1318. In doing so, the controller 1321 may perform encoding and decoding operations by using the same methods as the encoding and decoding methods used by the image signal processing unit 1314 and the decoder 1315, or may perform encoding and decoding operations by using methods that are not compatible with the image signal processing unit 1314 and the decoder 1315.

When a start of image printing is requested through the operation unit 1322, for example, the controller 1321 reads image data from the DRAM 1318, and supplies the image data to a printer 1334 connected to the external interface 1319 via the bus 1317, so that the printing is performed.

Further, when image recording is requested through the operation unit 1322, for example, the controller 1321 reads encoded data from the DRAM 1318, and supplies and stores the encoded data into the recording medium 1333 mounted on the media drive 1323 via the bus 1317.

The recording medium 1333 is a readable and writable removable medium, such as a magnetic disk, a magnetooptical disk, an optical disk, or a semiconductor memory. The recording medium 1333 may be any kind of removable medium, and may be a tape device, a disk, or a memory card. It is of course possible to use a non-contact IC card or the like.

Alternatively, the media drive 1323 and the recording medium 1333 may be integrated, and may be formed with an immobile storage medium such as an internal hard disk drive or a SSD (Solid State Drive).

The external interface 1319 is formed with a USB input/output terminal and the like, for example, and is connected to the printer 1334 when image printing is performed. Also, a drive 1331 is connected to the external interface 1319 where necessary, and a removable medium 1332 such as a magnetic disk, an optical disk, or a magnetooptical disk is mounted on the drive 1331 where appropriate. A computer program that is read from such a disk is installed in the flash ROM 1324 where necessary.

Further, the external interface 1319 includes a network interface connected to a predetermined network such as a LAN or the Internet. In accordance with an instruction from the operation unit 1322, for example, the controller 1321 can read encoded data from the DRAM 1318, and supply the encoded data from the external interface 1319 to another device connected thereto via a network. Also, the controller 1321 can obtain encoded data and image data supplied from another device via a network, and store the data into the DRAM 1318 or supply the data to the image signal processing unit 1314 via the external interface 1319.

The above camera 1300 uses the image decoding device 400 as the decoder 1315. As in the case of the image decoding device 400, the decoder 1315 appropriately controls bit sequence assignment in accordance with a predetermined parameter. Accordingly, the decoder 1315 can reproduce the same bit sequence assignment as that used in the encoding, and correctly decode encoded data supplied from the encoding side. In this manner, the decoder 1315 can increase encoding efficiency for encoded data.

Thus, the camera 1300 can increase encoding efficiency for image data generated at the CCD/CMOS 1312, encoded data of video data read from the DRAM 1318 or the recording medium 1333, or encoded data of video data obtained via a network, for example.

Also, the camera 1300 uses the image encoding device 300 as the encoder 1341. As in the case of the image encoding device 300, the encoder 1341 appropriately controls bit sequence assignment in accordance with a predetermined parameter. That is, the encoder 1341 can assign a bit sequence having a shorter code length to the selection information about a motion vector having a higher designation frequency. In this manner, the encoder 1341 can increase encoding efficiency for encoded data.

Thus, the camera 1300 can increase the encoding efficiency for encoded data to be recorded in the DRAM 1318 or the recording medium 1333, and for encoded data to be provided to other devices, for example.

The decoding method used by the image decoding device 400 may be applied to decoding operations to be performed by the controller 1321. Likewise, the encoding method used by the image encoding device 300 may be applied to encoding operations to be performed by the controller 1321.

Image data to be captured by the camera 1300 may be of a moving image, or may be of a still image.

It is of course possible to use an image encoding device and an image decoding device having the present technique applied thereto in any devices and systems other than the above described devices.

The present technique can be applied to image encoding devices and image decoding devices that are used when image information (bit streams) compressed through orthogonal transforms such as discrete cosine transforms and motion compensation is received via a network medium such as satellite broadcasting, cable television, the Internet, or a portable telephone, or when such image information is processed in a storage medium such as an optical or magnetic disk or a flash memory, as in MPEG, H.26x, for example.

The present technique can also be in the following forms.

(1) An image processing device including:

an assignment control unit that controls assignment of a binary bit sequence to predicted motion vector select information indicating a motion vector selected as a predicted motion vector, to assign a bit sequence having a shorter code length to the select information about a motion vector having a higher designation frequency; and a binarization unit that binarizes the predicted motion vector select information with the bit sequence assigned by the assignment control unit.

(2) The image processing device of (1), wherein the assignment control unit includes a table selection unit that selects a table that designates the bit sequence to be assigned to the predicted motion vector select information in accordance with the type of the motion vector selected as the predicted motion vector, and the binarization unit binarizes the predicted motion vector select information by using the table selected by the table selection unit.

(3) The image processing device of (2), wherein
the assignment control unit further includes a distance calculation unit that calculates the distance between the current picture and an anchor picture, and
the table selection unit selects the table based on the distance calculated by the distance calculation unit.

(4) The image processing device of (3), wherein
the assignment control unit further includes a distance threshold acquirement unit that acquires a distance threshold indicating the threshold of the distance, and
the table selection unit selects the table in accordance with the magnitude relationship between the distance calculated by the distance calculation unit and the distance threshold acquired by the distance threshold acquirement unit.

(5) The image processing device of (4), wherein the distance threshold acquired by the distance threshold acquirement unit is supplied to another device that decodes encoded data of the predicted motion vector select information.

(6) The image processing device of any of (2) to (5), wherein
the assignment control unit further includes a similarity calculation unit that calculates the similarity between peripheral predicted motion vectors, and
the table selection unit selects the table based on the similarity calculated by the similarity calculation unit.

(7) The image processing device of (6), wherein
the assignment control unit further includes a similarity threshold acquirement unit that acquires a similarity threshold indicating the threshold of the similarity, and
the table selection unit selects the table in accordance with the magnitude relationship between the similarity calculated by the similarity calculation unit and the similarity threshold acquired by the similarity threshold acquirement unit.

(8) The image processing device of (7), wherein the similarity threshold acquired by the similarity threshold acquirement unit is supplied to another device that decodes encoded data of the predicted motion vector select information.

(9) The image processing device of any of (2) to (8), wherein
the assignment control unit further includes a cost function value calculation unit that calculates a cost function value of the predicted motion vector select information, and
the table selection unit selects the table based on the cost function value calculated by the cost function value calculation unit.

(10) The image processing device of any of (2) to (9), wherein information indicating the result of the table selection performed by the table selection unit is supplied to another device that decodes encoded data of the predicted motion vector select information.

(11) The image processing device of any of (1) to (10), further including
an encoding unit that encodes the binarized data obtained through the binarization performed by the binarization unit.

(12) An image processing method for an image processing device, including:
controlling assignment of a binary bit sequence to predicted motion vector select information indicating a motion vector selected as a predicted motion vector, to assign a bit sequence having a shorter code length to the select information about a motion vector having a higher designation frequency, the controlling being performed by an assignment control unit; and
binarizing the predicted motion vector select information with the assigned bit sequence, the binarizing being performed by a binarization unit.

(13) An image processing device including:
a decoding unit that decodes encoded data of predicted motion vector select information indicating a motion vector selected as a predicted motion vector; and
a debinarization unit that debinarizes the binarized data of the predicted motion vector select information obtained through the decoding performed by the decoding unit, with a bit sequence that is assigned in an assigning operation controlled to assign a bit sequence having a shorter code length to the select information about a motion vector having a higher designation frequency.

(14) The image processing device of (13), further including
an assignment control unit that controls the bit sequence to be assigned to the predicted motion vector select information based on a parameter supplied from another device that has encoded the predicted motion vector select information,
wherein the debinarization unit debinarizes the predicted motion vector select information under the control of the assignment control unit.

(15) The image processing device of (14), wherein the assignment control unit includes a table selection unit that selects a table that designates the bit sequence to be assigned to the predicted motion vector select information in accordance with the type of the motion vector selected as the predicted motion vector.

(16) The image processing device of (15), wherein
the assignment control unit further includes a distance calculation unit that calculates the distance between the current picture and an anchor picture, and
the table selection unit selects the table in accordance with the magnitude relationship between the distance calculated by the distance calculation unit and a distance threshold supplied from the other device that has encoded the predicted motion vector select information.

(17) The image processing device of (15) or (16), wherein
the assignment control unit further includes a similarity calculation unit that calculates the similarity between peripheral predicted motion vectors, and
the table selection unit selects the table in accordance with the magnitude relationship between the similarity calculated by the similarity calculation unit and a similarity threshold supplied from the other device that has encoded the predicted motion vector select information.

(18) The image processing device of any of (13) to (17), wherein the debinarization unit debinarizes the binarized data of the predicted motion vector select information based on information indicating a table selection result supplied from the other device that has encoded the predicted motion vector select information.

(19) An image processing method for an image processing device, including:
decoding encoded data of predicted motion vector select information indicating a motion vector selected as a predicted motion vector, the decoding being performed by a decoding unit; and
debinarizing the binarized data of the predicted motion vector select information obtained through the decoding, with a bit sequence that is assigned in an assigning operation controlled to assign a bit sequence having a shorter code length to the select information about a motion vector having a higher designation frequency, the debinarizing being performed by a debinarization unit.

REFERENCE SIGNS LIST

300 Image encoding device, 306 Lossless encoding unit, 321 Assignment control unit, 331 Motion vector storage unit, 332 Predicted motion vector selection unit, 333 Difference motion vector calculation unit, 334 Table storage unit, 335 Binarization unit, 336 Binarization unit, 337 Entropy encoding unit, 341 Distance threshold acquirement unit, 342 Distance calculation unit, 343 Table selection unit, 400 Image decoding device, 402 Lossless decoding unit, 421 Assignment control unit, 431 Entropy decoding unit, 432 Debinarization unit, 433 Table storage unit, 434 Debinarization unit, 435 Predicted motion vector selection unit, 436 Motion vector calculation unit, 437 Motion vector storage unit, 441 Distance calculation unit, 442 Table selection unit, 541 Similarity threshold acquirement unit, 542 Similarity calculation unit, 543 Table selection unit, 641 Similarity calculation unit, 642 Table storage unit, 741 Cost function value calculation unit, 742 Cost function value storage unit, 743 Table selection unit, 832 Debinarization unit, 834 Debinarization unit

The invention claimed is:

1. An image processing device comprising:
an assignment control unit configured to control assignment of a binary bit sequence to predicted motion vector select information indicating a motion vector selected as a predicted motion vector, to assign a bit sequence having a shorter code length to select information about a motion vector having a higher designation frequency; and
a binarization unit configured to binarize the predicted motion vector select information with the bit sequence assigned by the assignment control unit,
wherein the assignment control unit comprises:
a distance calculation unit configured to calculate a distance between a current picture and an anchor picture; and
a table selection unit configured to select a table based on the distance calculated by the distance calculation unit, wherein the table designates the bit sequence to be assigned to the predicted motion vector select information in accordance with a type of the motion vector selected as the predicted motion vector, and
wherein the assignment control unit, the binarization unit, the distance calculation unit, and the table selection unit are each implemented via at least one processor.

2. The image processing device according to claim 1, wherein
the binarization unit binarizes the predicted motion vector select information by using the table selected by the table selection unit.

3. The image processing device according to claim 2, wherein
the assignment control unit further comprises a similarity calculation unit configured to calculate similarity between peripheral predicted motion vectors, and
the table selection unit selects the table based on the similarity calculated by the similarity calculation unit,
wherein the similarity calculation unit is implemented via at least one processor.

4. The image processing device according to claim 3, wherein
the assignment control unit further comprises a similarity threshold acquirement unit configured to acquire a similarity threshold indicating a threshold of the similarity, and
the table selection unit selects the table in accordance with a magnitude relationship between the similarity calculated by the similarity calculation unit and the similarity threshold acquired by the similarity threshold acquirement unit, and
wherein the similarity threshold acquirement unit is implemented via at least one processor.

5. The image processing device according to claim 4, wherein the similarity threshold acquired by the similarity threshold acquirement unit is supplied to another device that decodes encoded data of the predicted motion vector select information.

6. The image processing device according to claim 2, wherein
the assignment control unit further comprises a cost function value calculation unit configured to calculate a cost function value of the predicted motion vector select information, and
the table selection unit selects the table based on the cost function value calculated by the cost function value calculation unit, and
wherein the cost function value calculation unit is implemented via at least one processor.

7. The image processing device according to claim 2, wherein information indicating the result of the table selection performed by the table selection unit is supplied to another device that decodes encoded data of the predicted motion vector select information.

8. The image processing device according to claim 1, wherein
the assignment control unit further comprises a distance threshold acquirement unit configured to acquire a distance threshold indicating a threshold of the distance, and
the table selection unit selects the table in accordance with a magnitude relationship between the distance calculated by the distance calculation unit and the distance threshold acquired by the distance threshold acquirement unit, and
wherein the distance threshold acquirement unit is implemented via at least one processor.

9. The image processing device according to claim 8, wherein the distance threshold acquired by the distance threshold acquirement unit is supplied to another device that decodes encoded data of the predicted motion vector select information.

10. The image processing device according to claim 1, further comprising
an encoding unit configured to encode the binarized data obtained through the binarization performed by the binarization unit,
wherein the encoding unit is implemented via at least one processor.

11. An image processing method for an image processing device, comprising:
controlling assignment of a binary bit sequence to predicted motion vector select information indicating a motion vector selected as a predicted motion vector, to assign a bit sequence having a shorter code length to select information about a motion vector having a higher designation frequency, the controlling being performed by an assignment control unit;
calculating a distance between a current picture and an anchor picture, the calculating being performed by a distance calculation unit;
selecting a table based on the calculated distance, the selecting being performed by a table selection unit, wherein the table designates the bit sequence to be assigned to the predicted motion vector select information in accordance with a type of the motion vector selected as the predicted motion vector; and
binarizing the predicted motion vector select information with the assigned bit sequence, the binarizing being performed by a binarization unit,
wherein the assignment control unit, the distance calculation unit, the table selection unit, and the binarization unit are each implemented via at least one processor.

12. An image processing device comprising:
- a decoding unit configured to decode encoded data of predicted motion vector select information indicating a motion vector selected as a predicted motion vector;
- a debinarization unit configured to debinarize binarized data of the predicted motion vector select information obtained through the decoding performed by the decoding unit, with a bit sequence that is assigned in an assigning operation controlled to assign a bit sequence having a shorter code length to select information about a motion vector having a higher designation frequency; and
- an assignment control unit comprising:
  - a table selection unit configured to select a table, the table designating the bit sequence to be assigned to the predicted motion vector select information in accordance with a type of the motion vector selected as the predicted motion vector; and
  - a distance calculation unit configured to calculate a distance between a current picture and an anchor picture,
  - wherein the table selection unit selects the table in accordance with a magnitude relationship between the distance calculated by the distance calculation unit and a distance threshold supplied from another device that has encoded the predicted motion vector select information, and
  - wherein the decoding unit, the debinarization unit, the assignment control unit, the table selection unit, and the distance calculation unit are each implemented via at least one processor.

13. The image processing device according to claim 12, wherein the assignment control unit is further
- configured to control the bit sequence to be assigned to the predicted motion vector select information based on a parameter supplied from another device that has encoded the predicted motion vector select information, and
- wherein the debinarization unit debinarizes the predicted motion vector select information under the control of the assignment control unit.

14. The image processing device according to claim 12, wherein
- the assignment control unit further comprises a similarity calculation unit configured to calculate similarity between peripheral predicted motion vectors, and
- the table selection unit selects the table in accordance with a magnitude relationship between the similarity calculated by the similarity calculation unit and a similarity threshold supplied from another device that has encoded the predicted motion vector select information, and
- wherein the similarity calculation unit is implemented via at least one processor.

15. The image processing device according to claim 12, wherein the debinarization unit debinarizes the binarized data of the predicted motion vector select information based on information indicating a table selection result supplied from another device that has encoded the predicted motion vector select information.

16. An image processing method for an image processing device, comprising:
- decoding encoded data of predicted motion vector select information indicating a motion vector selected as a predicted motion vector, the decoding being performed by a decoding unit;
- selecting a table, the selecting being performed by a table selection unit, wherein the table designates a bit sequence to be assigned to the predicted motion vector select information in accordance with a type of the motion vector selected as the predicted motion vector;
- calculating a distance between a current picture and an anchor picture, the calculating being performed by a distance calculation unit; and
- debinarizing binarized data of the predicted motion vector select information obtained through the decoding, with the bit sequence that is assigned in an assigning operation controlled to assign a bit sequence having a shorter code length to the select information about a motion vector having a higher designation frequency, the debinarizing being performed by a debinarization unit,
- wherein the table is selected in accordance with a magnitude relationship between the calculated distance and a distance threshold supplied from another device that has encoded the predicted motion vector select information, and
- wherein the decoding unit, the table selection unit, the distance calculation unit, and the debinarization unit are each implemented via at least one processor.

\* \* \* \* \*